(12) United States Patent
Kageyama et al.

(10) Patent No.: US 7,868,126 B2
(45) Date of Patent: Jan. 11, 2011

(54) PROCESS FOR PRODUCING POLYESTER, POLYESTER PRODUCED USING SAID PROCESS, AND POLYESTER MOLDED PRODUCT

(75) Inventors: Katsuhiko Kageyama, Tsuruga (JP); Tooru Kitagawa, Ohtsu (JP); Kenichi Funaki, Ohtsu (JP); Masaki Fuchikami, Tsuruga (JP); Kazuo Katayose, Tsuruga (JP); Takahiro Nakajima, Ohtsu (JP); Toshiyuki Tsuchiya, Ohtsu (JP); Satoru Nakagawa, Tsuruga (JP); Fumikazu Yoshida, Ohtsu (JP); Haruhiko Kohyama, Ohtsu (JP); Naoki Watanabe, Ohtsu (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 308 days.

(21) Appl. No.: 11/795,556

(22) PCT Filed: Jun. 24, 2005

(86) PCT No.: PCT/JP2005/011591

§ 371 (c)(1),
(2), (4) Date: Apr. 11, 2008

(87) PCT Pub. No.: WO2006/137145

PCT Pub. Date: Dec. 28, 2006

(65) Prior Publication Data

US 2008/0249280 A1    Oct. 9, 2008

(51) Int. Cl.
*C08G 63/00* (2006.01)
(52) U.S. Cl. .................. 528/282; 528/271; 528/272; 528/275; 528/286; 528/308.1; 528/308.3; 502/103; 502/104; 502/132; 502/150; 502/155; 502/162; 428/34.1; 428/35.7; 428/46; 428/221
(58) Field of Classification Search ............... 528/271, 528/272, 275, 282, 285, 286, 274, 308.1, 528/308.3; 502/103, 109, 150, 152, 155, 502/162, 184, 132; 428/34.1, 35.7, 46, 221
See application file for complete search history.

(56) References Cited

U.S. PATENT DOCUMENTS

2003/0083191 A1    5/2003   Nakajima et al.
2004/0058805 A1 *  3/2004   Nakajima et al. ........... 502/152

FOREIGN PATENT DOCUMENTS

| EP | 1227117 A1 | 7/2002 |
|----|------------|--------|
| EP | 1327648 A | 7/2003 |
| JP | 2001-131276 A | 5/2001 |
| JP | 2001-163963 A | 6/2001 |
| JP | 2002-220446 A | 8/2002 |
| JP | 2002-322252 A | 11/2002 |
| JP | 2002-322253 A | 11/2002 |
| JP | 2002-322254 A | 11/2002 |
| JP | 2002-332337 | 11/2002 |
| JP | 2002-363274 A | 12/2002 |
| JP | 2003-082083 A | 3/2003 |
| JP | 2003-163964 A | 6/2003 |
| JP | 2003-171452 A | 6/2003 |
| JP | 2003-171454 A | 6/2003 |
| JP | 2005-112873 A | 4/2005 |
| WO | WO 01/14448 A1 | 1/2001 |
| WO | WO 01/23455 A1 | 5/2001 |
| WO | WO 01/23456 A1 | 5/2001 |
| WO | WO 02/057335 A1 | 7/2002 |

OTHER PUBLICATIONS

European Patent Office; Supplementary European Search Report, mailed Nov. 25, 2008, in European Patent Application No. 05753399.4.

European Examination Report (Communication pursuant to Article 94(3) EPC) in EP Patent Application No. 05753399.4 dated May 8, 2009, European Patent Office, Munich, Germany.

* cited by examiner

*Primary Examiner*—James Seidleck
*Assistant Examiner*—Frances Tischler
(74) *Attorney, Agent, or Firm*—Kenyon & Kenyon LLP

(57) ABSTRACT

This invention provides a polyester and a polyester molded product, which, while maintaining color tone, transparency, and thermal stability, can realize a high polycondensation rate, are less likely to cause the production of polycondensation catalyst-derived undesired materials, and can simultaneously meet both quality and cost effectiveness requirements, which can exhibit the characteristic features, for example, in the fields of ultrafine fibers, high transparent films for optical use, or ultrahigh transparent molded products. These advantages can be realized by using, in the production of a polyester in the presence of an aluminum compound-containing polyester polycondensation catalyst, an aluminum compound having an absorbance of not more than 0.0132 as measured in the form of an aqueous aluminum compound solution, prepared by dissolving the aluminum compound in pure water to give a concentration of 2.7 g/liter in terms of the amount of aluminum element, under conditions of cell length 1 cm and wavelength 680 nm.

3 Claims, No Drawings

PROCESS FOR PRODUCING POLYESTER, POLYESTER PRODUCED USING SAID PROCESS, AND POLYESTER MOLDED PRODUCT

TECHNICAL FIELD

The present invention relates to a process for producing a polyester using a novel polyester polycondensation catalyst using no germanium and antimony compound as a catalyst main component and more particularly to a polyester with a very slight content of insoluble particle derived from a polycondensation catalyst, a polyester product, and a process for producing the polyester.

PRIOR ART

Polyesters represented by polyethylene terephthalate (PET), polybutylene terephthalate (PBT), and polyethylene naphthalate (PEN) and the like are excellent in mechanical properties and chemical properties and have been used in a wide range of fields, for example, as fibers for clothes and industrial materials; films and sheets for wrapping, magnetic tapes and optical use; bottles, which are hollow molded articles; casing for electric and electronic parts; and other engineering plastic molded articles and the like, corresponding to the characteristics of the respective polyesters. Particularly, since bottles made of saturated polyesters such as PET are excellent in the mechanical strength, heat resistance, transparency, and gas barrier property, they are used widely as containers for containing beverages such as juices, carbonated beverages, and soft drinks and the like and containers for eye lotions and cosmetics and the like.

With respect to polyesters including an aromatic dicarboxylic acid and alkylene glycol as main constitutional components as a representative polyester, for example, PET is produced by carrying out esterification reaction or transesterification reaction of terephthalic acid or dimethyl terephthalate with ethylene glycol to produce an oligomer mixture such as bis(2-hydroxyethyl)terephthalate, and then by subjecting the oligomer mixture to liquid-phase condensation polymerization at high temperature in vacuum condition using a catalyst.

Conventionally, as a polyester polycondensation catalyst to be used for polycondensation of such polyesters has widely been used an antimony or germanium compound. Antimony trioxide is an economical catalyst having excellent catalytic activity, but if it is used as a main component, that is, in proper addition amount to exhibit practically applicable polymerization rate, since metal antimony precipitates in polycondensation, gray discoloration and insoluble particles are formed in polyesters and it causes surface defects of films. In the case it is used as a starting material for hollow molded articles, it becomes difficult to obtain hollow molded articles excellent in transparency. Because of these reasons, a polyester containing no antimony compound or a polyester not containing any antimony compound as catalyst main components is desired.

As a catalyst for providing polyesters having excellent catalytic activity that is free from the above-mentioned problems, other than antimony has practically been employed a germanium compound, however the catalyst has problems that the catalyst is extremely costly and that the polymerization control becomes difficult since the catalyst is easy to be eluted outside of the reaction system during the polymerization and consequently the catalyst concentration in a reaction system tends to be changed and therefore, it is problematic to use it as a catalyst main component.

It has been investigated to use other polycondensation catalysts in place of the antimony catalysts or germanium catalysts and titanium compounds such as tetraalkoxytitanates have already been proposed, however, there occur problems that the polyesters produced by using them are susceptive of thermal deterioration and also that the polyesters are considerably colorized.

As described above, it has been desired to obtain a polymerization catalyst containing a metal component as a main component other than antimony, germanium, and titanium compounds and excellent in the catalytic activity and capable of producing polyesters excellent in the color tone, thermal stability, and transparency of a molded article and containing less insoluble particles.

As a novel polycondensation catalyst satisfying the above-mentioned requirements, catalyst systems consisting of an aluminum compound and a phosphorus compound are disclosed and have drawn an attention (reference to Patent Documents 1 to 4)

Patent Document 1: Japanese Patent Application Laid-Open (JP-A) 2001-131276

Patent Document 2: JP-A 2001-163963

Patent Document 3: JP-A 2001-163964

Patent Document 4: JP-A 2002-220446

Further, with respect to a process for producing a polyester by the above-mentioned polycondensation catalyst system, a polyester polycondensation catalyst which is a solution obtained by dissolving at least one salt selected from aluminum carboxylate in water and/or an organic solvent and a process for producing a polyester using the polycondensation catalyst are disclosed (reference to Patent Document 5).

Patent Document 5: JP-A 2003-82083

The polyesters obtained by the above-mentioned polycondensation catalyst system are excellent in color tone, transparency, and thermal stability and satisfies the above-mentioned requirements. However, the polyesters obtained in the above-mentioned manner have problems that it is impossible to stably obtain the polyesters with a very low content of insoluble particle in the polyesters and accordingly, the polyesters are unsatisfactory for use as ultrafine fibers, highly transparent films for optical use, or molded articles with ultra high transparency and it has been desired to improve the polyester.

DISCLOSURE OF THE INVENTION

Problems to be Solved by the Invention

In view of the above state of the conventional art, the present invention provides a process for producing a polyester and a polyester molded article which, while maintaining color tone, transparency, and thermal stability, can be produced at a high polycondensation rate, cause little insoluble particle production derived from a polycondensation catalyst, can exhibit the characteristic features, for example, in the field of ultrafine fibers, high transparent films for optical use, or ultrahigh transparent molded products, and simultaneously meet both quality and cost effectiveness requirements in the presence of a polycondensation catalyst containing metal components other than antimony, germanium, and titanium as main metal components.

Means for Solving the Problems

To solve the above-mentioned problems, the inventors of the invention have made various investigations and the inventors have completed the invention. That is, a first invention provides a process for producing a polyester in the presence of a polyester polycondensation catalyst containing an aluminum compound, in which the aluminum compound is an aluminum compound having absorbance of 0.0132 or lower as measured in form of an aqueous aluminum compound solution, prepared by dissolving the aluminum compound in pure water to give a concentration of 2.7 g/L in terms of the amount of aluminum element, under conditions of cell length 1 cm and wavelength 680 nm.

A second invention provides a process for producing a polyester in the presence of a polyester polycondensation catalyst containing an aluminum compound, in which the aluminum compound is an aluminum compound having an amount of water-insoluble substance of 1000 ppm or lower with respect to water in the case where 30 g of the aluminum compound is dissolved in 1500 ml of pure water.

A third invention provides a process for producing a polyester in the presence of a polyester polycondensation catalyst containing an aluminum compound, in which the aluminum compound is water-soluble aluminum compound having water content of 8% by weight or more.

A fourth invention provides a process for producing a polyester in the presence of a polyester polycondensation catalyst containing an aluminum compound, in which the aluminum compound is an aluminum compound having a maximum diffraction peak at 2θ (diffraction angle) of 14.0±0.1 degree in x-ray diffractiometry and a full width at half maximum of 0.60 or wider.

A fifth invention provides a process for producing a polyester in the presence of a polyester polycondensation catalyst containing an aluminum compound, in which the aluminum compound is an aluminum compound having the following infrared absorption characteristic: an absorbance ratio T1 (=B/A) of absorbance B having absorption maximum at 3700±10 cm$^{-1}$ to absorbance A having absorption maximum at 1029±10 cm$^{-1}$ is 1.8 or lower.

A sixth invention provides a process for producing a polyester in the presence of a polyester polycondensation catalyst containing an aluminum compound, in which the aluminum compound is an aluminum compound having the following infrared absorption characteristic: the absorbance ratio T2 (=C/A) of the absorbance C having the absorption maximum at 1062±10 cm$^{-1}$ to the absorbance A having the absorption maximum at 1029±10 cm$^{-1}$ is 1.0 or lower.

A seventh invention provides a process for producing a polyester in the presence of a polyester polycondensation catalyst containing an aluminum compound, in which the aluminum compound is an aluminum compound containing 25 to 10000 ppm of sulfur atoms to aluminum atoms.

An eighth invention provides a process for producing a polyester in the presence of a polyester polycondensation catalyst containing an aluminum compound, in which the aluminum compound is an aluminum compound containing 25 to 10000 ppm of boron atoms to aluminum atoms.

A ninth invention provides the process for producing a polyester according to one of the first to eighth inventions, in which the aluminum compound is a basic aluminum acetate.

A tenth invention provides the process for producing a polyester according to one of the first to ninth inventions, in which at least one kind phosphorus compound is used in combination.

Further, an eleventh invention provides a polyester produced by the process according to one of the first to tenth inventions.

Further, a twelfth invention provides a hollow molded article of the polyester according to the eleventh invention.

Further, a thirteenth invention provides a fiber of the polyester according to the eleventh invention.

Further, a fourteenth invention provides a film of the polyester according to the eleventh invention.

Effect of the Invention

A process for producing a polyester according to the invention is advantageous in points that the color tone, transparency and thermal stability are maintained by a polycondensation catalyst mainly containing metal components other than antimony, germanium, and titanium type metal components, polycondensation rate is fast, and formation of insoluble particle derived from the polycondensation catalyst is slight, and both quality and economical properties can be satisfied. Accordingly, a polyester obtained by the production process of the invention can be used preferably in a wide range of fields such as fibers for clothes and industrial materials; films and sheets for wrapping, magnetic tapes, and optical uses; bottles which are hollow molded articles; casings for electric and electronic parts; and other engineering plastic molded articles. In particular, a polyester of the invention can exhibit its characteristics in fields of ultrafine fibers, highly transparent films for optical use, and ultrahigh transparent molded articles because it has a characteristic that the polyester scarcely contains insoluble particle derived from the polycondensation catalyst.

BEST MODES FOR CARRYING OUT THE INVENTION

Hereinafter, the invention will be described more in detail.

A polyester in the present invention means those consisting of dicarboxylic acid and/or its ester formable derivatives in combination with diol and/or its ester formable derivatives.

Examples of dicarboxylic acid may include saturated aliphatic dicarboxylic acids such as oxalic acid, malonic acid, succinic acid, gluratic acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimeric acid and their ester-formable derivatives; unsaturated aliphatic dicarboxylic acids such as fumaric acid, maleic acid, and itaconic acid and their ester-formable derivatives; and aromatic dicarboxylic acid such as orthophthalic acid, isophthalic acid, terephthalic acid, 5-(alkali metal)sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyl ether dicarboxylic acid, 1,2-bis(phenoxy)ethane-p,p'-dicarboxylic acid, pamoic acid, and anthracenedicarboxylic acid and their ester-formable derivatives.

Among these dicarboxylic acids are terephthalic acid and naphthalenedicarboxylic acid preferable and 2,6-naphthalenedicarboxylic acid, particularly preferable in terms of the physical properties of polyesters to be obtained and if necessary, other dicarboxylic acids may be used as constituent components.

If a little, polycarboxylic acids may be used in combination other than these dicarboxylic acids. Examples of the polycarboxylic acids may include ethanetricarboxylic acid, propanetricarboxylic acid, butanetetracarboxylic acid, pyromellitic acid, trimellitic acid, trimesic acid, 3,4,3',4'-biphenyltetracarboxylic acid, and their ester-formable derivatives.

Examples of glycol may include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl)sulfone, bis(p-hydroxyphenyl) methane, 1,2-bis(p-hydroxyphenyl)ethane, bisphenol A, bisphenol C, 2,5-naphthalenediol, and glycols obtained by adding ethylene oxide to these glycols.

Among these glycols are ethylene glycol, 1,3-propylene glycol, 1,4-butylene glycol, and 1,4-cyclohexanedimethanol preferable.

If a little, polyhydric alcohols may be used in combination other than these glycols. Examples of the polyhydric alcohols are trimethylolmethane, trimethylolethane, trimethylolpropane, pentaerythritol, glycerol, and hexanetriol.

Use of hydroxycarboxylic acids in combination is possible. Examples of the hydroxycarboxylic acids may include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid and their ester-formable derivatives.

Also, use of cyclic esters in combination is possible. Examples of the cyclic esters may include ε-caprolactone, β-propiolactone, β-methyl-β-propiolactone δ-valerolactone, glycollide, and lactide.

Examples of the ester-formable derivatives of the polycarboxylic acids and hydroxycarboxylic acids are their alkyl esters and hydroxyalkyl esters.

Examples of the ester formable derivatives of diols may include esters of diols with lower aliphatic carboxylic acids such as acetic acid.

The polyester of the present inventions are preferably polyethylene terephthalate (PET), polybutylene terephthalate (PBT), polypropylene terephthalate, poly(1,4-cyclohexanedimethylene terephthalate), polyethylene naphthalate (PEN), polybutylene naphthalate, polypropylene naphthalate, and their copolymers and among them, polyethylene terephthalate and their copolymers are particularly preferable. As the copolymer, those which contain 50% by mole or more and preferably 70% by mole or more of the ethylene-terephthalate repeating units are preferable.

The aluminum compound of the invention is not limited if it can be dissolved in water and/or an organic solvent. Practical examples of the aluminum compound may include aluminum carboxylates such as aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, aluminum tartrate, and aluminum salicylate; inorganic acid salts such as aluminum chloride, aluminum hydroxide, aluminum hydroxide chloride, aluminum nitrate, aluminum sulfate, aluminum carbonate, aluminum phosphate, and aluminum phosphonate; aluminum alkoxides such as aluminum methoxide, aluminum ethoxide, aluminum n-propoxide, aluminum iso-propoxide, aluminum n-butoxide, and aluminum tert-butoxide; aluminum chelate compounds such as aluminum acetylacetonate, aluminum acetylacetate, aluminum ethylacetoacetate, and aluminum ethylacetoacetate di-iso-propoxide; organoaluminum compounds such as trimethylaluminum and triethylaluminum and their partial hydrolyzates thereof; reaction products of aluminum alkoxides and aluminum chelate compounds with hydroxycarboxylic acids. Among these, carboxylic acid salts, inorganic acid salts, and chelate compounds are preferable, among which aluminum acetate, aluminum lactate, aluminum chloride, aluminum hydroxide, aluminum hydroxide chloride, and aluminum acetylacetonate are particularly preferable.

Among these aluminum compounds, an aluminum carboxylate is more preferable from viewpoints of solubility and no corrosion of an apparatus is caused.

Examples of the aluminum carboxylate to be used in the invention include aluminum formate, aluminum acetate, basic aluminum acetate, aluminum propionate, aluminum oxalate, aluminum acrylate, aluminum laurate, aluminum stearate, aluminum benzoate, aluminum trichloroacetate, aluminum lactate, aluminum citrate, aluminum tartrate, and aluminum salicylate and preferable examples among them are those having a structure of aluminum salts of acetic acid such as aluminum acetate and basic aluminum acetate as well as aluminum lactate in terms of solubility in the system and catalytic activity. In particular, basic aluminum acetate is preferable to be used.

Aluminum acetate, basic aluminum acetate, aluminum lactate, and aluminum benzoate have been exemplified, as examples of use of aluminum carboxylates as a polyester polycondensation catalyst. However, they are all poor in the solubility in a polyester and therefore inferior in the catalytic activity and have a problem of forming insoluble particle in the polyester to be produced and there have been a problem to use these compounds as a catalyst as they are. The inventors of the invention disclose that it is made possible to provide sufficient catalytic activity by using a catalyst previously in water and/or an organic solvent in Patent Document 5. The invention is accomplished based on the technique disclosed in Patent Document 5. That is, the polyester obtained by employing the technique is excellent in color tone, transparency, and thermal stability and thus the catalyst has high practical applicability as polycondensation catalyst containing, as main metal components, metal components other than antimony, germanium, and titanium. However the process still has a problem that it is impossible to stably obtain a polyester with a constantly low content of insoluble particle in the polyester and the polyester is unsatisfactory to be used as ultrafine fibers, highly transparent films for optical use, or molded articles with ultrahigh transparency and it has been desired to improve the process. With respect to establishment of a technique of suppressing fluctuation of the content of fine insoluble particle in the polyester, the inventors of the invention have made various investigations and based on the findings of the investigations, the invention is accomplished and satisfies the above-mentioned requirements.

That is, the invention is characterized in that an aluminum compound having absorbance of 0.0132 or lower as measured in form of an aqueous aluminum compound solution, prepared by dissolving the aluminum compound in pure water to give a concentration of 2.7 g/L in terms of the amount of aluminum element, under conditions of cell length 1 cm and wavelength 680 nm is used as the above-mentioned aluminum compound. A method for measuring the absorbance of an aqueous solution of an aluminum compound in the invention is carried out as follows.

[Method for Measuring Absorbance of Aqueous Aluminum Compound Solution]

The absorbance is measured in form of an aqueous aluminum compound solution, prepared by dissolving an aluminum compound in pure water to give a concentration of 2.7 g/L in terms of the amount of aluminum element. The dissolution is carried out by stirring at room temperature for 6 hours and further stirring at an inner temperature of 95° C. for 3 hours. The absorbance measurement is carried out using a quartz cell with cell length of 1 cm and pure water is used as a blank liquid.

The absorbance is preferably 0.0088 or lower, more preferably 0.0044 or lower, and even more preferably 0.0022 or lower. The absorbance of 0 is most preferable. If the absorbance exceeds 0.0132, the content of the insoluble particle in polyesters is increased and if the polyester is molded as a molded article such as a film or a bottle, haze of the molded article is undesirably got worse. Further, it leads to a problem that clogging of a filter is frequently caused at the time of filtration of the polyester in the polycondensation step and the molding step.

The absorbance of the above-mentioned aqueous aluminum compound solution is a gauge for evaluating the water-insoluble component contained in a trace in the aluminum compound. Suppression of formation of the insoluble particle in polyesters by adjusting the absorbance in the range defined in the invention is supposedly attributed to as follows: formation of the insoluble particle in polyesters is suppressed since finely granular insoluble particle itself, which is water-insoluble component contained in a trace in the aluminum compound, is suppressed or deformation or agglomeration of the water-insoluble component nucleating into the insoluble particle in polyesters in the polycondensation process of the polyester is suppressed.

In the invention, a method for adjusting the absorbance of the above-mentioned aqueous aluminum compound solution to be 0.0132 or lower is not particularly limited, however it is preferable to use water-soluble aluminum compound with water content of 8% by weight or higher as the aluminum compound. The water content is more preferably 10% by weight or higher and even more preferably 12% by weight or higher. If the water content is lower than 8% by weight, the absorbance of the above-mentioned aqueous aluminum compound solution is increased and therefore it is not preferable.

The mechanism that the absorbance of the above-mentioned aqueous aluminum compound solution is suppressed and the content of the insoluble particle in polyesters is decreased by using the water-soluble aluminum compound with water content of 8% by weight or higher as the aluminum compound is not made clear. However, in a drying step of aluminum compound when the aluminum compound is separated from reaction media, it is supposed that if the water content is lower than 8% by weight, deformation or structural modification of the aluminum compound, which forms an aluminum compound to be insoluble in water and polyesters if the water content is lower than 8% by weight, is caused although it is an extremely small portion. For example, formation of hydrolysis products of the aluminum compound are suspected to be a modified body of the aluminum compound and a polymer structure body in which single molecules are associated and composite structure modification containing crystal water are supposed to be possible as the structural modification. Accordingly, it is supposed that the content of insoluble particle in polyesters can be suppressed by stopping drying at a high water content level. Consequently, the water-soluble aluminum compound to be used in the invention is preferable those whose drying step is stopped in the state that the water content is 8% by weight or higher. The upper limit of the water content is not limited and the aluminum compound in form of an aqueous solution which is not subjected to the drying may be used. The above-mentioned method causes no problem by drying, saves the isolation step, and results in advantages not only in the quality but also in the economical property and therefore, the method is recommended. Consequently, with respect to the above-mentioned water-soluble aluminum compound, it is preferable to use the aluminum compound prepared by the aqueous solution method and isolated or as it is in form of the aqueous solution without isolating the compound.

In the case where the water-soluble aluminum compound is used as it is in form of the aqueous solution without isolation, the concentration of the aluminum compound in the aqueous solution is preferable to be adjusted in the concentration satisfying the above-mentioned absorbance of the aqueous aluminum compound solution measured by absorptiometry and the absorbance of the aqueous solution with the adjusted concentration is preferably 0.0132 or lower.

The above-mentioned aluminum compound is not particularly limited to the structure or production method if it is water-soluble, however basic aluminum acetate is preferable.

The basic aluminum acetate is easy to be dissolved in water and/or an organic solvent and has stability and low corrosiveness to metals and is therefore preferable as the aluminum compound for the above-mentioned technique, however in the case where commercialized products of the basic aluminum acetate are used, there is a problem that quantity of the insoluble particle in a polyester to be obtained considerably fluctuates in accordance with the manufacturers or the lots of the products. To solve the problem is also one of aims of the invention.

Methods for producing the basic aluminum acetate will be exemplified, however it does not means that the methods be limited to the exemplified methods. That is, (1) a method by bringing an aluminum hydrate and vapor of acetic acid; (2) a method by reaction of an aqueous solution of sodium aluminate or potassium aluminate with an aqueous acetic acid solution; (3) a method by reaction of an aqueous basic aluminum chloride solution and glacial acetic acid; and (4) a method by exchanging an inorganic acid ion and an acetic acid ion by contacting an aqueous basic aluminum inorganic acid salt solution such as an aqueous basic aluminum chloride solution, an aqueous basic aluminum amide-sulfate solution, and an aqueous basic aluminum nitrate solution with an acetic acid type anion exchange resin. The aqueous basic aluminum acetate solution obtained by these methods may be used while being condensed or diluted.

In the case of using aluminum compound in form of the aqueous solution, the concentration of the basic aluminum acetate in the aqueous solution is not particularly limited, however it is preferably 1% by weight or higher in consideration of water removal step in the case where liquid exchange to an ethylene glycol solution is carried out as described later. It is more preferably 1.2% by weight or higher and ever more preferably 1.5% by weight or higher.

Further, the above-mentioned aqueous solution may be concentrated and dried to use the basic aluminum acetate in form of a solid. In this case, it is required to stop the drying of the basic aluminum acetate in the state that the water content is 8% by weight or higher. Further, it is also preferable not to increase the drying temperature at the time of drying. It is preferably 150° C. or lower, more preferably 120° C. or lower, and even more preferably 100° C. or lower. Since the drying temperature is not increased, the content of insoluble particle in water and polyesters can be well suppressed.

In the invention, it is also preferable to use an aluminum compound having an amount of water-insoluble substance in a concentration of 1000 ppm or lower in the case where 30 g of the aluminum compound is dissolved in 1500 ml of pure water.

The above-mentioned amount of insoluble substance in water is a value measured by evaluation in the following manner.

[Measurement of Amount of Water-Insoluble Substance of Aluminum Compound]

30 g of aluminum compound was added to 1500 ml of pure water at room temperature stirring at 200 rpm and continuously stirred for 6 hours. Successively, the solution temperature was raised to 95° C., and stirring was continued at the temperature further for 3 hours to dissolve the aluminum compound. The obtained solution was cooled until the temperature turned back to room temperature and filtered by membrane filter (cellulose acetate membrane filter, trade name: C020A047A, manufactured by Advantec) with pore diameter of 0.2 μm and washed with 50 ml of pure water. The obtained filter with which the insoluble substance was separated was dried by vacuum dryer at 60° C. for 12 hours to measure the insoluble substance weight (W). The water-insoluble substance of the aluminum compound with respect to water was calculated according to the following equation. In the case the aluminum compound is an aqueous solution, some of the aqueous solution was sampled, and evaporated and dried to measure the solid matter in the aqueous solution. The solid matter was regarded as the weight of the aluminum compound and the aluminum compound concentration in the aqueous solution was calculated and the aqueous solution in amount equivalent to 30 g of the aluminum compound in the aqueous solution was filtered to measure the weight of the insoluble substance of the aluminum compound. In the case of the aqueous solution, if the aluminum compound concentration in the aqueous solution was higher than 2% by weight, pure water was added so as to dilute the aluminum and adjust the concentration to be 2% by weight and then filtration was carried out. The dilution was carried out in the same conditions as those in the case of above-mentioned solid aluminum compound dissolution. The above-mentioned operation was carried out in a clean bench.

Insoluble substance (ppm)=[$W$(mg)/30000 (mg)]×$10^6$

The concentration of the water-insoluble substance is preferably 900 ppm or lower and more preferably 800 ppm or lower. In the case where the concentration of the water-insoluble substance exceeds 1000 ppm, the content of the insoluble particle in polyesters is increased and in the case where the polyester is molded in a molded article such as a film or a bottle, the haze of the molded article is undesirably got worse. Further, it leads to a problem that clogging of a filter is frequently caused at the time of filtration of the polyester in the polycondensation step and the molding step.

The main component of the above-mentioned water-insoluble substance is supposed to be gel compound of aluminum.

In the invention, a method for producing the aluminum compound with little water-insoluble substance is not particularly limited, however the above-mentioned production methods are preferable embodiments.

The mechanism that the content of the insoluble particle in polyesters is decreased by using the aluminum compound with little water-insoluble substance is not made clear, however it is supposed that formation of the insoluble particle in polyesters is suppressed since finely granular insoluble substance itself, which is water-insoluble component contained in a trace in the aluminum compound, is suppressed or deformation or agglomeration of the water-insoluble component nucleating into the insoluble particle in polyesters in the polycondensation process of the polyester is suppressed.

In the invention, it is also preferable to use a basic aluminum acetate having the following characteristics.

For example, it is important to use, as the basic aluminum acetate, a basic aluminum acetate having the maximum diffraction peak at 2θ (diffraction angle) of 14.0±0.1 degree in x-ray diffractiometry and 0.60 or wider full width at half maximum of the peak. The full width at half maximum is preferably 0.65 or wider and more preferably 0.70 or wider. If the full width at half maximum is 0.60, the content of the insoluble particle in water and polyesters is increased to cause the above-mentioned problems.

The above-mentioned full width at half maximum of the diffraction peak in the x-ray diffractiometry is a gauge of crystallinity of the basic aluminum acetate and as the full width at half maximum is narrower, the crystallinity becomes higher. It is supposed that the trace components insoluble in water and polyesters are increased in proportion to the crystallinity. Further, it is supposed that the water content of the basic aluminum acetate is lowered, the crystallinity becomes high.

It is preferable to use, as the basic aluminum acetate, a basic aluminum acetate having 1.8 or lower in an absorbance ratio T1 (=B/A) of the absorbance B having the absorption maximum at 3700±10 $cm^{-1}$ to the absorbance A having the absorption maximum at 1029±10 $cm^{-1}$. The absorbance ratio T1 is preferably 1.7 or lower and more preferably 1.6 or lower. If the absorbance ratio T1 exceeds 1.8, the amount of the insoluble particle in water and polyesters is increased to cause the above-mentioned problems.

[Infrared Absorptiometry (Measurement of Absorbance Ratio T1)]

The measurement is carried out by a transmission method. FTS-40 (main body)/UMA 300 (infrared microscope) manufactured by Bio-Rad laboratories, Inc. is used for measurement. A sample is prepared in a manner that the absorbance around 985 $cm^{-1}$ is adjusted to be 1.5 or lower and measurement is repeated 128 integrated times at resolution of 8 $cm^{-1}$. The absorption intensity measurement is carried out in the following manner. The base line of the absorption intensity at 3700 $cm^{-1}$ is determined by forming a line between both rim of the absorption. The base line of the absorption at 1029 $cm^{-1}$ is determined by forming a line between the rim in the higher frequency side of the absorption at 1060 $cm^{-1}$ and the rim in the lower frequency side of the absorption at 985 $cm^{-1}$. The ratio of the heights from the respective base lines to the peak tops of the absorption at 3700±10 $cm^{-1}$ and at 1029±10 $cm^{-1}$ is defined as the absorbance ratio T1 (B/A) of the absorbance B to A.

The absorption having the absorption maximum at 3700±10 $cm^{-1}$ is supposedly attributed to the crystal water in the basic aluminum acetate. Accordingly, the basic aluminum acetate with a little crystal water is preferable. In the case of simply adsorbed water, a broad absorption peak appears near 3600 $cm^{-1}$ and it is clearly distinguishable.

The mechanism that the amount of the insoluble particle in water and polyesters is decreased by using the basic aluminum acetate with a little crystal water is not made clear, however it is supposed that formation of the insoluble particle in water and polyesters is caused by components having the crystal water and contained in the basic aluminum acetate or the trace components relevant to components having the crystal water.

Further, it is preferable to use, as the basic aluminum acetate, a basic aluminum acetate having 1.0 or lower absorbance ratio T2 (=C/A) of the absorbance C having the absorption maximum at $1062\pm10$ cm$^{-1}$ to the absorbance A having the absorption maximum at $1029\pm10$ cm$^{-1}$. If the absorbance ratio T2 exceeds 1.0, the amount of the insoluble particle in water and polyesters is increased to cause the above-mentioned problems.

[Infrared Absorptiometry (Measurement of Absorbance Ratio T2)]

A sample for measurement is prepared by vacuum drying the basic aluminum acetate at room temperature over night. The measurement is carried out by a transmission method. FTS-40 (main body)/UMA 300 (infrared microscope) manufactured by Bio-Rad laboratories, Inc. is used for the measurement. A sample is prepared in a manner that the absorbance around 985 cm$^{-1}$ is adjusted to be 1.5 or lower and measurement is repeated 128 integrated times at resolution of 8 cm$^{-1}$. The absorption intensity measurement is carried out in the following manner. The base lines of the absorption intensity at 1062 cm$^{-1}$ and 1029 cm$^{-1}$ are determined by forming lines between the rim in the higher frequency side of the absorption at 1060 cm$^{-1}$ and the rim in the lower frequency side of the absorption at 985 cm$^{-1}$. The ratio of the heights from the respective base lines to the peak tops of the absorption at $1062\pm10$ cm$^{-1}$ and at $1029\pm10$ cm$^{-1}$ is defined as the absorbance ratio T2 (C/A) of the absorbance C to A.

The absorption band having the absorbance maximum at $1062\pm10$ cm$^{-1}$ is absorption attributed to the crystal in the basic aluminum acetate. At $1029\pm10$ cm$^{-1}$, the absorption is irrelevant to either crystal or amorphous. The absorbance ratio T2 (C/A) is a value deeply relevant to the crystallinity of the basic aluminum acetate and if the value is high, the apparent crystallinity degree is high and on the contrary, the value is low, it means the apparent crystallinity degree is low. Accordingly, if the basic aluminum acetate has a low crystallinity degree, it is easy to be dissolved in water and/or an organic solvent and therefore preferable and also it is preferable in terms of decrease of the insoluble particle.

In the invention, although the mechanism that the amount of the insoluble particle in polyesters is decreased by using the basic aluminum acetate with a low crystallinity degree is not made clear, because of the same reason as that of the crystallinity degree measured by the above-mentioned x-ray diffractiometry, it is supposed that formation of the insoluble particle in water and polyesters is caused by crystal component or a trace of associated components contained in aluminum.

It is preferable to use, as the basic aluminum acetate, a basic aluminum acetate containing 25 to 10000 ppm of sulfur atoms to aluminum atoms. The content of sulfur atoms is preferably 50 to 9000 ppm and more preferably 100 to 8000 ppm. If the content of sulfur atoms is lower than 25 ppm, the content of insoluble particle in water and polyesters is increased to cause the above-mentioned problems. On the contrary, if the content of sulfur atoms exceeds 10000 ppm, side reaction in the polycondensation process, for example, dehydration reaction of glycol component by itself, is caused to increase ether compound production and it results in undesirable deterioration of the physical properties of the polyester. For example, in the case of using ethylene glycol as the glycol component, diethylene glycol is produced and the melting point of the polyester into whose chain the diethylene glycol is introduced is lowered to worsen the heat resistance of the polyester. Further, the introduction of the ether bonds into the polyester leads to deterioration of the light stability of the polyester.

A method for satisfying the content of the sulfur atoms in the above-mentioned basic aluminum acetate may be a method of introducing sulfur atoms in form of sulfate ions, sulfite ions, hyposulfite ions, or a sulfonic acid ions such as methanesulfonic acid and p-toluenesulfonic acid. The ion group may be introduced in form of an acid or a salt. It is particularly preferable to introduce sulfur atoms in form of sulfuric acid, sulfonic acid or their aluminum salts. An introduction method of a sulfur-containing compound is not particularly limited and optional. For example, the introduction may be carried out in the process for producing basic aluminum acetate or by adding the compound at the time of preparing the basic aluminum acetate solution to be used in the process for producing a polyester.

Although the mechanism that the content of the insoluble particle in water and polyesters is lowered by increasing the content of the sulfur atoms in the above-mentioned basic aluminum acetate is not made clear, it is supposed that trace components which are contained in the basic aluminum acetate and produce insoluble particle in water and polyesters are deformed to have a structure soluble in water and polyesters by the sulfur atom containing component.

It is preferable to use, as the basic aluminum acetate, a basic aluminum acetate containing 25 to 10000 ppm of boron atoms to aluminum atoms. The content of boron atoms is preferably 50 to 9000 ppm and more preferably 100 to 8000 ppm. If the content of boron atoms is lower than 25 ppm, the content of insoluble particle in polyesters is increased to worsen the haze of a molded article in the case where the obtained polyester is molded into the molded article such as a film or a bottle and thus it is not preferable. Further, it leads to a problem that clogging of a filter is frequently caused at the time of filtration of the polyester in the polycondensation step and the molding step. On the contrary, if the content of boron atoms exceeds 10000 ppm, side reaction in the polycondensation step, for example, dehydration reaction of glycol component by itself, is caused to increase ether compound production and it results in undesirable deterioration of the physical properties of the polyester. For example, in the case of using ethylene glycol as the glycol component, diethylene glycol is produced and the melting point of the polyester into whose chain the diethylene glycol is introduced is lowered to worsen the heat resistance of the polyester. Further, the introduction of the ether bonds into the polyester leads to deterioration of the light stability of the polyester.

In the invention, a method for satisfying the content of the boron atoms in the above-mentioned basic aluminum acetate is preferably a method of introducing boron atoms in form of borate ions, hypoborate ions, or metaboric acid ions. The ion group may be introduced in form of an acid or a salt.

It is particularly preferable to introduce boron atoms in form of boric acid or aluminum borate. An introduction method of a boron-containing compound is not particularly limited and optional. For example, the introduction may be carried out in the process for producing basic aluminum acetate or by adding the compound at the time of preparing the basic aluminum acetate solution to be used in the process for producing a polyester.

Although the mechanism that the content of the insoluble particle in water and polyesters is lowered by increasing the content of the boron atoms in the above-mentioned basic aluminum acetate is not made clear, it is supposed that trace components which are contained in the basic aluminum acetate and produce insoluble particle in water and polyesters are deformed to have a structure soluble in water and polyesters by the boron atom-containing component.

In the invention, it is preferable to use the basic aluminum acetate having the above-mentioned characteristics, however it is not limited. Another water-soluble aluminum compound may be used. Further, it is also possible to obtain an aqueous solution having the above-mentioned absorbance characteristics by using a product which does not satisfy the absorbance in form of the aqueous aluminum compound solution and removing the water-insoluble components by filtration, centrifugation, or ultra-high speed centrifugation separation method after the aluminum compound is made to be an aqueous solution.

It is preferable that the aluminum compound of the invention is added to a polycondensation system of the polyester while being dissolved in water and/or an organic solvent before the aluminum compound is added to the polycondensation system of the polyester. The organic solvent to be used is preferably glycols and in the case of producing PET, ethylene glycol is preferable to be used.

To produce the solution of the invention in which the aluminum compound is dissolved in water and/or an organic solvent, it is preferable to use a solution in which the aluminum compound is previously dissolved in water. It is preferable to add organic solvent to the aqueous solution if necessary. The aqueous solution may be added to the polycondensation system as it is, to moderate the heat shock at the time of addition, it is preferable to add the above-mentioned aqueous solution diluted with diols such as ethylene glycol to the polycondensation system or add the aqueous solution diluted with diols and subjected to liquid-liquid exchange for removing water to the polycondensation system.

In the case where the aqueous aluminum compound solution is to be diluted with diols such as ethylene glycol, it is preferable to dilute with diols in an amount of 0.5 to 50 times as much as that of water by volume. If the concentration of the aluminum compound in the solution to be added the polycondensation system is adjusted to be 0.01 to 1 mol/L on the basis of aluminum element, formation of the insoluble particle in a polyester to be formed is particularly suppressed and therefore, it is preferable.

Since solubility or the stability of the solution is improved by adding a stabilizer for boric acid or an acid such as citric acid, lactic acid, and oxalic acid when the aluminum compound is dissolved in water and/or an organic solvent or to the solution in which the aluminum compound is dissolved, it is preferable to use such a compound in combination.

Hereinafter, a preparation method of the aluminum compound solution to be used in the invention will be described using basic aluminum acetate. Water is added to the basic aluminum acetate and stirred at room temperature for several hours or longer. The stirring time is preferably 12 hours or longer. After that, the resulting solution is stirred at 60° C. or higher for several hours. In this case, the temperature is preferably from 60 to 80° C. The stirring time is preferably 3 hours or longer. The concentration of the aqueous solution is preferably from 5 g/L to 100 g/L and more preferably from 10 g/L to 30 g/L. In the method, it is preferable to use the basic aluminum acetate whose absorbance is previously measured by the absorptiometry of an aqueous aluminum compound to find the basic aluminum acetate satisfy the absorbance within the scope of the invention. On the other hand, it may be confirmed that the absorbance is within a scope of the invention in the following steps of refining the aqueous solution obtained by dissolving the basic aluminum acetate in the above-mentioned by filtration or ultra high speed centrifugation separation to remove the insoluble particle in water; sampling a portion of the refined solution; drying the sampled solution by freeze-drying method to obtain solid matter; dissolving the obtained solid matter again in pure water; and then measuring the absorbance of the obtained solution.

Ethylene glycol is added to the above-mentioned aqueous solution. The amount of ethylene glycol to be added is preferably 1 to 5 times as much as that of water by volume and more preferably 2 to 3 times as much. The solution is stirred at room temperature for several hours to obtain an even water/ethylene glycol solution. Thereafter, the solution is heated to remove water and obtain an ethylene glycol solution. The temperature is preferably 80° C. or higher and 120° C. or lower. Water is more preferably removed by stirring at a temperature from 90 to 110° C. for several hours.

Hereinafter, practical examples of the preparation method of an ethylene glycol solution of aluminum lactate will be described. An aqueous solution of aluminum lactate is produced. The production may be carried out at room temperature or in heating condition and preferably at room temperature. The concentration of the aqueous solution is preferably in a range from 20 g/L to 100 g/L and particularly preferably in a range from 50 to 80 g/L. Ethylene glycol is added to the aqueous solution. The addition amount by volume of ethylene glycol is 1 to 5 times, more preferably 2 to 3 times, as much as that of the aqueous solution. After the solution is stirred at room temperature to obtain homogeneous water/ethylene glycol mixed solution, the solution is heated to distill water and accordingly obtain an ethylene glycol solution. The temperature is preferably 80° C. or higher and 120° C. or lower, more preferably 90 to 110° C., for a few hours to distill water while stirring. The absorbance evaluation may be carried out as described in description of the preparation method of the above-mentioned basic aluminum acetate solution.

The use amount of an aluminum compound in producing a polyester according to the method of the present inventions is preferably 0.001 to 0.05% by mole as aluminum atom and more preferably 0.005 to 0.02% by mole to the number of moles of all of the constituent units of carboxylic acid components such as a dicarboxylic acid and a polycarboxylic acid of the polyester to be obtained. If the use amount is less than 0.001% by mole, the catalytic activity cannot be sometimes exhibited sufficiently and if the use amount exceeds 0.05% by mole, the heat stability and thermooxidation stability may possibly be lowered and formation of insoluble particles and discoloration of polyester attributed to aluminum may be increased in some cases. As described, the present inventions are particularly characterized in that even if the addition amount of an aluminum component is low, the polymerization catalyst of the present inventions shows sufficient catalytic activity. As a result, heat stability and thermooxidation stability are made excellent and insoluble particles and discoloration of polyester attributed to aluminum can be lowered.

In the invention, at least one kind phosphorus compound is preferable to be used in combination with the above-mentioned aluminum compound as the polycondensation catalyst. Combination use of the phosphorus compound is sometimes effective to increase the polycondensation catalyst activity, suppress the side reaction such as discoloration of a polyester, or suppress the formation of the insoluble particle in a polyester as compared with the case of a system of using the aluminum compound alone.

The phosphorus compound is not particularly limited, however it is preferable to use phosphonic acid compounds, phosphinic acid compounds, phosphine oxide compounds, phosphonous acid compounds, phosphinous acid compounds, and phosphine compounds.

The phosphonic acid compounds, phosphinic acid compounds, phosphine oxide compounds, phosphonous acid compounds, phosphinous acid compounds, and phosphine compounds in the invention are compounds respectively having the following structures defined by the following formulas (1) to (6).

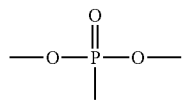
(Formula 1)

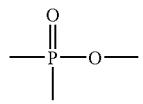
(Formula 2)

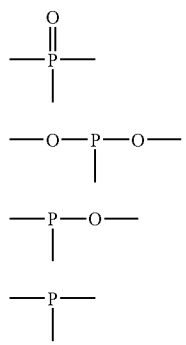
(Formula 3)

(Formula 4)

(Formula 5)

(Formula 6)

The phosphonic acid compounds in the present inventions may include dimethyl methylphosphonate, diphenyl methylphosphonate, dimethyl phenylphosphonate, diethyl phenylphosphonate, diphenyl phenylphosphonate, dimethyl benzylphosphonate, and diethyl benzylphosphonate. The phosphinic acid compounds in the present inventions may include diphenylphosphinic acid, methyl diphenylphosphinate, phenyl diphenylphosphinate, phenylphosphinic acid, methyl phenylphosphinate, and phenyl phenylphosphinate. The phosphine oxide compounds in the present inventions may include diphenylphosphine oxide, methyldiphenylphosphine oxide, and triphenylphosphine oxide.

As phosphorus compounds in the present inventions among the phosphinic acid compounds, phosphine oxide compounds, phosphonous acid compounds, phosphinous acid compounds, and phosphine compounds, the following compounds defined by the following formulas (Formula 7) to (Formula 12) are preferable.

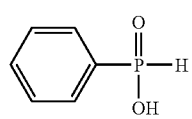
(Formula 7)

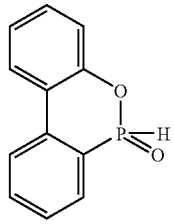
(Formula 8)

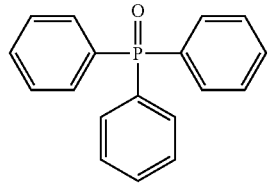
(Formula 9)

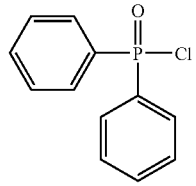
(Formula 10)

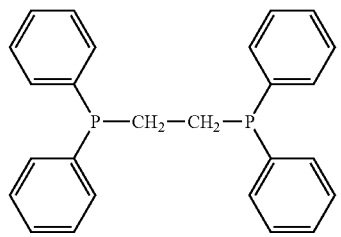
(Formula 11)

[(CH₃)(CH₂)₇]₃P (Formula 12)

Among the above-mentioned phosphorus compounds, use of compounds having aromatic ring structure is preferable, since the effect of the physical property improvement and the effect of the catalytic activity improvement become considerably significant.

Also, use of the compounds defined by the following general formulas (Formula 13) to (Formula 15) is preferable as the phosphorus compounds of the invention, since the effect of the physical property improvement and the effect of the catalytic activity improvement become particularly significant.

$P(=O)R^1(OR^2)(OR^3)$ (Formula 13)

$P(=O)R^1R^4(OR^2)$ (Formula 14)

$P(=O)R^1R^5R^6$ (Formula 15)

(In the formulas (Formula 13) to (Formula 15), $R^1$, $R^4$, $R^5$, and $R^6$ independently denote hydrogen, a hydrocarbon group of 1 to 50 carbon atoms, or a hydrocarbon group of 1 to 50 carbon atoms containing hydroxyl, a halogen group, an alkoxyl group, or an amino group. $R^2$ and $R^3$ independently denote hydrogen, a hydrocarbon group of 1 to 50 carbon atoms, or a hydrocarbon group of 1 to 50 carbon atoms containing hydroxyl group or an alkoxyl group. Herein, hydrocarbon group may include alicyclic structure such as cyclohexyl and aromatic ring structure such as phenyl and naphthyl.)

The phosphorus compounds of the present inventions are particularly preferable to be compounds having aromatic ring structure for $R^1$, $R^4$, $R^5$, and $R^6$ in the above-mentioned formulas (Formula 13) to (Formula 15).

The phosphorus compounds of the present inventions may include dimethyl methylphosphonate, diphenyl methylphosphonate, dimethyl phenylphosphonate, diethyl phenylphosphonate, diphenyl phenylphosphonate, dimethyl benzylphosphonate, diethyl benzylphosphonate, diphenylphosphinic acid, methyl diphenylphosphinate, phenyl diphenylphosphinate, phenylphosphinic acid, methyl phenylphosphinate, phenyl phenylphosphinate, diphenylphosphine oxide, methyldiphenylphosphine oxide, and triphenylphosphine oxide. Among them, dimethyl phenylphosphonate and diethyl benzylphosphonate are particularly preferable.

In the present inventions, metal salt compounds of phosphorus as the phosphorous compounds among the above-mentioned phosphorus compounds are particularly preferable. The metal salt compounds of phosphorus are not particularly limited, if they are metal salts of phosphorus compounds. Use of metal salts of phosphonic acid compounds is preferable, since the effect of the physical property improvement of polyesters and the effect of the catalytic activity improvement, which are the purposes of the present inventions, become significant. The metal salts of phosphorus compounds include nonometal salt, dimetal salt, and trimetal salt, and the like.

Among the above-mentioned phosphorus compounds, use of those in which the metal portions of the metal salt are selected from Li, Na, K, Be, Mg, Sr, Ba, Mn, Ni, Cu, and Zn is preferable, since the effect of the catalytic activity improvement becomes significant. Li, Na, and Mg are particularly preferable among them.

As the metal salt compounds of phosphorus of the present inventions, at least one selected from the compounds defined by the following general formula (Formula 16) is preferable, since the effect of the physical property improvement and the effect of the catalytic activity improvement become significant.

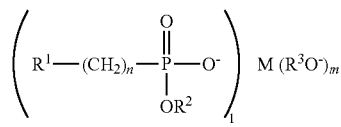

(Formula 16)

(In the formula (Formula 16), $R^1$ denotes hydrogen, a hydrocarbon group of 1 to 50 carbon atoms, or a hydrocarbon group of 1 to 50 carbon atoms containing hydroxyl group, a halogen group, an alkoxyl group, or an amino group. $R^2$ denotes hydrogen, a hydrocarbon group of 1 to 50 carbon atoms, or a hydrocarbon group of 1 to 50 carbon atoms containing hydroxyl group or an alkoxyl group. $R^3$ denotes hydrogen, a hydrocarbon group of 1 to 50 carbon atoms, or a hydrocarbon group of 1 to 50 carbon atoms containing hydroxyl group, an alkoxyl group, or a carbonyl group. The reference character 1 denotes an integer of 1 or higher; m denotes 0 or an integer of 1 or higher; and 1+m is 4 or lower. M denotes a metal cation with (1+m) valence. The reference character n denotes an integer of 1 or higher. Herein, the hydrocarbon group may include alicyclic structure such as cyclohexyl, branched structure and aromatic ring structure such as phenyl and naphthyl.)

Examples of the above-mentioned $R^1$ may be phenyl, 1-naphthyl, 2-naphthyl, 9-anthryl, 4-biphenyl, and 2-biphenyl. Examples of the above-mentioned $R^2$ may be hydrogen, methyl, ethyl, propyl, isopropyl, n-butyl, sec-butyl, tert-butyl, a long chain aliphatic group, phenyl, naphthyl, substituted phenyl and naphthyl, and a group defined as —$CH_2CH_2OH$. Examples of $R^3O^-$ may be hydroxide ion, alcoholate ion, acetate ion, and acetylacetone ion.

At least one selected from the compounds defined by the following general formula (Formula 17) is preferable to be used among the compounds defined by the above-mentioned general formula (Formula 16).

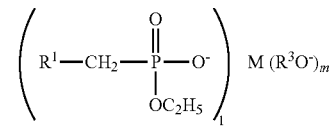

(Formula 17)

(In the formula (Formula 17), $R^1$ denotes hydrogen, a hydrocarbon group of 1 to 50 carbon atoms, or a hydrocarbon group of 1 to 50 carbon atoms containing hydroxyl group, a halogen group, an alkoxyl group, or an amino group. $R^3$ denotes hydrogen, a hydrocarbon group of 1 to 50 carbon atoms, or a hydrocarbon group of 1 to 50 carbon atoms containing hydroxyl group, an alkoxyl group, or a carbonyl group. The reference character 1 denotes an integer of 1 or higher; m denotes 0 or an integer of 1 or higher; and 1+m is 4 or lower. M denotes a metal cation with (1+m) valence. The hydrocarbon group may include alicyclic structure such as cyclohexyl, branched structure and aromatic ring structure such as phenyl and naphthyl.)

Examples of the above-mentioned $R^1$ may be phenyl, 1-naphthyl, 2-naphthyl, 9-anthryl, 4-biphenyl, and 2-biphenyl. Examples of $R^3O^-$ may be hydroxide ion, alcoholate ion, acetate ion, and acetylacetone ion.

Among the above-mentioned phosphorus compounds, use of compounds having aromatic ring structure is preferable, since the effect of the physical property improvement and the effect of the catalytic activity improvement become significant.

By using compounds having a metal for M selected from Li, Na, K, Be, Mg, Sr, Ba, Mn, Ni, Cu, and Zn among the compounds defined by the formulas (Formula 17), the effect of the catalytic activity improvement is significant and therefore, it is preferable. Among the metals are Li, Na, and Mg particularly preferable.

Examples of the metal salt compounds of phosphorus of the present inventions are lithium[ethyl(1-naphthyl)methylphosphonate], sodium[ethyl(1-naphthyl)methylphosphonate], magnesium bis[ethyl(1-naphthyl)methylphosphonate], potassium[ethyl (2-naphthyl)methylphosphonate], magnesium bis[ethyl (2-naphthyl)methylphosphonate], lithium[ethyl benzylphosphonate], sodium[ethyl benzylphosphonate], magnesium bis[ethyl benzylphosphonate], beryllium bis[ethyl benzylphosphonate], strontium bis[ethyl benzylphosphonate], manganese bis[ethyl benzylphosphonate], sodium benzylphosphonate, magnesium bis[benzylphosphonate], sodium [ethyl (9-anthryl)methylphosphonate], magnesium bis[ethyl (9-anthryl)methylphosphonate], sodium[ethyl 4-hydroxybenzylphosphonate], magnesium bis [ethyl 4-hydroxybenzylphosphonate], sodium[phenyl 4-chlorobenzylphosphonate], magnesium bis[ethyl 4-chlorobenzylphosphonate], sodium[methyl 4-aminobenzylphosphonate], magnesium bis[methyl 4-aminobenzylphosphonate], sodium phenylphosphonate, magnesium bis[ethyl phenylphosphonate], and zinc bis[ethyl phenylphosphonate]. Particularly preferable compounds among them are lithium [ethyl (1-naphthyl)methylphosphonate], sodium[ethyl (1-naphthyl)methylphosphonate], magnesium bis[ethyl (1-naphthyl)methylphosphonate], lithium[ethyl benzylphosphonate], sodium[ethyl benzylphosphonate], magnesium bis[ethyl benzylphosphonate], sodium benzylphosphonate, and magnesium bis[benzylphosphonate].

In the present inventions, among the above-mentioned phosphorus compounds, phosphorus compounds having at least one P—OH bond are particularly preferable as the phosphorus compounds. Addition of these phosphorus compounds improves the effect of improving physical properties of polyesters and in addition, the effect of improving the catalytic activity is considerably heightened by using these phosphorus compounds in combination with the aluminum compounds of the present inventions at the time of polymerization of polyester.

The phosphorus compounds having at least one P—OH bond are not particularly limited as long as they are phosphorus compound having at least one P—OH in a molecule. Use of phosphonic acid compounds having at least one P—OH bond among these phosphorus compounds is preferable, since the effect of the physical property improvement of polyesters and the effect of the catalytic activity improvement become significant.

Use of compounds having aromatic ring structure among these phosphorus compounds is preferable, since the effect of the physical property improvement and the effect of the catalytic activity improvement become significant.

Use of at least one selected from the compounds defined by the following general formula (Formula 18) is preferable as phosphorus compounds having at least one P—OH bond of the present inventions, since the effect of the physical property improvement and the effect of the catalytic activity improvement become significant.

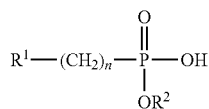
(Formula 18)

(In the formula (Formula 18), $R^1$ denotes hydrogen, a hydrocarbon group of 1 to 50 carbon atoms, or a hydrocarbon group of 1 to 50 carbon atoms containing hydroxyl group, a halogen group, an alkoxyl group, or an amino group. $R^2$ denotes hydrogen, a hydrocarbon group of 1 to 50 carbon atoms, or a hydrocarbon group of 1 to 50 carbon atoms containing hydroxyl group or an alkoxyl group. The reference character n denotes an integer of 1 or higher. Herein, the hydrocarbon group may include alicyclic structure such as cyclohexyl, branched structure, and aromatic ring structure such as phenyl and naphthyl.)

Examples of the above-mentioned $R^1$ may be phenyl, 1-naphthyl, 2-naphthyl, 9-anthryl, 4-biphenyl, and 2-biphenyl. Examples of the above-mentioned $R^2$ may be hydrogen, methyl, ethyl, propyl, isopropyl, n-butyl, sec-butyl, tert-butyl, a long chain aliphatic group, phenyl, naphthyl, substituted phenyl and naphthyl, and a group defined as —CH$_2$CH$_2$OH.

Use of compounds having aromatic ring structure among these phosphorus compounds is preferable, since the effect of the physical property improvement and the effect of the catalytic activity improvement become significant.

Examples of phosphorus compounds having at least one P—OH bond may be ethyl (1-naphthyl)methylphosphonate, (1-naphthyl)methylphosphonic acid, ethyl (2-naphthyl)methylphosphonate, ethyl benzylphosphonate, benzylphosphonic acid, ethyl (9-anthryl)methylphosphonate, ethyl 4-hydroxybenzylphosphonate, ethyl 2-methylbenzylphosphonate, phenyl 4-chlorobenzylphosphonate, methyl 4-aminobenzylphosphonate, and ethyl 4-methoxybenzylphosphonate. Among them are ethyl (1-naphthyl)methylphosphonate and ethyl benzylphosphonate particularly preferable.

Phosphorus compounds defined by the following chemical formula (Formula 19) are exemplified as preferable phosphorus compounds of the present inventions.

(Formula 19)

(In the formula (Formula 19), $R^1$ denotes a hydrocarbon group of 1 to 49 carbon atoms, or a hydrocarbon group of 1 to 49 carbon atoms containing hydroxyl group, a halogen group, an alkoxyl group, or an amino group. $R^2$ and $R^3$ independently denote hydrogen, a hydrocarbon group of 1 to 50 carbon atoms, or a hydrocarbon group of 1 to 50 carbon atoms containing hydroxyl group or an alkoxyl group. The hydrocarbon group may include alicyclic structure, branched structure, and aromatic ring structure.)

Further preferable compounds are those having aromatic ring structure for at least one of $R^1$, $R^2$, and $R^3$ in the chemical formula (Formula 19).

Practical examples of the phosphorus compounds are as follows.

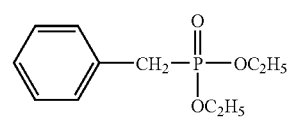
(Formula 20)

BPADE

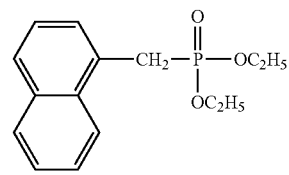
(Formula 21)

NMPA

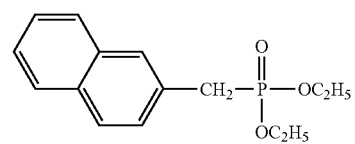
(Formula 22)

2-NMPA

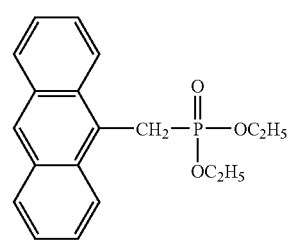
(Formula 23)

AMPA

-continued

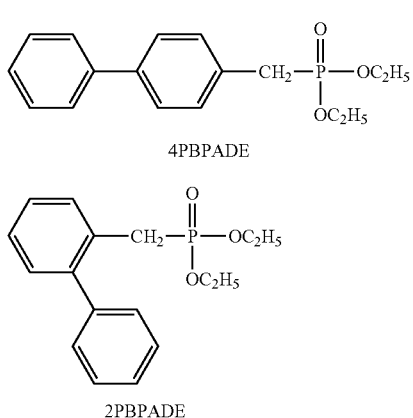

4PBPADE (Formula 24)

2PBPADE (Formula 25)

Also, the phosphorus compounds of the present inventions are preferably those having a high molecular weight as they are hard to be distilled in polymerization and thus effective.

The phosphorus compounds of the present inventions are preferably phosphorus compounds having a phenol portion within molecule. By use of the phosphorus compounds have a phenol portion within molecule, the effect of the physical property improvement of polyesters is heightened. In addition, by use of the phosphorus compounds having a phenol portion within molecule are used in polymerization of polyester, the effect of the catalytic activity improvement is more heightened and therefore, these compounds are excellent in the productivity of polyesters.

The phosphorus compounds having a phenol portion within molecule are not particularly limited as long as they are phosphorus compounds having phenol structure. Use of one or more compounds selected from a group consisting of phosphonic acid compounds, phosphinic acid compounds, phosphine oxide compounds, phosphonous acid compounds, phosphinous acid compounds, and phosphine compounds having a phenol portion within molecule is preferable, since the effect of the physical property improvement of polyester and the effect of the catalytic activity improvement become considerably significant. Among them, use of phosphonic acid compounds having one or more phenol portions within molecule is preferable, since the effect of the physical property improvement of polyester and the effect of the catalytic activity improvement become considerably significant.

Compounds defined by the following general formulas (Formula 26) to (Formula 28) are preferable as the phosphorus compounds having the phenol portion within molecule of the present inventions.

$P(=O)R^1(OR^2)(OR^3)$ (Formula 26)

$P(=O)R^1R^4(OR^2)$ (Formula 27)

$P(=O)R^1R^5R^6$ (Formula 28)

(In the formulae (Formula 26) to (Formula 28), $R^1$ denotes a hydrocarbon group of 1 to 50 carbon atoms and including phenol portion, or a hydrocarbon group of 1 to 50 carbon atoms containing substituent group such as hydroxyl group, a halogen group, an alkoxyl group, or an amino group as well as phenol portion. $R^4$, $R^5$, and $R^6$ independently denote hydrogen, a hydrocarbon group of 1 to 50 carbon atoms, or a hydrocarbon group of 1 to 50 carbon atoms containing substituent group such as hydroxyl group, halogen group, an alkoxyl group, or an amino group. $R^2$ and $R^3$ independently denote hydrogen, a hydrocarbon group of 1 to 50 carbon atoms, or a hydrocarbon group of 1 to 50 carbon atoms containing substituent group such as hydroxyl group or an alkoxyl group. The hydrocarbon group may include branched structure, alicyclic structure such as cyclohexyl, and aromatic ring structure such as phenyl and naphthyl. Terminals of $R^2$ and $R^4$ may be bonded to each other.)

Examples of the phosphorus compounds having phenol portion within molecule of the present inventions may include p-hydroxyphenylphosphonic acid, dimethyl p-hydroxyphenylphosphonate, diethyl p-hydroxyphenylphosphonate, diphenyl p-hydroxyphenylphosphonate, bis(p-hydroxyphenyl)phosphinic acid, methyl bis(p-hydroxyphenyl)phosphinate, phenyl bis(p-hydroxyphenyl)phosphinate, p-hydroxyphenylphenylphosphinic acid, methyl p-hydroxyphenylphenylphosphinate, phenyl p-hydroxyphenylphenylphosphinate, p-hydroxyphenylphosphinic acid, methyl p-hydroxyphenylphosphinate, phenyl p-hydroxyphenylphosphinate, bis(p-hydroxyphenyl)phosphine oxide, tris (p-hydroxyphenyl)phosphine oxide, bis(p-hydroxyphenyl) methylphosphine oxide, and compounds defined by the following formulae (Formula 29) to (Formula 32). Among them, compounds defined by the following formula (Formula 31) and dimethyl p-hydroxyphenylphosphonate are particularly preferable.

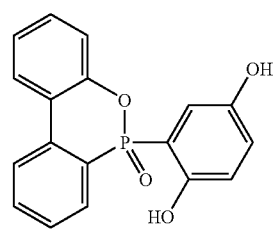

(Formula 29)

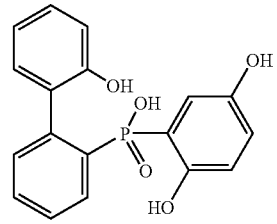

(Formula 30)

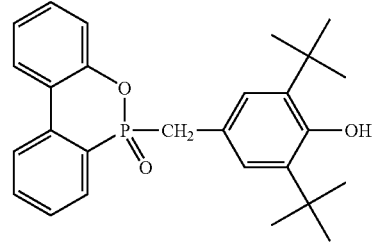

(Formula 31)

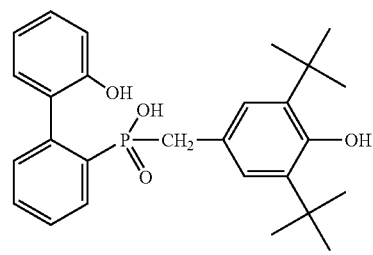

(Formula 32)

Usable compounds defined by the formula (Formula 31) may include SANKO-220 (manufactured by SANKO Co., Ltd.).

At least one compound selected from the specified metal salt compounds of phosphorus defined by the following general formula (Formula 33) is particularly preferable among the phosphorus compounds having phenol portion within molecule of the present inventions.

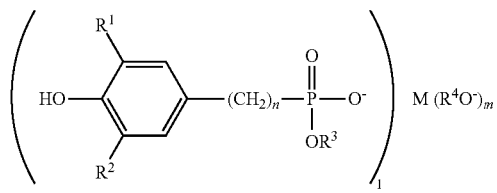

(Formula 33)

(In the formula (Formula 33), $R^1$ and $R^2$ independently denote hydrogen and a hydrocarbon group of 1 to 30 carbon atoms. $R^3$ denotes hydrogen, a hydrocarbon group of 1 to 50 carbon atoms, or a hydrocarbon group of 1 to 50 carbon atoms containing hydroxyl group or an alkoxyl group. $R^4$ denotes hydrogen, a hydrocarbon group of 1 to 50 carbon atoms, or a hydrocarbon group of 1 to 50 carbon atoms containing hydroxyl group, an alkoxyl group, or a carbonyl group. $R^4O^-$ includes hydroxide ion, alcoholate ion, acetate ion, or acetylacetone ion. The reference character 1 denotes an integer of 1 or higher; m denotes 0 or an integer of 1 or higher; and 1+m is 4 or lower. M denotes a metal cation with (1+m) valence. The reference character n denotes an integer of 1 or higher. The hydrocarbon group may include alicyclic structure such as cyclohexyl, branched structure, and aromatic ring structure such as phenyl and naphthyl.)

Among these compounds at least one compound selected from compounds defined by the following formula (Formula 34) is preferable.

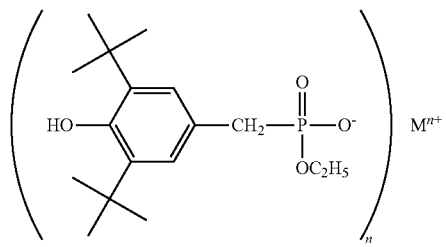

(Formula 34)

(In the formula [Formula 34], $M^{n+}$ denotes a metal cation with n-valence. The reference character n denotes 1, 2, 3, or 4.)

Use of compounds having a metal for M selected from Li, Na, K, Be, Mg, Sr, Ba, Mn, Ni, Cu, and Zn among the compounds defined by the formulas (Formula 33) and (Formula 34) is preferable, since the effect of the catalytic activity improvement is significant. Among the metals, Li, Na, and Mg particularly are preferable.

Examples of the specified metal salt compounds of phosphorus of the present inventions include lithium[ethyl 3,5-di-tert-butyl-4-hydroxybenzylphosphonate], sodium[ethyl 3,5-di-tert-butyl-4-hydroxybenzylphosphonate], sodium[3,5-di-tert-butyl-4-hydroxybenzylphosphonic acid], potassium [ethyl 3,5-di-tert-butyl-4-hydroxybenzlyphosphonate], magnesium bis[ethyl 3,5-di-tert-butyl-4-hydroxybenzylphosphonate], magnesium bis[3,5-di-tert-butyl-4-hydroxybenzylphosphonic acid], beryllium bis[methyl 3,5-di-tert-butyl-4-hydroxybenzylphosphonate], strontium bis[ethyl 3,5-di-tert-butyl-4-hydroxybenzylphosphonate], barium bis[phenyl 3,5-di-tert-butyl-4-hydroxybenzylphosphonate], manganese bis[ethyl 3,5-di-tert-butyl-4-hydroxybenzylphosphonate], nickel bis[ethyl 3,5-di-tert-butyl-4-hydroxybenzylphosphonate], copper bis[ethyl 3,5-di-tert-butyl-4-hydroxybenzylphosphonate], and zinc bis[ethyl 3,5-di-tert-butyl-4-hydroxybenzylphosphonate]. Among them lithium[ethyl 3,5-di-tert-butyl-4-hydroxybenzylphosphonate], sodium[ethyl 3,5-di-tert-butyl-4-hydroxybenzylphosphonate], and magnesium bis[ethyl 3,5-di-tert-butyl-4-hydroxybenzylphosphonate] particularly are preferable.

At least one compound selected from specified phosphorus compounds having at least one P—OH bond and defined by the following general formula (Formula 35) having at least one P—OH bond is particularly preferable among the phosphorus compounds having phenol portion within molecule of the present inventions.

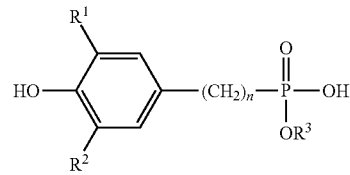

(Formula 35)

(In the formula (Formula 35), $R^1$ and $R^2$ independently denote hydrogen or a hydrocarbon group of 1 to 30 carbon atoms. $R^3$ denotes hydrogen, a hydrocarbon group of 1 to 50 carbon atoms, or a hydrocarbon group of 1 to 50 carbon atoms containing hydroxyl group or an alkoxyl group. The reference character n denotes an integer of 1 or higher. The hydrocarbon group may include alicyclic structure such as cyclohexyl, branched structure, and aromatic ring structure such as phenyl and naphthyl.)

At least one compound selected from compounds defined by the following general formula (Formula 36) is particularly preferable among these compounds.

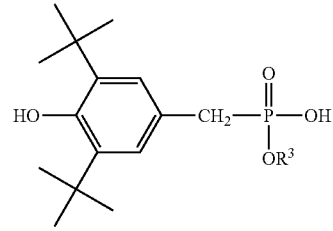

(Formula 36)

(In the formula (Formula 36), $R^3$ denotes hydrogen and a hydrocarbon group of 1 to 50 carbon atoms, or a hydrocarbon group of 1 to 50 carbon atoms containing hydroxyl group or an alkoxyl group. The hydrocarbon group may include alicyclic structure such as cyclohexyl, branched structure, and aromatic ring structure such as phenyl and naphthyl.)

Examples of groups denoted by $R^3$ are hydrogen, methyl, ethyl, propyl, isopropyl, n-butyl, sec-butyl, tert-butyl, a long chain aliphatic group, phenyl, naphthyl, substituted phenyl and naphthyl, and a group defined as —CH$_2$CH$_2$OH.

The specified phosphorus compounds having at least one P—OH bond of the present inventions may include ethyl 3,5-di-tert-butyl-4-hydroxybenzylphosphonate, methyl 3,5-di-tert-butyl-4-hydroxybenzylphosphonate, isopropyl 3,5-di-tert-butyl-4-hydroxybenzylphosphonate, phenyl 3,5-di-tert-butyl-4-hydroxybenzylphosphonate, octadecyl 3,5-di-tert-butyl-4-hydroxybenzylphosphonate, and 3,5-di-tert-butyl-4-hydroxybenzylphosphonic acid. Among them ethyl 3,5-di-tert-butyl-4-hydroxybenzylphosphonate and methyl 3,5-di-tert-butyl-4-hydroxybenzylphosphonate particularly are preferable.

At least one phosphorus compound selected from specified phosphorus compounds defined by the following general formula (Formula 37) is particularly preferable among the phosphorus compounds having phenol portion within molecule of the present inventions.

chain aliphatic groups such as octadecyl; aromatic groups such as phenyl and naphthyl, substituted phenyl and naphthyl, and a group defined as —CH$_2$CH$_2$OH.

Examples of the specified phosphorus compounds of the present inventions may include diisopropyl 3,5-di-tert-butyl-4-hydroxybenzylphosphonate, di-n-butyl 3,5-di-tert-butyl-4-hydroxybenzylphosphonate, dioctadecyl 3,5-di-tert-butyl-4-hydroxybenzylphosphonate, and diphenyl 3,5-di-tert-butyl-4-hydroxybenzylphosphonate. Among them dioctadecyl 3,5-di-tert-butyl-4-hydroxybenzylphosphonate and diphenyl 3,5-di-tert-butyl-4-hydroxybenzylphosphonate particularly are preferable.

At least one phosphorus compound selected from compounds defined by the following general formulas (Formula 39) and (Formula 40) is particularly preferable among the phosphorus compounds having phenol portion within molecule of the present inventions.

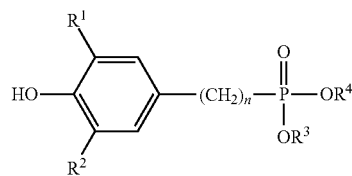

(Formula 37)

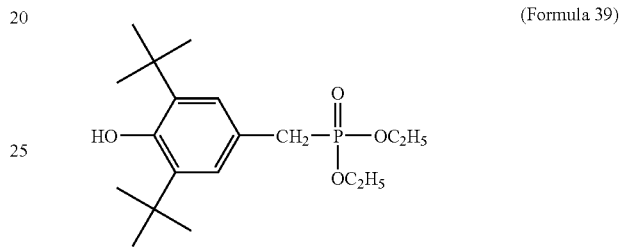

(Formula 39)

(In the formula (Formula 37), R$^1$ and R$^2$ independently denote hydrogen or a hydrocarbon group of 1 to 30 carbon atoms. R$^3$ and R$^4$ independently denote hydrogen, a hydrocarbon group of 1 to 50 carbon atoms, or a hydrocarbon group of 1 to 50 carbon atoms containing hydroxyl group or an alkoxyl group. The reference character n denotes an integer of 1 or higher. The hydrocarbon group may include alicyclic structure such as cyclohexyl, branched structure, and aromatic ring structure such as phenyl and naphthyl.)

Use of at least one compound selected from compounds defined by the following general formula (Formula 38) among those compounds defined by the formula (Formula 37) is preferable, since the effect of the physical property improvement of polyester and the effect of the catalytic activity improvement become considerably significant.

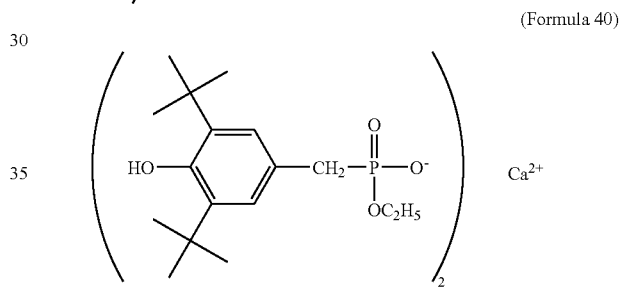

(Formula 40)

Irganox 1222 (manufactured by Ciba Specialty Chemicals K.K.) is commercialized as a compound defined by the above-mentioned chemical formula (Formula 39) and Irganox 1425 (manufactured by Ciba Specialty Chemicals K.K.) is commercialized as a compound defined by the above-mentioned chemical formula (Formula 40) and both are usable.

Examples of other phosphorus compounds to be used in the invention are phosphonic acid type compounds having the bonding group (X) and defined by the following formulas (Formula 41) and (Formula 42) or phosphonic acid type compounds having no bonding group (X) and defined by the following formula (Formula 43).

Examples of the phosphonic acid type compounds having the bonding group (X) and defined by the following formulas (Formula 41) are the following.

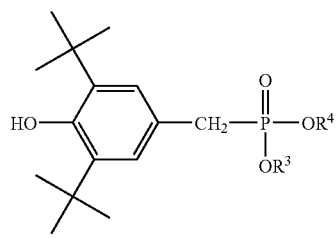

(Formula 38)

R$^1$—X—(P=O)(OR$^2$)(OR$^3$)  (Formula 41)

(In the formula (Formula 38), R$^3$ and R$^4$ independently denote hydrogen, a hydrocarbon group of 1 to 50 carbon atoms, or a hydrocarbon group of 1 to 50 carbon atoms containing hydroxyl group or an alkoxyl group. The hydrocarbon group may include alicyclic structure such as cyclohexyl, branched structure, and aromatic ring structure such as phenyl and naphthyl.)

Examples of groups denoted by R$^3$ and R$^4$ are hydrogen, short chain aliphatic groups such as methyl and butyl; long (In the chemical formula (Formula 41) having the bonding group, R$^1$ denotes an aromatic ring structure having 6 to 50 carbon atoms or a heterocyclic structure having 4 to 50 carbon atoms and the aromatic ring structure or the heterocyclic structure may have substituent groups. X denotes the bonding group and may be selected from an aliphatic hydrocarbon (including straight chain, branched, or alicyclic structure) having 1 to 10 carbon atoms, a substituted aliphatic hydrocarbon (including a straight chain, branched, or alicyclic structure) having 1 to 10 carbon atoms, —O—, —OCH$_2$—, —SO$_2$—, —CO—, —COCH$_2$—, —CH$_2$OCO—, —NHCO—, —NH—, —NHCONH—, —NHSO$_2$—, and —NHC$_3$H$_6$OCH$_2$CH$_2$O—; R$^2$ and R$^3$ independently denote hydrogen, a hydrocarbon group having 1 to 20 carbon atoms, or a hydroxyl- or alkoxyl-containing hydrocarbon group having 1 to 20 carbon atoms; and the hydrocarbon groups may have alicyclic structure, branched structure, or aromatic ring structure.)

The substituent group of the aromatic ring structure or the heterocyclic structure of the phosphorus compound defined by the formula (Formula 41) may include one or more groups selected from a hydrocarbon group having 1 to 50 carbon atoms (including alicyclic structure, branched structure, or aromatic ring structure and these structures may be halogen-substituted structures), hydroxyl, a halogen, an alkoxyl having 1 to 10 carbon atoms, an amino (may have substituent group of an alkyl having 1 to 10 carbon atoms or an alkanol group), a nitro group, a carboxyl group, an ester group of an aliphatic carboxylic acid having 1 to 10 carbon atoms, formyl, acyl, sulfonic acid group, sulfonic acid amide (may have substituent group of an alkyl having 1 to 10 carbon atoms or an alkanol group), a phosphoryl-containing group, a nitryl, and a cyanoalkyl.

The phosphorus compound defined by the chemical formula (Formula 41) may include the following compounds. Practical examples are benzylphosphonic acid, benzylphosphonic acid monoethyl ester, 1-naphthylmethyl phosphonic acid, 1-naphthylmethyl phosphonic acid monoethyl ester, 2-naphthylmethyl phosphonic acid, 2-naphthylmethyl phosphonic acid monoethyl ester, 4-phenylbenzylphosphonic acid, 4-phenylbenzylphosphonic acid monoethyl ester, 2-phenylbenzylphosphonic acid, 2-phenylbenzylphosphonic acid monoethyl ester, 4-chlorobenzylphosphonic acid, 4-chlorobenzylphosphonic acid monoethyl ester, 4-chlorobenzylphosphonic acid diethyl ester, 4-methoxybenzylphosphonic acid, 4-methoxybenzylphosphonic acid monoethyl ester, 4-methoxybenzylphosphonic acid diethyl ester, 4-methylbenzylphosphonic acid, 4-methylbenzylphosphonic acid monoethyl ester, 4-methylbenzylphosphonic acid diethyl ester, 4-nitrobenzylphosphonic acid, 4-nitrobenzylphosphonic acid monoethyl ester, 4-nitrobenzylphosphonic acid diethyl ester, 4-aminobenzylphosphonic acid, 4-aminobenzylphosphonic acid monoethyl ester, 4-aminobenzylphosphonic acid diethyl ester, 2-methylbenzylphosphonic acid, 2-methylbenzylphosphonic acid monoethyl ester, 2-methylbenzylphosphonic acid diethyl ester, 10-anthranylmethylphosphonic acid, 10-anthranylmethylphosphonic acid monoethyl ester, 10-anthranylmethylphosphonic acid diethyl ester, (4-methoxyphenyl-, ethoxyphenyl-)methylphosphonic acid, (4-methoxyphenyl-, ethoxyphenyl-)methylphosphonic acid monomethyl ester, (4-methoxyphenyl-, ethoxyphenyl-)methylphosphonic acid dimethyl ester, (phenyl-, hydroxy-)methylphosphonic acid, (phenyl-, hydroxy-)methylphosphonic acid monoethyl ester, (phenyl-, hydroxy-)methylphosphonic acid diethyl ester, (phenyl-, chloro-)methylphosphonic acid, (phenyl-, chloro-)methylphosphonic acid monoethyl ester, (phenyl-, chloro-)methylphosphonic acid diethyl ester, (4-chlorophenyl)iminophosphonic acid, (4-chlorophenyl)iminophosphonic acid monoethyl ester, (4-chlorophenyl)iminophosphonic acid diethyl ester, (4-hydroxyphenyl-, diphenyl-)methylphosphonic acid, (4-hydroxyphenyl-, diphenyl-) methylphosphonic acid monoethyl ester, (4-hydroxyphenyl-, diphenyl-)methylphosphonic acid diethyl ester, (4-chlorophenyl-, hydroxy-) methylphosphonic acid, (4-chlorophenyl-, hydroxy-)methylphosphonic acid monomethyl ester, (4-chlorophenyl-, hydroxy-) methylphosphonic acid dimethyl ester, and in addition, as phosphorus compounds having heteroring, 2-benzofuranylmethylphosphonic acid diethyl ester, 2-benzofuranylmethylphosphonic acid monoethyl ester, 2-benzofuranylmethylphosphonic acid, 2-(5-methyl)benzofuranylmethylphosphonic acid diethyl ester, 2-(5-methyl)benzofuranylmethylphosphonic acid monoethyl ester, 2-(5-methyl)benzofuranylmethylphosphonic acid. The above-mentioned bonding group-containing phosphorus compounds are preferable in terms of the polymerization activity.

The phosphorus compounds defined by the chemical formula (Formula 41) having a bonding group (X=—(CH$_2$)$_n$—) and usable in the invention are follows.

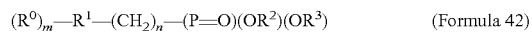

(Formula 42)

(In the chemical formula (Formula 42), R$^0$ denotes hydroxyl, a C1 to C10 alkyl, —COOH, or —COOR$^4$ (R$^4$ denotes a C1 to C4 alkyl group), an alkylene glycol, or a monoalkoxyalkylene glycol group (the monoalkoxy is a C1 to C4 alkoxy and alkylene glycol group is a C1 to C4 alkylene glycol group); R$^1$ denotes an aromatic ring structure such as benzene, naphthalene, biphenyl, diphenyl ether, diphenyl thioether, diphenylsulfone, diphenylmethane, diphenyldimethylmethane, diphenyl ketone, anthracene, phenanthrene, and pyrene; R$^2$ and R$^3$ independently denote a hydrogen atom or a C1 to C4 hydrocarbon group; m denotes an integer of 1 to 5; and in the case where a plurality of groups defined by R$^0$ exist, the respective groups may be same substituent groups or different substituent groups; and n denotes 0 or an integer of 1 to 5.)

Among the phosphorus compounds defined by the chemical formula (Formula 42) of the invention, those having a benzene group as the substituent-containing aromatic ring structure are as follows. That is, examples thereof may include, but not limited to, benzylphosphonic acids into whose benzene ring hydroxyl is introduced, such as 2-hydroxybenzylphosphonic acid diethyl ester, 2-hydroxybenzylphosphonic acid monoethyl ester, 2-hydroxybenzylphosphonic acid, 4-hydroxybenzylphosphonic acid diethyl ester, 4-hydroxybenzylphosphonic acid monoethyl ester, 4-hydroxybenzylphosphonic acid, 6-hydroxybenzylphosphonic acid diethyl ester, 6-hydroxybenzylphosphonic acid monoethyl ester, and 6-hydroxybenzylphosphonic acid.

Further, examples may include, but not limited to, benzylphosphonic acids into whose benzene ring an alkyl is introduced, such as 2-n-butylbenzylphosphonic acid diethyl ester, 2-n-butylbenzylphosphonic acid monoethyl ester, 2-n-butylbenzylphosphonic acid, 3-n-butylbenzylphosphonic acid diethyl ester, 3-n-butylbenzylphosphonic acid monoethyl ester, 3-n-butylbenzylphosphonic acid, 4-n-butylbenzylphosphonic acid diethyl ester, 4-n-butylbenzylphosphonic acid monoethyl ester, 4-n-butylbenzylphosphonic acid, 2,5-n-dibutylbenzylphosphonic acid diethyl ester, 2,5-n-dibutylbenzylphosphonic acid monoethyl ester, 2,5-n-dibutylbenzylphosphonic acid, 3,5-n-dibutylbenzylphosphonic acid diethyl ester, 3,5-n-dibutylbenzylphosphonic acid monoethyl ester, and 3,5-n-dibutylbenzylphosphonic acid.

Further, examples may include, but not limited to, benzylphosphonic acids into whose benzene ring carboxyl or carboxylate ester group is introduced, such as 2-carboxybenzylphosphonic acid diethyl ester, 2-carboxybenzylphosphonic acid monoethyl ester, 2-carboxybenzylphosphonic acid, 3-carboxybenzylphosphonic acid diethyl ester, 3-carboxybenzylphosphonic acid monoethyl ester, 3-carboxybenzylphosphonic acid, 4-carboxybenzylphosphonic acid diethyl ester, 4-carboxybenzylphosphonic acid monoethyl ester, 4-carboxybenzylphosphonic acid, 2,5-dicarboxybenzylphosphonic acid diethyl ester, 2,5-dicarboxybenzylphosphonic acid monoethyl ester, 2,5-dicarboxybenzylphosphonic acid, 3,5-dicarboxybenzylphosphonic acid diethyl ester, 3,5-dicarboxybenzylphosphonic acid monoethyl ester, 3,5-dicarboxybenzylphosphonic acid, 2-methoxycarbonylbenzylphosphonic acid diethyl ester, 2-methoxycarbonylbenzylphosphonic acid monoethyl ester, 2-methoxycarbonylbenzylphosphonic acid, 3-methoxycarbonylbenzylphosphonic acid diethyl ester, 3-methoxycarbonylbenzylphosphonic acid monoethyl ester, 3-methoxycarbonylbenzylphosphonic acid, 4-methoxycarbonylbenzylphosphonic acid diethyl ester, 4-methoxycarbonylbenzylphosphonic acid monoethyl ester, 4-methoxycarbonylbenzylphosphonic acid, 2,5-dimethoxycarbonylbenzylphosphonic acid diethyl ester, 2,5-dimethoxycarbonylbenzylphosphonic acid monoethyl ester, 2,5-dimethoxycarbonylbenzylphosphonic acid, 3,5-dimethoxycarbonylbenzylphosphonic acid diethyl ester, 3,5-dimethoxycarbonylbenzylphosphonic acid monoethyl ester, and 3,5-dimethoxycarbonylbenzylphosphonic acid.

Further, examples may include, but not limited to, benzylphosphonic acids into whose benzene ring an alkylene glycol group or a monoalkoxylated alkylene glycol group is introduced, such as 2-(2-hydroxyethoxy)benzylphosphonic acid diethyl ester, 2-(2-hydroxyethoxy)benzylphosphonic acid monoethyl ester, 2-(2-hydroxyethoxy)benzylphosphonic acid, 3-(2-hydroxyethoxy)benzylphosphonic acid diethyl ester, 3-(2-hydroxyethoxy)benzylphosphonic acid monoethyl ester, 3-(2-hydroxyethoxy)benzylphosphonic acid, 4-(2-hydroxyethoxy)benzylphosphonic acid diethyl ester, 4-(2-hydroxyethoxy)benzylphosphonic acid monoethyl ester, 4-(2-hydroxyethoxy)benzylphosphonic acid, 2,5-di(2-hydroxyethoxy)benzylphosphonic acid diethyl ester, 2,5-di(2-hydroxyethoxy)benzylphosphonic acid monoethyl ester, 2,5-di(2-hydroxyethoxy)benzylphosphonic acid, 3,5-di(2-hydroxyethoxy)benzylphosphonic acid diethyl ester, 3,5-di(2-hydroxyethoxy)benzylphosphonic acid monoethyl ester, 3,5-di(2-hydroxyethoxy)benzylphosphonic acid, 2-(2-methoxyethoxy)benzylphosphonic acid diethyl ester, 2-(2-methoxyethoxy)benzylphosphonic acid monoethyl ester, 1-(2-methoxyethoxy)benzylphosphonic acid, 3-(2-methoxyethoxy)benzylphosphonate, 3-(2-methoxyethoxy)benzylphosphonic acid diethyl ester, 3-(2-methoxyethoxy)benzylphosphonic acid monoethyl ester, 3-(2-methoxyethoxy)benzylphosphonic acid, 4-(2-methoxyethoxy)benzylphosphonic acid diethyl ester, 4-(2-methoxyethoxy)benzylphosphonic acid monoethyl ester, 4-(2-methoxyethoxy)benzylphosphonic acid, 2,5-di(2-methoxyethoxy)benzylphosphonic acid diethyl ester, 2,5-di(2-methoxyethoxy)benzylphosphonic acid monoethyl ester, 2,5-di(2-methoxyethoxy)benzylphosphonic acid, 3,5-di(2-methoxyethoxy)benzylphosphonic acid diethyl ester, 3,5-di(2-methoxyethoxy)benzylphosphonic acid monoethyl ester, and 3,5-di(2-methoxyethoxy)benzylphosphonic acid.

Benzyl-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having naphthalene group as the substituent-containing aromatic ring structure are as follows. That is, examples may include, but not limited to, phosphonic acids into whose naphthalene ring an alkyl, carboxyl, a carboxylate ester group, an alkylene glycol group, and a monoalkoxyalkylene glycol group are introduced, such as 1-(5-hydroxy)naphthylmethylphosphonic acid diethyl ester, 1-(5-hydroxy)naphthylmethylphosphonic acid monoethyl ester, 1-(5-hydroxy)naphthylmethylphosphonic acid, 1-(5-n-butyl)naphthylmethylphosphonic acid diethyl ester, 1-(5-n-butyl)naphthylmethylphosphonic acid monoethyl ester, 1-(5-n-butyl)naphthylmethylphosphonic acid, 1-(4-carboxy)naphthylmethylphosphonic acid diethyl ester, 1-(4-carboxy)naphthylmethylphosphonic acid monoethyl ester, 1-(4-carboxy)naphthylmethylphosphonic acid, 1-(4-methoxycarbonyl)naphthylmethylphosphonic acid diethyl ester, 1-(4-methoxycarbonyl)naphthylmethylphosphonic acid monoethyl ester, 1-(4-methoxycarbonyl)naphthylmethylphosphonic acid, 1-[4-(2-hydroxyethoxy)]naphthylmethylphosphonic acid diethyl ester, 1-[4-(2-hydroxyethoxy)]naphthylmethylphosphonic acid monoethyl ester, 1-[4-(2-hydroxyethoxy)]naphthylmethylphosphonic acid, 1-(4-methoxyethoxy)naphthylmethylphosphonic acid diethyl ester, 1-(4-methoxyethoxy)naphthylmethylphosphonic acid monoethyl ester, 1-(4-methoxyethoxy)naphthylmethylphosphonic acid, 1-(5-hydroxy)naphthylmethylphosphonic acid diethyl ester, 2-(6-hydroxy)naphthylmethylphosphonic acid diethyl ester, 2-(6-hydroxy)naphthylmethylphosphonic acid monoethyl ester, 2-(6-hydroxy)naphthylmethylphosphonic acid, 2-(6-n-butyl)naphthylmethylphosphonic acid diethyl ester, 2-(6-n-butyl)naphthylmethylphosphonic acid monoethyl ester, 2-(6-n-butyl)naphthylmethylphosphonic acid, 2-(6-carboxy)naphthylmethylphosphonic acid diethyl ester, 2-(6-carboxy)naphthylmethylphosphonic acid monoethyl ester, 2-(6-carboxy)naphthylmethylphosphonic acid, 2-(6-methoxycarbonyl)naphthylmethylphosphonic acid diethyl ester, 2-(6-methoxycarbonyl)naphthylmethylphosphonic acid monoethyl ester, 2-(6-methoxycarbonyl)naphthylmethylphosphonic acid, 2-[6-(2-hydroxyethoxy)]naphthylmethylphosphonic acid diethyl ester, 2-[6-(2-hydroxyethoxy)]naphthylmethylphosphonic acid monoethyl ester, 2-[6-(2-hydroxyethoxy)]naphthylmethylphosphonic acid, 2-(6-methoxyethoxy)naphthylmethylphosphonic acid diethyl ester, 2-(6-methoxyethoxy)naphthylmethylphosphonic acid monoethyl ester, and 2-(6-methoxyethoxy)naphthylmethylphosphonic acid.

Naphthalene-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having biphenyl group as the substituent-containing aromatic ring structure are as follows. That is, examples may include, but not limited to, phosphonic acids into whose biphenyl ring an alkyl, carboxyl, a carboxylate ester group, an alkylene glycol group, and a monomethoxyalkylene glycol group are introduced, such as 4-(4-hydroxyphenyl)benzylphosphonic acid diethyl ester, 4-(4-hydroxyphenyl)benzylphosphonic acid monoethyl ester, 4-(4-hydroxyphenyl)benzylphosphonic acid, 4-(4-n-butylphenyl)benzylphosphonic acid diethyl ester, 4-(4-n-butylphenyl)benzylphosphonic acid monoethyl ester, 4-(4-n-butylphenyl)benzylphosphonic acid, 4-(4-carboxyphenyl)benzylphosphonic acid diethyl ester, 4-(4-carboxyphenyl)benzylphosphonic acid monoethyl ester, 4-(4-carboxyphenyl)benzylphosphonic acid, 4-(4-methoxycarbonylphenyl)benzylphosphonic acid diethyl ester, 4-(4-methoxycarbonylphenyl)benzylphosphonic acid monoethyl ester, 4-(4-methoxycarbonylphenyl)benzylphosphonic acid, 4-(4-hydroxyethoxyphenyl)benzylphosphonic acid diethyl ester, 4-(4-hydroxyethoxyphenyl)benzylphosphonic acid monoethyl ester, 4-(4-hydroxyethoxyphenyl)benzylphosphonic acid, 4-(4-methoxyethoxyphenyl)benzylphosphonic acid diethyl ester, 4-(4-methoxyethoxyphenyl)benzylphosphonic acid monoethyl ester, and 4-(4-methoxyethoxyphenyl)benzylphosphonic acid.

Biphenyl-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having diphenyl ether group as the substituent-containing aromatic ring structure are as follows. That is, examples may include, but not limited to, phosphonic acids into whose diphenyl ether ring an alkyl, carboxyl, a carboxylate ester group, an alkylene glycol group, and a monomethoxyalkylene glycol group are introduced, such as 4-(4-hydroxyphenyloxy)benzylphosphonic acid diethyl ester, 4-(4-hydroxyphenyloxy)benzylphosphonic acid monoethyl ester, 4-(4-hydroxyphenyloxy)benzylphosphonic acid, 4-(4-n-butylphenyloxy)benzylphosphonic acid monoethyl ester, 4-(4-n-butylphenyloxy)benzylphosphonic acid monoethyl ester, 4-(4-n-butylphenyloxy)benzylphosphonic acid, 4-(4-carboxyphenyloxy)benzylphosphonic acid monoethyl ester, 4-(4-carboxyphenyloxy)benzylphosphonic acid monoethyl ester, 4-(4-carboxyphenyloxy)benzylphosphonic acid, 4-(4-methoxycarbonylphenyloxy)benzylphosphonic acid monoethyl ester, 4-(4-methoxycarbonylphenyloxy)benzylphosphonic acid monoethyl ester, 4-(4-methoxycarbonylphenyloxy)benzylphosphonic acid, 4-(4-hydroxyethoxyphenyloxy)benzylphosphonic acid monoethyl ester, 4-(4-hydroxymethoxyphenyloxy)benzylphosphonic acid monoethyl ester, 4-(4-hydroxyethoxyphenyloxy)benzylphosphonic acid, 4-(4-methoxyethoxyphenyloxy)benzylphosphonic acid monoethyl ester, 4-(4-methoxyethoxyphenyloxy)benzylphosphonic acid monoethyl ester, and 4-(4-methoxyethoxyphenyloxy)benzylphosphonic acid.

Diphenyl ether group-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having a diphenylthio ether group as the substituent-containing aromatic ring structure are as follows. That is, examples may include, but not limited to, phosphonic acids into whose diphenyl thioether ring an alkyl, carboxyl, a carboxylate ester group, an alkylene glycol group, and a monomethoxyalkylene glycol group are introduced, such as 4-(4-hydroxyphenylthio)benzylphosphonic acid diethyl ester, 4-(4-hydroxyphenylthio)benzylphosphonic acid monoethyl ester, 4-(4-hydroxyphenylthio)benzylphosphonic acid, 4-(4-n-butylphenylthio)benzylphosphonic acid monoethyl ester, 4-(4-n-butylphenylthio)benzylphosphonic acid monoethyl ester, 4-(4-n-butylphenylthio)benzylphosphonic acid, 4-(4-carboxyphenylthio)benzylphosphonic acid monoethyl ester, 4-(4-carboxyphenylthio)benzylphosphonic acid monoethyl ester, 4-(4-carboxyphenylthio)benzylphosphonic acid, 4-(4-methoxycarbonylphenylthio)benzylphosphonic acid monoethyl ester, 4-(4-methoxycarbonylphenylthio)benzylphosphonic acid monoethyl ester, 4-(4-methoxycarbonylphenylthio)benzylphosphonic acid, 4-(4-hydroxyethoxyphenylthio)benzylphosphonic acid monoethyl ester, 4-(4-hydroxyethoxyphenylthio)benzylphosphonic acid monoethyl ester, 4-(4-hydroxyethoxyphenylthio)benzylphosphonic acid, 4-(4-methoxyethoxyphenylthio)benzylphosphonic acid monoethyl ester, and 4-(4-methoxyethoxyphenylthio)benzylphosphonic acid.

Diphenyl thioether group-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having a diphenyl sulfone group as the substituent-containing aromatic ring structure are as follows. That is, examples may include, but not limited to, phosphonic acids into whose diphenyl sulphone ring an alkyl, carboxyl, a carboxylate ester group, an alkylene glycol group, and a monomethoxyalkylene glycol group are introduced, such as 4-(4-hydroxyphenylsulfonyl)benzylphosphonic acid diethyl ester, 4-(4-hydroxyphenylsulfonyl)benzylphosphonic acid monoethyl ester, 4-(4-hydroxyphenylsulfonyl)benzylphosphonic acid, 4-(4-n-butylphenylsulfonyl)benzylphosphonic acid monoethyl ester, 4-(4-n-butylphenylsulfonyl)benzylphosphonic acid monoethyl ester, 4-(4-n-butylphenylsulfonyl)benzylphosphonic acid, 4-(4-carboxyphenylsulfonyl)benzylphosphonic acid monoethyl ester, 4-(4-carboxyphenylsulfonyl)benzylphosphonic acid monoethyl ester, 4-(4-carboxyphenylsulfonyl)benzylphosphonic acid, 4-(4-methoxycarbonylphenylsulfonyl)benzylphosphonic acid monoethyl ester, 4-(4-methoxycarbonylphenylsulfonyl)benzylphosphonic acid monoethyl ester, 4-(4-methoxycarbonylphenylsulfonyl)benzylphosphonic acid, 4-(4-hydroxyethoxyphenylsulfonyl)benzylphosphonic acid monoethyl ester, 4-(4-hydroxyethoxyphenylsulfonyl)benzylphosphonic acid monoethyl ester, 4-(4-hydroxyethoxyphenylsulfonyl)benzylphosphonic acid, 4-(4-methoxyethoxyphenylsulfonyl)benzylphosphonic acid monoethyl ester, 4-(4-methoxyethoxyphenylsulfonyl)benzylphosphonic acid monoethyl ester, and 4-(4-methoxyethoxyphenylsulfonyl)benzylphosphonic acid.

Diphenyl sulfone group-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having a diphenylmethane group as the substituent-containing aromatic ring structure are as follows. That is, examples may include, but not limited to, phosphonic acids into whose diphenylmethane ring an alkyl, carboxyl, a carboxylate ester group, an alkylene glycol group, and a monomethoxyalkylene glycol group are introduced, such as 4-(4-hydroxybenzyl)benzylphosphonic acid diethyl ester, 4-(4-hydroxybenzyl)benzylphosphonic acid monoethyl ester, 4-(4- hydroxybenzyl)benzylphosphonic acid, 4-(4-n-butylbenzyl)benzylphosphonic acid monoethyl ester, 4-(4-n-butylbenzyl)benzylphosphonic acid monoethyl ester, 4-(4-n-butylbenzyl)benzylphosphonic acid, 4-(4-carboxybenzyl)benzylphosphonic acid monoethyl ester, 4-(4-carboxybenzyl)benzylphosphonic acid monoethyl ester, 4-(4-carboxybenzyl)benzylphosphonic acid, 4-(4-methoxycarbonylbenzyl)benzylphosphonic acid monoethyl ester, 4-(4-methoxycarbonylbenzyl)benzylphosphonic acid monoethyl ester, 4-(4-methoxycarbonylbenzyl)benzylphosphonic acid, 4-(4-hydroxyethoxybenzyl)benzylphosphonic acid monoethyl ester, 4-(4-hydroxyethoxybenzyl)benzylphosphonic acid monoethyl ester, 4-(4-hydroxyethoxybenzyl)benzylphosphonic acid, 4-(4-methoxyethoxybenzyl)benzylphosphonic acid monoethyl ester, 4-(4-methoxyethoxybenzyl)benzylphosphonic acid monoethyl ester, and 4-(4-methoxyethoxybenzyl)benzylphosphonic acid.

Diphenylmethane group-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having diphenyldimethylmethane group as the substituent-containing aromatic ring structure are as follows. That is, examples may include, but not limited to, phosphonic acids into whose diphenyldimethylmethane ring an alkyl, carboxyl, a carboxylate ester group, an alkylene glycol group, and a monomethoxyalkylene glycol group are introduced, such as 4-(4-hydroxyphenyldimethylmethyl)benzylphosphonic acid diethyl ester, 4-(4-hydroxyphenyldimethylmethyl)benzylphosphonic acid monoethyl ester, 4-(4-hydroxyphenyldimethylmethyl)benzylphosphonic acid, 4-(4-n-butylphenyldimethylmethyl)benzylphosphonic acid monoethyl ester, 4-(4-n-butylphenyldimethylmethyl)benzylphosphonic acid monoethyl ester, 4-(4-n-butylphenyldimethylmethyl)benzylphosphonic acid, 4-(4-carboxyphenyldimethylmethyl)benzylphosphonic acid monoethyl ester, 4-(4-carboxyphenyldimethylmethyl)benzylphosphonic acid monoethyl ester, 4-(4-carboxyphenyldimethylmethyl)benzylphosphonic acid, 4-(4-methoxycarbonylphenyldimethylmethyl)benzylphosphonic acid monoethyl ester, 4-(4-methoxycarbonylphenyldimethylmethyl)benzylphosphonic acid monoethyl ester, 4-(4-methoxycarbonylphenyldimethylmethyl)benzylphosphonic acid, 4-(4-hydroxyethoxyphenyldimethylmethyl)benzylphosphonic acid monoethyl ester, 4-(4-hydroxyethoxyphenyldimethylmethyl)benzylphosphonic acid monoethyl ester, 4-(4-hydroxyethoxyphenyldimethylmethyl)benzylphosphonic acid, 4-(4-methoxyethoxyphenyldimethylmethyl)benzylphosphonic acid diethyl ester, 4-(4-methoxyethoxyphenyldimethylmethyl)benzylphosphonic acid monoethyl ester, and 4-(4-methoxyethoxyphenyldimethylmethyl)benzylphosphonic acid.

Diphenyldimethylmethane group-containing phosphorus compounds of the invention are not limited to the above-exemplified compounds having a single substituent group and may include compounds having the above-mentioned substituent groups such as a hydroxyl, an alkyl, carboxyl, a carboxylate ester, a 2-hydroxyethoxy, and a 2-methoxyethoxy group in combination.

Among the phosphorus compounds defined by the chemical formula (Formula 42) of the invention, those having diphenyl ketone group as the substituent-containing aromatic ring structure are as follows. That is, examples may include, but not limited to, phosphonic acids into whose diphenyl ketone ring an alkyl, carboxyl, a carboxylate ester group, an alkylene glycol group, and a monomethoxyalkylene glycol group are introduced, such as 4-(4-hydroxybenzoyl)benzylphosphonic acid diethyl ester, 4-(4-hydroxybenzoyl)benzylphosphonic acid monoethyl ester, 4-(4-hydroxybenzoyl)benzylphosphonic acid, 4-(4-n-butylbenzoyl)benzylphosphonic acid monoethyl ester, 4-(4-n-butylbenzoyl)benzylphosphonic acid monoethyl ester, 4-(4-n-butylbenzoyl)benzylphosphonic acid, 4-(4-carboxybenzoyl)benzylphosphonic acid monoethyl ester, 4-(4-carboxybenzoyl)benzylphosphonic acid monoethyl ester, 4-(4-carboxybenzoyl)benzylphosphonic acid, 4-(4-methoxycarbonylbenzoyl)benzylphosphonic acid monoethyl ester, 4-(4-methoxycarbonylbenzoyl)benzylphosphonic acid monoethyl ester, 4-(4-methoxycarbonylbenzoyl)benzylphosphonic acid, 4-(4-hydroxyethoxybenzoyl)benzylphosphonic acid monoethyl ester, 4-(4-hydroxyethoxybenzoyl)benzylphosphonic acid monoethyl ester, 4-(4-hydroxyethoxybenzoyl)benzylphosphonic acid, 4-(4-methoxyethoxybenzoyl)benzylphosphonic acid monoethyl ester, 4-(4-methoxyethoxybenzoyl)benzylphosphonic acid monoethyl ester, and 4-(4-methoxyethoxybenzoyl)benzylphosphonic acid.

Diphenyl ketone group-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having anthracene group as the substituent-containing aromatic ring structure are as follows. That is, examples may include, but not limited to, phosphonic acids into whose anthracene ring an alkyl, carboxyl, a carboxylate ester group, an alkylene glycol group, and a monomethoxyalkylene glycol group are introduced, such as 9-(10-hydroxy)anthrylmethylphosphonic acid diethyl ester, 9-(10-hydroxy)anthrylmethylphosphonic acid monoethyl ester, 9-(10-hydroxy)anthrylmethylphosphonic acid, 9-(10-n-butyl)anthrylmethylphosphonic acid diethyl ester, 9-(10-n-butyl)anthrylmethylphosphonic acid monoethyl ester, 9-(10-n-butyl)naphthylmethylphosphonic acid, 9-(10-carboxy)anthrylmethylphosphonic acid diethyl ester, 9-(10-carboxy)anthrylmethylphosphonic acid monoethyl ester, 9-(10-carboxy)anthrylmethylphosphonic acid, 9-(2-hydroxyethoxy)anthrylmethylphosphonic acid diethyl ester, 9-(2-hydroxyethoxy)anthrylmethylphosphonic acid monoethyl ester, 9-(2-hydroxyethoxy)anthrylmethylphosphonic acid, 9-(2-methoxyethoxy)anthrylmethylphosphonic acid diethyl ester, 9-(2-methoxyethoxy)anthrylmethylphosphonic acid monoethyl ester, 9-(2-methoxyethoxy)anthrylmethylphosphonic acid, 9-(2-methoxycarbony)anthrylmethylphosphonic acid diethyl ester, 9-(2-methoxycarbony)anthrylmethylphosphonic acid monoethyl ester, and 9-(2-methoxycarbony)anthrylmethylphosphonic acid.

Anthracene group-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having phenanethrene group as the substituent-containing aromatic ring structure are as follows. That is, examples may include, but not limited to, phosphonic acids into whose phenanethrene ring an alkyl, carboxyl, a carboxylate ester group, an alkylene glycol group, and a monomethoxyalkylene glycol group are introduced, such as 1-(7-n-butyl)phenanthrylmethylphosphonic acid diethyl ester, 1-(7-n-butyl)phenanthrylmethylphosphonic acid monoethyl ester, 1-(7-n-butyl)naphthylmethylphosphonic acid, 1-(7-carboxy)phenanthrylmethylphosphonic acid diethyl ester, 1-(7-carboxy)phenanthrylmethylphosphonic acid monoethyl ester, 1-(7-carboxy)phenanthrylmethylphosphonic acid, 1-(7-hydroxyethoxy)phenanthrylmethylphosphonic acid diethyl ester, 1-(7-hydroxyethoxy)phenanthrylmethylphosphonic acid monoethyl ester, 1-(7-hydroxyethoxy)phenanthrylmethylphosphonic acid, 1-(7-methoxyethoxy)phenanthrylmethylphosphonic acid diethyl ester, 1-(7-methoxyethoxy)phenanthrylmethylphosphonic acid monoethyl ester, 1-(7-methoxyethoxy)phenanthrylmethylphosphonic acid, 1-(7-methoxycarbony)phenanthrylmethylphosphonic acid diethyl ester, 1-(7-methoxycarbony)phenanthrylmethylphosphonic acid monoethyl ester, and 1-(7-methoxycarbony)phenanthrylmethylphosphonic acid.

Phenanthryl group-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

Among the phosphorus compounds defined by the chemical formula (Formula 42) of the invention, those having a pyrene group as the substituent-containing aromatic ring structure are as follows. That is, examples may include, but not limited to, phosphonic acids into whose pyrene ring an alkyl, carboxyl, a carboxylate ester group, an alkylene glycol group, and a monomethoxyalkylene glycol group are introduced, such as 1-(5-hydroxy)pyrenylmethylphosphonic acid diethyl ester, 1-(5-hydroxy)pyrenylmethylphosphonic acid monoethyl ester, 1-(5-hydroxy)pyrenylmethylphosphonic acid, 1-(5-n-butyl)pyrenylmethylphosphonic acid diethyl ester, 1-(5-n-butyl)pyrenylmethylphosphonic acid monoethyl ester, 1-(5-n-butyl)naphthylmethylphosphonic acid, 1-(5-carboxy)pyrenylmethylphosphonic acid diethyl ester, 1-(5-carboxy)pyrenylmethylphosphonic acid monoethyl ester, 1-(5-carboxy)pyrenylmethylphosphonic acid, 1-(5-hydroxyethoxy)pyrenylmethylphosphonic acid diethyl ester, 1-(5-hydroxyethoxy)pyrenylmethylphosphonic acid monoethyl ester, 1-(5-hydroxyethoxy)pyrenylmethylphosphonic acid, 1-(5-methoxyethoxy)pyrenylmethylphosphonic acid diethyl ester, 1-(5-methoxyethoxy)pyrenylmethylphosphonic acid monoethyl ester, 1-(5-methoxyethoxy)pyrenylmethylphosphonic acid, 1-(5-methoxycarbonyl)pyrenylmethylphosphonic acid diethyl ester, 1-(5-methoxycarbonyl)pyrenylmethylphosphonic acid monoethyl ester, and 1-(5-methoxycarbonyl)pyrenylmethylphosphonic acid.

Pyrene group-containing phosphorus compounds of the invention are not limited to the above-exemplified compounds having a single substituent group and may include compounds having the above-mentioned substituent groups such as a hydroxyl, an alkyl, a carboxyl, a carboxylate ester, a 2-hydroxyethoxy, and a 2-methoxyethoxy group in combination.

The substituent groups such as a hydroxyl group, an alkyl, a carboxyl group, a carboxylate ester group, a 2-hydroxyethoxy group, and a 2-methoxyethoxy group to be introduced into the above-mentioned series of the aromatic rings are supposed to be deeply relevant to the formation of complexes with aluminum atoms at the time of polymerization of polyester. Further, these substituent groups include those similar to carboxyl or hydroxyl, which is a functional group, for polyester formation and are therefore easy to be dissolved or taken in polyester matrix and are supposed to be particularly effective for polymerization activity and decrease of insoluble particle.

As compared with the case that the group defined as $R^0$ bonded to the aromatic ring structure ($R^1$) denotes hydrogen atom, that is, the group is unsubstituted, the substituted phosphorus compounds having a C1-C10 alkyl, —COOH, —COOR$^4$ (R$^4$ denotes C1-C4 alkyl), an alkylene glycol, or a monoalkoxyalkylene glycol group (monoalkoxy is C1-C4 monoalkoxy and alkylene glycol is C1-C4 glycol group) as substituent groups are effective not only to improve the catalytic activity but also to decrease the insoluble particle and therefore they are preferable.

The substituent groups bonded to the aromatic ring structure may include a C1-C10 alkyl, a carboxyl, a carboxyl ester, an alkylene glycol, or a monoalkoxyalkylene glycol group. More preferable substituent groups in terms of decrease of the insoluble particle are carboxyl, a carboxyl ester group, an alkylene glycol, and a monoalkoxyalkylene glycol. The reason for that is not particularly made clear, however it is supposed that the affinity of the polyester with the alkylene glycol, which is a medium of the catalyst, is improved.

Examples of the phosphonic acid type compounds having no bonding group (X) and defined by the following formulas (Formula 43) are the following.

$$R^1-(P=O)(OR^2)(OR^3) \quad \text{(Formula 43)}$$

In the phosphorus compound defined by the above-mentioned chemical formula (Formula 43) having no bonding group (X), $R^1$ denotes an aromatic ring structure having 6 to 50 carbon atoms or a heterocyclic structure having 4 to 50 carbon atoms and the aromatic ring structure or the heterocyclic structure may have substituent groups. $R^2$ and $R^3$ independently denote a hydrogen atom, a hydrocarbon group having 1 to 20 carbon atoms, or a hydroxyl- or alkoxyl-containing hydrocarbon group having 1 to 20 carbon atoms. The hydrocarbon groups may have alicyclic structure, branched structure, or aromatic ring structure.

The substituent group of the aromatic ring structure or the heterocyclic structure of the phosphorus compound defined by the formula (Formula 43) may include one or more groups selected from a hydrocarbon group having 1 to 50 carbon atoms (including linear or alicyclic structure, branched structure, or aromatic ring structure and these structures may be halogen-substituted structures), hydroxyl, a halogen, an alkoxyl having 1 to 10 carbon atoms, an amino (may have a substituent group of an alkyl having 1 to 10 carbon atoms or an alkanol group), a nitro group, a carboxyl group, an ester group of an aliphatic carboxylic acid having 1 to 10 carbon atoms, a formyl, acyl, sulfonic acid group, sulfonic acid amide (may have substituent group of an alkyl having 1 to 10 carbon atoms or an alkanol group), a phosphoryl-containing group, a nitryl, and a cyanoalkyl. The aromatic ring structure of the chemical formula (Formula 43) may be selected from benzene, naphthalene, biphenyl, diphenyl ether, diphenyl thio ether, diphenylsulfone, diphenylmethane, diphenyldimethylmethane, anthracene, phenanethrene, and pyrene. The heterocyclic structure may be selected from furan, benzofuran, isobenzofuran, dibenzofuran, naphthalane, and phthalide. At least one of $R^2$ and $R^3$ in the above-mentioned chemical formula (Formula 43) is preferably a hydrogen atom.

Examples of the phosphorus compounds defined by the above-mentioned chemical formula (Formula 43) to be used in the invention are as follows. That is, examples may include (3-nitro-5-methyl)-phenylphosphonic acid diethyl ester, (3-nitro-5-methyl)-phenylphosphonic acid monoethyl ester, (3-nitro-5-methyl)-phenylphosphonic acid, (3-nitro-5-methoxy)-phenylphosphonic acid diethyl ester, (3-nitro-5-methoxy)-phenylphosphonic acid monoethyl ester, (3-nitro-5-methoxy)-phenylphosphonic acid, 4-chloro-phenylphosphonic acid diethyl ester, 4-chloro-phenylphosphonic acid monoethyl ester, 4-chloro-phenylphosphonic acid, 5-chloro-phenylphosphonic acid diethyl ester, 5-chloro-phenylphosphonic acid monoethyl ester, 5-chloro-phenylphosphonic acid, (3-nitro-5-methyl)-phenylphosphonic acid diethyl ester, (3-nitro-5-methyl)-phenylphosphonic acid monoethyl ester, (3-nitro-5-methyl)-phenylphosphonic acid, 4-nitro-phenylphosphonic acid diethyl ester, 4-nitro-phenylphosphonic acid monoethyl ester, 4-nitro-phenylphosphonic acid, 5-nitro-phenylphosphonic acid diethyl ester, 5-nitro-phenylphosphonic acid monoethyl ester, 5-nitro-phenylphosphonic acid, 6-nitro-phenylphosphonic acid diethyl ester, 6-nitro-phenylphosphonic acid monoethyl ester, 6-nitro-phenylphosphonic acid, (4-nitro-6-methyl)-phenylphosphonic acid diethyl ester, (4-nitro-6-methyl)-phenylphosphonic acid monoethyl ester, (4-nitro-6-methyl)-phenylphosphonic acid, and in addition, phosphorus compounds derived from the above-exemplified phosphorus compound defined by the chemical formula (Formula 42) by removing methylene chain, —$CH_2$—, which is a bonding group, from the respective aromatic ring structures such as benzene, naphthalene, biphenyl, diphenyl ether, diphenyl thioether, diphenyl sulfone, diphenylmethane, diphenyldimethylmethane, diphenyl ketone, anthracene, phenanthrene, and pyrene in the respective structural formulas and may also include, as heterocyclic ring-containing phosphorus compounds, 5-benzofuranylphosphonic acid diethyl ester, 5-benzofuranylphosphonic acid monoethyl ester, 5-benzofuranylphosphonic acid, 5-(2-methyl)benzofuranylphosphonic acid diethyl ester, 5-(2-methyl)benzofuranylphosphonic acid monoethyl ester, and 5-(2-methyl)benzofuranylphosphonic acid. Although being inferior in the polymerization activity to the above-mentioned phosphorus compounds having the bonding group, these phosphorus compounds having no bonding group may be used as a polyester polymerization catalyst in the case of employing the catalytic production process of the invention.

In the invention, it is preferable to previously heating the above-mentioned phosphorus compound in at least one solvent selected from water and alkylene glycols for use. The previous treatment improves the polycondensation catalytic activity in the case of using the above-mentioned phosphorus compound in combination with aluminum or the above-mentioned aluminum compound and at the same time suppresses formation of insoluble particle attributed to the polycondensation catalyst.

The solvent to be used at the time of previous heating the phosphorus compound is not particularly limited and optional if it is one kind solvent selected from water and alkylene glycols, however it is preferable to use a solvent in which the phosphorus compound is dissolved. Examples of the alkylene glycols to be used are preferably glycols which are constituent components of the aimed polyester, such as ethylene glycol. The heating treatment in the solvent is preferable to be carried out after the phosphorus compound is dissolved, however it is not necessary to completely dissolve the phosphorus compound. Further, after the heating treatment, the compound is not necessarily required to keep the structure the compound originally has and the phosphorus compound may be a compound whose solubility in the solvent is improved by deformation by heating treatment.

The temperature of the heating treatment is not particularly limited, however it is preferably from 20 to 250° C. and more preferably from 100 to 200° C. The upper limit of the temperature is preferably near the boiling point of the solvent to be used. Although the heating time is different depending on the condition of the temperature, the heating time is preferably from 1 minute to 50 hours at a temperature around the boiling point of the solvent, more preferably from 30 minutes to 10 hours, and even preferably from 1 to 5 hours. The pressure of the system of the heating treatment is not particularly limited and may be more or less atmospheric pressure. The concentration of the solution is preferably 1 to 500 g/L on the basis of the phosphorus compound, more preferably 5 to 300 g/L, and even more preferably 10 to 100 g/L. The heating treatment is preferably carried out under atmosphere of an inert gas such as nitrogen. The storage temperature of the solution or the slurry after heating is not particularly limited, however it is preferably from 0° C. to 100° C. and more preferably from 20° C. to 60° C. The solution is preferable to be stored under atmosphere of an inert gas such as nitrogen.

At the time of previously heating treatment of the phosphorus compound in the solvent, aluminum or its compound of the invention is allowed to coexist. Further, aluminum or its compound of the invention may be added in form of a powder, a solution, or a slurry to the phosphorus compound previously heated in the solvent. Further, the solution or the slurry after the addition may be heated. The solution or the slurry obtained by these steps can be used as the polycondensation catalyst of the invention.

The use amount of the phosphorus compound of the invention is preferably 0.0001 to 0.1% by mole in the total number of moles of the entire constituent units of the carboxylic acid component of the polyester to be obtained and more preferably 0.005 to 0.05% by mole.

In the invention, it is preferable to contain, as a second metal component, a small amount of at least one kind metal or compound selected from alkali metals, alkaline earth metals, and their compounds in addition to the above-mentioned aluminum compound. Coexistence of the second metal-containing component is effective to enhance catalytic activity in addition to effect of suppressing formation of diethylene glycol and accordingly a catalyst component with high reaction rate is obtained and it is effective to improve the productivity.

The method to add at least one kind metal or compound selected from said alkali metals, alkaline earth metals, and their compounds as a second metal component is applicable to the above mentioned phosphorous compound coexistence catalyst system as well as to a catalyst system of aluminum compound alone.

A technology of obtaining a catalyst having sufficient catalytic activity by adding an alkali metal compound or an alkaline earth metal compound to an aluminum compound has been known. If such conventionally known catalyst is used, a polyester excellent in thermal stability can be obtained, however with respect to the conventional known catalyst using the alkali metal compound or the alkaline earth metal compound in combination, the addition amounts of them have to be high for obtaining practically applicable catalytic activity. In the case of using an alkali metal compound, polyester to be obtained is deteriorated in the resistance to hydrolysis and insoluble particles attributed to the alkali metal compound is increased, and therefore, yarn productivity and physical properties of yarn may be decreased in the case the polyester is used for fibers or the film physical properties may be decreased in the case the polyester is used for film. In the case an alkaline earth compound is used in combination, for obtaining practically applicable catalytic activity, it results in decrease of the thermal stability, considerable discoloration by heating, may increase of formation amount of insoluble particles, and deterioration of the resistance to hydrolysis of obtained polyester.

In the case an alkali metal, an alkaline earth metal, or their compound is added, the use amount M (% by mole) is preferably $1\times10^{-6}$ or higher and less than 0.1% by mole, more preferably $5\times10^{-6}$ to 0.05% by mole, furthermore preferably $1\times10^{-5}$ to 0.03% by mole, and even more preferably $1\times10^{-5}$ to 0.01% by mole of the moles of the total polycarboxylic acid units composing the polyester. Since the addition amount of the alkali metal and the alkaline earth metal is low, it is possible to increase the reaction rate without causing problems of decrease of thermal stability, formation of insoluble particles, discoloration, and deterioration of resistance to hydrolysis. If the use amount M of the alkali metal, alkaline earth metal and compounds thereof exceeds 0.1% by mole, there occur cases in which decrease of thermal stability, increase of formation of insoluble particles and discoloration, and deterioration of resistance to hydrolysis which cause problems in product processing. If M is less than $1\times10^{-6}$, the effect of the addition is not clear.

The alkali metal and alkaline earth metal composing the second metal-containing component to be preferably used in addition to aluminum or its compound are preferably at least one kind selected from Li, Na, K, Rb, Cs, Be, Mg, Ca, Sr, and Ba and it is more preferable to use at least one selected from Li, Na, Mg and their compounds among them. Examples of compounds of alkali metals and alkaline earth metals may include metal salts of acid, alkoxides such as methoxide, ethoxide, n-propoxide, iso-propoxide, n-butoxide, and tert-butoxide, chelate compounds such as acetylacetonate, and hydrides, oxides, and hydroxides. Acid which comprise metal salts of acid include; saturated aliphatic carboxylic acid such as formic acid, acetic acid, propionic acid, butyric acid, and oxalic acid; unsaturated aliphatic carboxylic acid such as acrylic acid and methacrylic acid; aromatic carboxylic acid such as benzoic acid; halogen-containing carboxylic acid such as trichloroacetic acid; hydroxycarboxylic acid such as lactic acid, citric acid, and salicylic acid; inorganic acid such as carbonic acid, sulfuric acid, nitric acid, phosphoric acid, phosphonic acid, hydrogen carbonate, hydrogen phosphate, hydrogen sulfide, sulfurous acid, thiosulfuric acid, hydrochloric acid, hydrobromic acid, chloric acid, and bromic acid; organic sulfonic acid such as 1-propanesulfonic acid, 1-pentanesulfonic acid, and naphthalenesulfonic acid; organic sulfuric acid such as laurylsulfuric acid.

In the case of using those having high alkalinity like hydroxides among the alkali metal, the alkaline earth metal, and their compounds, since they tend to be difficult to be dissolved in organic solvent, for example diols such as ethylene glycol or alcohols, they have to be added in form of aqueous solution to the polycondensation system and it may possibly cause a problem in the polycondensation process. Further, in the case of using those having high alkalinity like hydroxides, the polyester become susceptive to the side reaction such as hydrolysis in polycondensation and the polymerized polyester tends to become easy to be discolored and the hydrolysis resistance also tends to be lowered. Accordingly, those which are preferable as alkali metals and their compounds, or alkaline earth metals and their compounds of the invention are saturated aliphatic carboxylic acid salts, unsaturated aliphatic carboxylic acid salts, aromatic carboxylic acid salts, halogen-containing carboxylic acid salts, hydroxy-carboxylic acid salts, inorganic acid salts selected from salts of sulfuric acid, nitric acid, phosphoric acid, phosphonic acid, hydrogen phosphate, hydrogen sulfide, sulfurous acid, thiosulfuric acid, hydrochloric acid, hydrobromic acid, chloric acid, bromic acid salts; organic sulfonic acid salts, organic sulfates, chelate compounds, and oxides of the alkali metals or alkaline earth metals. In terms of handling easiness and availability of them, saturated aliphatic carboxylic acid salts of the alkali metals or alkaline earth metals, particularly acetic acid salts, are preferable to be used.

For polycondensation catalyst of the present inventions, co-presence of another polycondensation catalyst such as an antimony compound, a germanium compound, a titanium compound or the like to an extent that the addition of the component does not cause problems in the properties of the polyester, processability and color tone of a product as described is effective to improve the productivity by shortening the polycondensation time and therefore it is preferable.

An antimony compound is preferable to be added in amount of 50 ppm or less on the basis of antimony atom in the polyester to be obtained by polycondensation. The addition amount is more preferably 30 ppm or less. If the addition amount of antimony exceeds 50 ppm, metal antimony precipitation occurs to cause gray discoloration and insoluble particles formation in polyester and therefore, it is not preferable.

A germanium compound is preferable to be added in an amount of 20 ppm or lower on the basis of germanium atom in the polyester to be obtained by polycondensation. The addition amount is more preferably 10 ppm or less. If the addition amount of germanium exceeds 20 ppm, it results in disadvantage in terms of cost and therefore, it is not preferable.

A titanium compound is preferable to be added in an amount of 5 ppm or less on the basis of titanium atom in the polyester to be obtained by polycondensation. The addition amount is more preferably 3 ppm or less, and even more preferably 1 ppm or less. If the addition amount of titanium exceeds 5 ppm, discoloration of the polyester becomes noticeable and also thermal stability is considerably deteriorated and therefore, it is not preferable.

Antimony compounds usable in the present inventions are not particularly limited and preferable examples may include antimony trioxide, antimony pentoxide, antimony acetate, and antimony glycoxide and particularly antimony trioxide is preferable to be used. Usable germanium compounds are also not particularly limited and examples may include germanium dioxide and germanium tetrachloride and germanium dioxide is particularly preferable. Both crystalline and amorphous germanium dioxides are usable.

Titanium compounds usable in the present inventions are not particularly limited and examples may include tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanate, ammonium oxalate titanate, titanium oxide, composite oxide of titanium with silicon, zirconium, alkali metals, and alkaline earth metals, orthoesters or condensed orthoesters of titanium, reaction products of titanium orthoesters or condensed orthoesters with hydroxycarboxylic acids, reaction products of titanium orthoesters or condensed orthoesters with hydroxycarboxylic acids and phosphorus compounds, and reaction products of titanium orthoesters or condensed orthoesters with polyhydric alcohols having at least two hydroxyl groups, 2-hydroxycarboxylic acids, and basic groups and preferable examples among them are composite oxides of titanium and silicon, composite oxides of titanium and magnesium, and reaction products of titanium orthoesters or condensed orthoesters with hydroxycarboxylic acids and phosphorus compounds.

Examples of tin compounds are dibutyltin oxide, methylphenyltin oxide, tetraethyltin, hexaethylditin oxide, triethyltin hydroxide, monobutylhydroxytin oxide, triisobutyltin acetate, diphenyltin dilaurate, monobutyltin trichloride, dibutyltin sulfide, dibutylhydroxytin oxide, methylstannoic oxide, and ethylstannoic oxide and monobutylhydroxytin oxide is particularly preferable to be used.

For the purpose of improving color tone, it is a preferable embodiment that a cobalt compound is added in an amount of less than 10 ppm on the basis of cobalt atom in the polyester of the present inventions. The addition amount is more preferably 5 ppm or less and even more preferably 3 ppm or less. Cobalt compounds to be used are not particularly limited and practical examples are cobalt acetate, cobalt nitrate, cobalt chloride, cobalt acetylacetonate, and cobalt naphthenate and their hydrates. Cobalt acetate tetrahydrate is particularly preferable among them.

To improve the color tone of the polyester of the invention, it is also preferable to use a color tone improver other than the cobalt compound. The color tone improver means a substance which can change the color tone by its addition. The color tone improver in the invention is not particularly limited, however inorganic and organic pigments, dyes, and fluorescent brighteners are preferable.

In the case of using a pigment or a dye, if its use amount is increased, there occurs a problem that brightness of the condensate polymer is consequently decreased. It leads to another problem that use of the polyester to be obtained cannot be allowed in many uses. Therefore the total use amount of a pigment and a dye is preferably 20 ppm or less in the polyester, more preferably 10 ppm or less, and even more preferably 5 ppm or less. To the above-mentioned extent, the coloration can be efficiently eliminated without decreasing the brightness of the condensate polymer.

Since the color tone is improved and the amount of a pigment or a dye to be used may be decreased if a fluorescent brightener is used alone or in combination with another color tone improver and therefore, it is preferable. Commonly used fluorescent brighteners may be used alone or two or more of them in combination. The addition amount is preferably 50 ppm or less to the polyester to be obtained and more preferably 5 to 25 ppm.

An inorganic pigment is not particularly limited if it can change the color tone and examples may include titanium dioxide, carbon black, iron black, nickel titanium yellow, yellow iron oxide, cadmium yellow, chrome yellow, chrome titanium yellow, zinc ferrite pigment, red iron oxide, cadmium red, molybdenum red, chromium oxide, spinel green, chrome orange, cadmium orange, ultramarine, prussian blue, and cobalt blue. Among them are chromium oxide, ultramarine, prussian blue, and cobalt blue preferable, and ultramarine and cobalt blue more preferable. These inorganic pigments may be used alone or two or more of them may be used in combination based on the necessity.

Production of polyester of this invention can be carried out by a method involving conventionally known steps except that a polyester polycondensation catalyst of the present inventions is used as catalyst. For example, in the case of producing PET, it is produced by a direct esterification method involving causing direct reaction of terephthalic acid and ethylene glycol and if necessary other copolymerizable components, distilling water for esterification, and following polycondensation under reduced pressure, or transesterification method involving reaction of dimethyl terephthalate and ethylene glycol and if necessary other copolymerizable components, distilling methyl alcohol for transesterification, and following polycondensation under reduced pressure. Further, if necessary, to increase intrinsic viscosity, solid phase polycondensation may be carried out. To promote crystallization before solid phase polycondensation, the melt polymerized polyester may be moisturized and then thermally crystallized or steam is directly blown to polyester chips and then thermal crystallization may be carried out.

The above-mentioned melt polymerization may be carried out by batch type reaction apparatus or continuous type reaction apparatus. In any of the above-mentioned methods, esterification reaction or transesterification reaction may be carried out in one step or in multi-steps. The melt polycondensation reaction may be carried out also in one step or in multi-steps. The solid-phase polymerization reaction is carried out, similarly to melt polycondensation reaction, by batch type reaction apparatus or continuous type reaction apparatus. The melt polycondensation and solid phase polymerization may be carried out continuously or separately.

The catalyst of the invention has catalytic activity for not only polycondensation but also esterification reaction and transesterification reaction. For example, the polycondensation by transesterification of dicarboxylic acid alkyl ester such as dimethyl terephthalate with glycol such as ethylene glycol is generally carried out in the presence of an transesterification catalyst such a titanium compound and a zinc compound and in place of these catalysts, the catalyst of the invention has catalytic activity on not only melt polycondensation but also solid-phase polycondensation and solution polycondensation and a polyester can be produced by any method.

The catalyst of the invention can be added to the reaction system in any optional step of the polycondensation reaction, for example, before beginning of or during the esterification reaction and transesterification reaction and any optional step, for example, immediately before beginning of or during the polycondensation reaction, however it is preferable to add the catalyst immediately before beginning of the polycondensation.

The catalyst solution of the aluminum compound of the invention may be added in form of a mixture after being mixed with another compound or the solution and another compound may be added separately. Further, the catalyst solution of the aluminum compound of the invention and another compound may be added at the same addition timing to the polycondensation system and these respective components may be added separately at different addition timings. The full amount of the catalyst may be added at once or separately at a plurality of timings.

Without being limited, the polyester obtained by the process of the invention may be subjected to treatment such as heating of the polyester resin in solid state under decreased pressure or inert gas flow for promoting polycondensation as described above and removal of byproducts such as oligomers, e.g. cyclic trimers and acetaldehyde contained in the polyester resin. Further, the polyester resin may be refined by extraction method such as a supercritical extraction method to remove impurities such as byproducts as described.

The polyester of the present inventions may contain an organic, inorganic, or organometal type toner and an optical brightener and one or more kinds of these additives may be added to suppress the discoloration such as yellow discoloration or the like of the polyester to the further excellent level. Further, the polyester may contain other optional polymers, a antistatic agent, a defoaming agent, a dyeing property improver, a dye, a pigment, a flatting agent, an optical brightener, a stabilizer, an antioxidant, and other additives. Examples usable as the antioxidant may be aromatic amine antioxidants and phenol antioxidants and examples usable as the stabilizer are phosphorus compounds such as phosphoric acid and phosphoric acid esters, sulfur containing stabilizers, and amine stabilizers.

These additives may be added in any optional step, e.g. at the time of polycondensation of the polyester, after polycondensation, or molding of the polyester and it may be properly selected in accordance to the structure of the aimed polyester and the properties required for the polyester to be obtained.

The polyester obtained by the process of the invention is characterized in that the polyester contains less insoluble particles attributed to the polycondensation catalyst and the characteristic can be evaluated by the following evaluation of aluminum containing insoluble particle in polyesters.

[Evaluation Method of Aluminum Containing Insoluble Particle in Polyesters]

Polyester pellets in an amount 30 g and a mixed solution of p-chlorophenol/tetrachloroethane (3/1: ratio by weight) in an amount of 300 ml are put in a round bottom flask equipped with a stirrer and the pellets are stirred and dissolved in the mixed solution at 100 to 105° C. for 2 hours. The obtained solution is cooled to room temperature and the entire amount of the solution is filtered for separating insoluble particle by a membrane filter with diameter 47 mm/hole diameter 1.0 μm and made of polytetrafluoroethylene (PTFE membrane filter, trade name: T100A047A, manufactured by Advantec) under pressure of 0.15 MPa. The effective filtration diameter is adjusted to be 37.5 mm. On completion of the filtration, the filter is successively washed with 300 ml of chloroform and then dried overnight at 30° C. in reduced pressure. The filtration face of the membrane filter is analyzed by a scanning x-ray fluorescence spectrometer (ZSX 100e, Rh bulb 4.0 kW, manufactured by Rigaku Corporation) for quantitative measurement of aluminum element amount. The quantitative measurement is carried out for the portion with a diameter of 30 mm in the center part of the membrane filter. A calibration curve for the x-ray fluorescence spectrometry is obtained by using polyethylene terephthalate resin whose aluminum element amount is known to show the apparent aluminum element amount by ppm. The measurement is carried out at 50 kV-70 mA x-ray output, using pentaerythritol as a spectroscopic crystal and PC (a proportional counter) as a detector, and measuring the Al-Kα beam intensity in condition of PHA (pulse-height analyzer) 100-300. The aluminum element amount in the PET resin for the calibration curve is measured by inductively coupled plasma atomic emission spectrometry.

In the invention, the aluminum containing insoluble particle in the polyester measured by the above-mentioned evaluation method is preferably 3500 ppm or less, more preferably 2500 ppm or less, and even more preferably 1500 ppm or less. In the case where the aluminum containing insoluble particle in the polyester exceeds 3500 ppm, the content of ultra small insoluble particle in the polyester is increased and for example, in the case where the polyester is molded in a molded article such as a film or a bottle, the haze of the molded article is worsened. Therefore, it is not preferable. Further, it leads to a problem that clogging of a filter is frequently caused at the time of filtration of the polyester in the polycondensation process and the molding process.

The polyester obtained by the production process of the invention is preferable to give a monoaxially oriented film having a haze value of 2% or lower evaluated by the evaluation method described in Examples.

The haze value is more preferably 1.8% or lower and even more preferably 1.6% or lower. If the haze value exceeds 2%, it is sometimes impossible to obtain a highly transparent molded article such as a film or a bottle in the case where it is obtained by molding the polyester by a mold involving drawing treatment and therefore, it is not preferable.

In the invention, a method for suppressing the haze value of the monoaxially oriented film to 2% or lower is not particularly limited, however the haze value is considerably affected by the above-mentioned aluminum containing insoluble particle in polyesters and therefore, the polyester obtained by the production process of the invention is excellent in this property.

The polyester obtained by polycondensation using the polyester polycondensation catalyst of the invention is usable for producing fibers by common melt spinning method and methods carrying out spinning and drawing in two steps and in one step can be employed. Further, staple production methods involving curling, heat set treatment, and cutting treatment and conventionally known fiber production methods for monofilaments can all be employed.

The fibers to be obtained may have various fiber structures such as yarns with modified cross sections, hollow cross sections, composite fibers, and originally dyed yarns and in yarning, conventional known techniques such as combining and blending fibers can be employed.

The above-mentioned polyester fibers may be formed into fiber structure bodies such as woven fabrics and nonwoven fabrics.

The above-mentioned polyester fibers may be used as industrial fiber materials represented by fibers for clothing; fibers for interiors and bedding such as curtains, carpets, cotton for mats, and fiber fill; tensile strength wires such as tire cords and ropes; and civil engineering and construction materials and vehicular materials such as air bags; and also as various kinds of fibers for various woven fabrics, various knitted products, nets, short fiber nonwoven fabrics, long fiber nonwoven fabrics and the like.

The polyester of the invention can be used for hollow molded articles. Examples of the hollow molded articles are beverage containers for mineral water, juice, wine, and whisky; containers such as feeding bottles, food bottling containers, containers of hair care products and cosmetic products; and containers for cleaners and dish washing detergents.

The polyester is particularly suitable for pressure-resistant containers, heat-resistant and pressure-resistant containers, and alcohol-resistant containers for various kinds of beverages based on the properties of the polyester such as hygiene, strength, and solvent resistance. A method for producing hollow molded articles may involve the following steps: drying polyester chips obtained by melt polycondensation or solid-phase polycondensation by vacuum dying method and molding the dried chips by a molding apparatus such as an extrusion molding apparatus or an injection molding apparatus, or introducing polyester melt in melted state after melt polycondensation into a molding apparatus and molding polyester melt by direct molding to obtain a preliminarily molded article having a bottom. Successively, the preliminarily molded article is molded by blow molding such as stretch blow molding, direct blow molding, or extrusion blow molding to obtain a final hollow container.

In the case of producing such hollow molded articles, the waste resin generated in the production steps and polyester resins recovered from markets may be added. Even in the case of such recycled resin, the polyester resin of the invention gives hollow molded products which are scarcely deteriorated and has a high quality.

Further, such containers may have multilayer structures having, as an intermediate layer, a gas barrier resin layer such as polyvinyl alcohol and poly(m-xylylenediamine adipate), a light-blocking resin layer and a recycled polyester layer. Further, it is also possible to coat the inside and outside of a container with a metal such as aluminum or a diamond-like carbon layer by evaporation or CVD (chemical vapor deposition).

To heighten the crystallinity of the mouth parts of the hollow molded articles, another resin, e.g. polyethylene, and an inorganic nucleating agent such as talc may be added.

Further, the polyester of the invention can be extruded into sheet-like materials by an extruder to obtain sheets. Such sheets can be processed by vacuum molding, pressure molding, or stamping to obtain trays and containers of food and goods, caps, blister packs, carrier tapes for electronic parts, and trays for electronic part distribution. Also, the sheets can be used for various cards.

In the case of these sheets, the sheets may have the above-mentioned multilayer structure having, as an intermediate layer, a gas barrier resin layer, a light-blocking resin layer, and a recycled polyester layer.

Further, similarly the recycled resin can be mixed. In order to obtain a heat-resistant crystalline container, another resin, e.g. polyethylene, and an inorganic nucleating agent such as talc may be added to increase the crystallinity.

The polyester obtained by polycondensation using the polyester polycondensation catalyst of the invention can be used for a film. A method for producing the film may be carried out by melt-extruding the polyester and molding the extruded polyester like a sheet on a cooling rolling roll from a T-dice to obtain an un-drawing sheet. A laminated film may be formed by co-extrusion method using a plurality of extrusion apparatuses for allotting various kinds of functions to a core layer and a skin layer.

The polyester obtained by polycondensation using the polyester polycondensation catalyst of the invention can be used for an oriented polyester film. The oriented polyester film may be obtained by a conventionally known method by drawing the polyester at least monoaxially 1.1 to 6 times as large at a temperature not lower than the glass transition temperature and lower than the crystallization temperature of the polyester.

For example, in the case of producing a biaxially oriented polyester film, the following methods can be employed: that is, a successive diaxial drawing method for carrying out uniaxial drawing in the vertical or transverse direction and successive drawing in the rectangular direction; a simultaneous biaxial drawing method for carrying out drawing simultaneously in the vertical and the transverse directions; a method of using a linear motor as a driving method at the time of carrying out simultaneous biaxial drawing; and a multi-step drawing method involving drawing several times in one direction such as a transverse-vertical-vertical drawing method, a vertical-transverse-vertical drawing method, and a vertical-vertical-transverse drawing method.

On completion of the drawing, to suppress thermal shrinkage ratio of the film, it is preferable to carry out heat fixation treatment at a temperature from (melting point −50° C.) to lower than the melting point for 30 seconds, more preferable for 10 seconds, for 0.5 to 10% vertical relieving treatment and transverse relieving treatment.

The thickness of the obtained oriented polyester film is preferably 1 μm or thicker and 1000 μm or thinner, more preferably 5 μm or thicker and 500 μm or thinner, and even more preferably 10 μm or thicker and 200 μm or thinner. If it is thinner than 1 μm, the film is a lack of rigidity and difficult to handle. If it is thicker than 1000 μm, the film becomes so hard to make handling difficult.

To provide various kinds of functions such as adhesion, die-releasing property, anti-electrostatic property, infrared ray absorption, anti-bacterial property, and scratching resistance, the surface of the oriented polyester film may be coated with a polymer resin by coating method. Further, inorganic and/or organic particles may be added only to the layer to be coated for obtaining a slippery highly transparent polyester film. Further, various kinds of barrier functions of oxygen, water, and oligomers may be added by forming an inorganic layer by evaporation or conductivity may be provided by forming a conductive layer by a sputtering method or the like. Further, to improve the handling properties such as slipping property, running mobility, wear resistance, and rolling property of the aligned polyester film, the film surface may be made uneven by adding inorganic or organic salt particles or heat resistant polymer resin particles in the polycondensation process of the polyester. These particles may or may not be subjected to inorganic or organic or hydrophilic or hydrophobic surface treatment, however there are cases preferable to use the surface treated particles in order to improve, for example, dispersibility.

Examples of the inorganic particles are calcium carbonate, kaolin, talc, magnesium carbonate, barium carbonate, calcium sulfate, barium sulfate, lithium phosphate, calcium phosphate, magnesium phosphate, aluminum oxide, silicon oxide, titanium oxide, zirconium oxide, lithium fluoride, and sodium calcium aluminosilicate.

Examples of the organic salt particles are calcium oxalate and terephthalic acid salts of calcium, barium, zinc, manganese, and magnesium.

Examples of crosslinked polymer particles are divinylbenzene, styrene, acrylic acid, methacrylic acid, and homopolymer or condensate copolymers of vinyl type monomers such as acrylic acid and methacrylic acid. Additionally, organic particles of polytetrafluoroethylene, benzoguanamine resin, thermosetting epoxy resin, unsaturated polyester resin, thermosetting urea resin, and thermosetting phenol resin.

A method for adding the above-mentioned inactive particles to the polyester to be a substrate film is not particularly limited and examples of the method are as follows: (a) a method involving dispersing the inactive particles in a diol which is a polyester constituent component in slurry state and adding the inactive particle slurry to the polycondensation reaction system of the polyester; (b) a method involving adding the water slurry in which inactive particles are dispersed to melted polyester resin by a bent type biaxial extrusion apparatus in the melt extrusion process of the polyester film; (c) a method involving kneading the polyester resin and inactive particles in melted state; and (d) a method involving the polyester resin and a master resin of the invert particles in melted state.

In the case of the method of adding to the polycondensation reaction system, it is preferable to add a diol slurry of the inactive particles to the reaction system with a low melt viscosity from the beginning of esterification reaction or transesterification reaction to the beginning of the polycondensation reaction. Further, at the time of adjusting the diol slurry of the inactive particles, it is preferable to carry out physical dispersion treatment by using a high pressure dispersion apparatus, a bead mill, or ultrasonic dispersion. Further, to stabilize the dispersed slurry, it is also preferable to carry out proper chemical dispersion stabilization treatment in accordance with the type of the particles to be used.

In the case of using inorganic oxide particles or crosslinked polymer particles having carboxyl on the surfaces, the dispersion stabilization treatment may be carried out by adding an alkali compound such as sodium hydroxide, potassium hydroxide, and lithium hydroxide to the slurry and accordingly suppressing re-agglomeration of the particles due to the electric repulsion. Further, in the case of calcium carbonate particles and hydroxyapatite particles, it is preferable to add sodium tripolyphosphate or potassium tripolyphosphate to the slurry.

At the time of adding a diol slurry of the inactive particles to the polycondensation reaction system for the polyester, heat treatment of the slurry to a temperature near the boiling point of the diol is also preferable in terms of the dispersibility of the particles since the heat shock (the temperature difference of the slurry and the polycondensation reaction system) can be lessened at the moment of the addition.

These additives may be added in any optional step, e.g. at the time of polycondensation of the polyester or after the polycondensation or after film formation of the polyester film and which step is proper may differ in accordance with the properties of the compounds and the properties required for the polyester film.

Further, since the polyester of the invention is excellent in the thermal stability, at the time of producing a film using the polyester, the ear parts produced in the drawing step and nonstandard films can be reusable.

The oriented polyester film of the invention can be used preferably for antistatic films, easily adhesive films, cards, dummy cans, agricultural uses, construction materials, decorative materials, wall paper, OHP films, printing, ink-jet recording, sublimation transfer recording, recording by laser beam printers, electrophotographic recording, thermal transfer recording, heat sensitive transfer recording, printed substrate wiring, membrane switches, plasma displays, touch panels, masking films, photographic master plates, Roentgen films, photographic negative films, phase difference films, polarization films, polarization film protection (TAC), protect films, photosensitive resin films, visible field magnification films, diffusion sheets, reflection films, reflection prevention films, conductive films, separators, ultraviolet blocking films, and back-ground tapes.

EXAMPLES

Hereinafter, the invention will be described with reference to examples, however it is not intended that the inventions be limited to the illustrated examples. The evaluations were carried out by the following methods.

1. Measurement of Absorbance of Aqueous Aluminum Compound Solution

Absorbance was measured at wavelength of 680 nm using of a solution obtained by dissolving 2.7 g/L (on the basis of aluminum element) of aluminum carboxylate in pure water. The dissolution was carried out using a 1.5 L flask by stirring at room temperature for 6 hours (200 rpm), heating to 95° C. in 30 minutes, and stirring at temperature adjusted at 95±1° C. for 3 hours. The absorbance was measured using a quartz cell with cell length of 1 cm and pure water as blank after the aqueous solution was cooled to room temperature. A double beam spectrophotometer (UV-210A, manufactured by Shimazu Corporation) was measured as measurement apparatus.

2. Measurement of Amount of Water-Insoluble Substance of Aluminum Compound 30 g of aluminum compound was added to 1500 ml of pure water at room temperature stirring at 200 rpm and continuously stirred for 6 hours. Successively, the solution temperature was raised to 95° C., and stirring was continued at the temperature further for 3 hours to dissolve the aluminum compound. The obtained solution was cooled until the temperature turned back to room temperature and filtered by membrane filter (cellulose acetate membrane filter, trade name: C020A047A, manufactured by Advantec) with pore diameter of 0.2 μm and washed with 50 ml of pure water. The obtained filter with which the insoluble substance was separated was dried by vacuum dryer at 60° C. for 12 hours to measure the insoluble substance weight (W). The water-insoluble substance of the aluminum compound with respect to water was calculated according to the following equation. In the case the aluminum compound is an aqueous solution, some of the aqueous solution was sampled, and evaporated and dried to measure the solid matter in the aqueous solution. The solid matter was regarded as the weight of the aluminum compound and the aluminum compound concentration in the aqueous solution was calculated and the aqueous solution in amount equivalent to 30 g of the aluminum compound in the aqueous solution was filtered to measure the weight of the insoluble substance of the aluminum compound. In the case of the aqueous solution, if the aluminum compound concentration in the aqueous solution was higher than 2% by weight, pure water was added so as to dilute the aluminum and adjust the concentration to be 2% by weight and then filtration was carried out. The dilution was carried out in the same conditions as those in the case of above-mentioned solid aluminum compound dissolution. The above-mentioned operation was carried out in a clean bench.

$$\text{Insoluble substance (ppm)} = [W(\text{mg})/30000\ (\text{mg})] \times 10^6$$

3. Measurement of Intrinsic Viscosity (IV: dl/g)

Measurement was carried out at 30° C. by using solvent mixture of phenol/1,1,2,2-tetrachloroethane at 6/4 (weight ratio).

4. Color Tone

Using polyester resin chip (length about 3 mm, diameter about 2 mm), Hunter's L value and b value were measured by color meter (ND-1001DP, manufactured by Tokyo Denshoku Co., Ltd.).

5. Evaluation of Aluminum Containing Insoluble Particles in Polyester

Polyester pellets produced by melt polycondensation in an amount 30 g and a mixed solution of p-chlorophenol/tetrachloroethane (3/1: ratio by weight) in amount of 300 ml were put in round bottom flask equipped with stirrer, and the pellets were stirred and dissolved in the mixed solution at 100 to 105° C. for 2 hours. The obtained solution was cooled to room temperature and the entire amount of the solution was filtered for separating insoluble particles by polytetrafluoroethylene membrane filter (PTFE membrane filter, trade name: T100A047A, manufactured by Advantec) of diameter 47 mm/hole diameter 1.0 μm under pressure of 0.15 MPa. Effective filtration diameter was 37.5 mm. On completion of filtration, the filtrate was successively washed with 300 ml of chloroform and then dried overnight at 30° C. in reduced pressure. The filtration face of the membrane filter was analyzed by scanning x-ray fluorescence spectrometer (ZSX 100e, Rh bulb 4.0 kW, manufactured by Rigaku Corporation) for quantitative measurement of aluminum element amount. The quantitative measurement was carried out for the portion with diameter of 30 mm in the center part of the membrane filter. Aluminum element amount was obtained by using PET resin whose calibration curve for the x-ray fluorescence spectrometry are known and the apparent aluminum element amount was exhibited by ppm. The measurement was carried out by measuring strength of Al-Kα line at 50 kV-70 mA x-ray output and using pentaerythritol as spectrometric crystal and PC (proportional counter) as detector in condition of PHA (pulse-height analyzer) 100 to 300. The aluminum element amount of the polyethylene terephthalate resin for the calibration curve was quantitatively measured by inductively coupled plasma-atomic emission spectrometry.

6. Haze Value of Monoaxially Oriented Film

Polyester resin was dried at 13° C. for 12 hours in vacuum and processed by heat press method to obtain sheet of 1000±100 μm. The heat press temperature, pressure, and time were adjusted to be 320° C., 100 kg/cm²G, and 3 seconds, respectively. After press, the sheet was thrown into water and quenched. The obtained sheet was monoaxially drawn at 3.5 times as big by a batch type stretcher (FILM STRETCHER, manufactured by T. M. LONG CO., INC) to obtain a monoaxially oriented film of 300±20 μm. The drawing temperature was controlled to be blow temperature 95° C./plate temperature 100° C. Further, the drawing speed was 15000%/min. The haze of the obtained monoaxially oriented film was measured according to JIS-K 7136 using a haze meter (300A, manufactured by Nippon Denshoku Kogyo Co., Ltd.). The measurement was repeated 5 times and the average value was calculated. The haze value was shown as a conversion value calculated by assuming the film thickness to be 300 μm.

7. X-Ray Diffraction of Basic Aluminum Acetate

Measurement was carried out in the following conditions.

| | |
|---|---|
| X-ray generator: | Geigerflex manufactured by Rigaku Corporation. |
| X-ray: | CuKα/40 KV/38 mA |
| Attachment: | standard sample holder made of glass |
| Filter: | none |
| Counter Monochromater: | Full automatic monochromater |
| Dispersion slit: | 1 degree |
| Scattering slit: | 1 degree |
| Light receiving slit: | 0.3 mm |
| Counter: | Scintillation counter |
| Scanning mode: | continuous |
| Scanning speed: | 2 degree/min |
| Intake interval of sampling data: | 0.02 degree |
| Scanning axis: | 2θ/θ |
| Scanning range: | 10 to 50 degree |
| Data processing: | RINT system 1000 series, manufactured by Rigaku Corporation. |

8. Infrared Ray Absorptiometry of Basic Aluminum Acetate (T1 Evaluation Method)

Measurement was carried out by a transmission method. FTS-40 (main body)/UMA 300 (infrared microscope) manufactured by Bio-Rad laboratories, Inc. was used for the measurement. A sample was prepared in a manner that the absorbance around 985 $cm^{-1}$ was adjusted to be 1.5 or lower and the measurement was repeated 128 integrated times at resolution of 8 $cm^{-1}$. The absorption intensity measurement was carried out in the following manner. The base line of the absorption intensity at 3700 $cm^{-1}$ was determined by forming a line between both rims of the absorption. The base line of the absorption at 1029 $cm^{-1}$ was determined by forming a line between the rim in the higher frequency side of the absorption at 1060 $cm^{-1}$ and the rim in the lower frequency side of the absorption at 985 $cm^{-1}$.

9. Infrared Ray Absorptiometry of Basic Aluminum Acetate (T1 Evaluation Method)

A sample for measurement was prepared by reduced-pressure drying at room temperature overnight. Measurement was carried out by a transmission method. FTS-40 (main body)/UMA 300 (infrared microscope) manufactured by Bio-Rad laboratories, Inc. was used for the measurement. A sample was prepared in a manner that the absorbance around 985 $cm^{-1}$ was adjusted to be 1.5 or lower and measurement was repeated 128 integrated times at resolution of 8 $cm^{-1}$. The absorption intensity measurement was carried out in the following manner. The base lines of the absorption intensity at 1062 $cm^{-1}$ and 1029 $cm^{-1}$ were determined by forming lines between the rim in the higher frequency side of the absorption at 1060 $cm^{-1}$ and the rim in the lower frequency side of the absorption at 985 $cm^{-1}$. The ratio of the heights from the respective base lines to the peak tops of the absorption at 1062±10 $cm^{-1}$ and at 1029±10 $cm^{-1}$ was defined as an absorbance ratio T2 (C/A), that is, the absorption ratio (C/A) of the absorbance C and A. As the numeral value becomes higher, the crystallinity of the sample basic aluminum acetate can be said to be higher than that with a lower numeral value.

10. Evaluation of Transparency of the Hollow Molded Article

A polyester was dried by dryer using dehumidified nitrogen and preform was molded by extrusion molding apparatus (M-150C (DM), manufactured by Meiki Seisakusho) at resin temperature of 295° C. The mouth plug part of the preform was thermally crystallized by mouth plug part crystallization apparatus manufactured by our company and then biaxially blow-molded by LB-01E drawing blow molding apparatus manufactured by Corpo Plast Co. and successively thermally fixed in die set at about 140° C. for about 7 seconds to obtain hollow molded article with 1500 cc capacity (the trunk part was circular). The transparency of the hollow molded article obtained was evaluated by eye observation according to the three-grade evaluation method.

O: excellent in transparency

Δ: slightly inferior in transparency x: inferior in transparency

11. Quantitative Determination of Aluminum Atom in Basic Aluminum Acetate

After 0.5 g of basic aluminum acetate was dissolved in 1000 ml of an aqueous 1.2 mol/L hydrochloric acid solution, the obtained solution was subjected to the quantitative determination using an inductively coupled plasma (ICP) atomic emission spectrometer (CIROS-120 EOP) manufactured by Rigaku Corporation. The wavelength employed was 396.152 nm. Further, the calibration curve was produced using a standard solution of aluminum, which is a traceable sample of a specified standard substance by Measurement Law (National Measurement Standard) (manufactured by Wako Pure Chemical Industries, Ltd.).

12. Quantitative Determination of Sulfur Atom in Basic Aluminum Acetate

After 0.5 g of basic aluminum acetate was dissolved in 20 ml of an aqueous 1.2 mol/L hydrochloric acid solution, the obtained solution was subjected to the quantitative determination using an inductively coupled plasma (ICP) atomic emission spectrometer (CIROS-120 EOP) manufactured by Rigaku Corporation. The wavelength employed was 180.731 nm. Further, the calibration curve was produced using aqueous sodium sulfate solution of super high grade.

13. Quantitative Determination of Boron Atom in Basic Aluminum Acetate

After 0.5 g of basic aluminum acetate was dissolved in 20 ml of an aqueous 1.2 mol/L hydrochloric acid solution, the obtained solution was subjected to the quantitative determination using an inductively coupled plasma (ICP) atomic emission spectrometer (CIROS-120 EOP) manufactured by Rigaku Corporation. The wavelength employed was 249.773 nm. Further, the calibration curve was produced using an aqueous boric acid solution of super high grade.

14. Quantitative Determination of Diethylene Glycol (DEG) in Polyester

After 0.1 g of a polyester was thermally decomposed at 250° C. in 2 ml of methanol, separate quantitative determination was carried out by gas chromatography method.

Example 1

(1) Preparation of Polycondensation Catalyst Solution (Preparation of Ethylene Glycol Solution of Phosphorus Compound)

After 2.0 L of ethylene glycol was added to a flask equipped with nitrogen introduction tube and refluxing tube at room temperature and atmospheric pressure, 200 g of Irganox 1222 (manufactured by Ciba Specialty Chemicals K.K.) as a phosphorus compound defined by the formula (Formula 39) was added while being stirred at 200 rpm in nitrogen atmosphere. Further, after 2.0 L of ethylene glycol was additionally added, setting of the jacket temperature was changed to be 196° C. for heating and after a moment the inner temperature reached 185° C. or higher, the mixture was stirred under refluxing for 60 minutes. After the heating was stopped, the solution was immediately parted from the heat source and while the nitrogen atmosphere was kept as it was, the obtained solution was cooled to 120° C. or lower in 30 minutes. The mole ratio of Irganox 1222 in the obtained solution was 40% and the mole ratio of the compound with changed structure derived from Irganox 1222 was 60%.

(Preparation of Aqueous Solution of Aluminum Compound)

After 5.0 L of pure water was added to a flask equipped with refluxing tube at room temperature and atmospheric pressure, 200 g of basic aluminum acetate (hydroxyaluminum diacetate) with absorbance of 0.0047 evaluated by the above-mentioned evaluation method (manufactured by SIGMA) was added in form of slurry with pure water while being stirred at 200 rpm. Further, pure water was added to adjust the total in 10.0 L and the resulting solution was stirred at room temperature and atmospheric pressure for 12 hours. After that, the setting of the jacket temperature was changed to be 100.5° C. for heating and after a moment the inner temperature reached 95° C. or higher, the solution was stirred under refluxing for 3 hours. After the stirring was stopped, the solution was cooled to room temperature to obtain aqueous solution.

(Preparation of Water/Ethylene Glycol Mixed Solution of Aluminum Compound)

Ethylene glycol was added in proper amount to adjust the aqueous solution/ethylene glycol to be ⅔ (by volume) to the above-mentioned aqueous solution of the aluminum compound and sufficiently mixed to obtain water/ethylene glycol mixed solution of the aluminum compound.

(Polycondensation of Polyester)

The water/ethylene glycol mixed solution of the basic aluminum acetate and the ethylene glycol solution of the phosphorus compound, produced in the above-mentioned method as a polycondensation catalyst, were respectively supplied via separate supply ports to the mixture of bis(2-hydroxyethyl)terephthalate and oligomer produced by a conventional method from the high purity terephtalate and ethylene glycol in 2 time as much by mole while the of aluminum atom and phosphorus atom ratios were adjusted to be 0.021% by mole and 0.028% by mole, respectively, to the acid component in the polyester and the mixture was stirred at 245° C. and atmospheric pressure for 15 minutes in nitrogen atmosphere. Next, the mixture was gradually heated to 275° C. in 55 minutes and the pressure of the reaction system was gradually decreased to 66.5 Pa (0.5 Torr) and further polycondensation reaction was carried out at 275° C. and 66.5 Pa for 130 minutes. The properties of the obtained PET are shown in Table 1.

TABLE 1

| | Example 1/4 | Example 2/5 | Comparative Example 1/3 |
|---|---|---|---|
| Absorbance of aqueous aluminum compound solution | 0.0047 | 0.0022 | 0.0155 |
| IV (dlg$^{-1}$) | 0.60 | 0.61 | 0.59 |
| color tone (L value) | 57.2 | 56.8 | 56.1 |
| color tone (b value) | 0.4 | 0.3 | 0.2 |
| aluminum containing insoluble particle in polyesters (ppm) | 750 | 400 | 5500 |
| haze value of monoaxially oriented film (%) | 0.9 | 0.5 | 3.0 |

Comparative Example 1

PET of Comparative Example 1 was obtained in the same manner as Example 1, except that basic aluminum acetate (manufactured by Nakarai) having the absorbance other than 0.0155 evaluated by the above-mentioned evaluation method was employed. The properties of the obtained PET are shown in Table 1.

Example 2

An aqueous solution of refined basic aluminum acetate free from water-insoluble substance was obtained by subjecting an aqueous solution of the aluminum compound prepared in Comparative Example 1 to ultra high speed centrifugation at 500000×g for 1.5 hours. A portion of the obtained refined solution was sampled and dried by a freeze drying method to obtain refined basic aluminum acetate. The absorbance of the refined basic aluminum acetate evaluated by the above-mentioned evaluation method was 0.0022. PET of Example 2 was obtained in the same manner as Example 1, except that the above-mentioned refined basic aluminum acetate was employed as an aqueous solution of the aluminum compound. The properties of the obtained PET are shown in Table 1.

Example 3

Preparation of Ethylene Glycol Solution of Aluminum Lactate

An aqueous solution containing about 67 g/L of aluminum lactate was prepared at room temperature. The obtained aqueous aluminum lactate solution was diluted with pure water and the absorbance evaluated by the above-mentioned evaluation method was 0.0177. An aqueous solution of refined aluminum lactate free from water-insoluble substance was obtained by subjecting the above-mentioned aqueous solution to ultra high speed centrifugation at 500000×g for 1.5 hours. A portion of the obtained refined solution was sampled and dried by a freeze drying method to obtain a refined aluminum lactate. The absorbance of the refined aluminum lactate evaluated by the above-mentioned evaluation method was 0.0017. After that, the refined aqueous aluminum lactate solution was mixed with ethylene glycol and heated at about 100° C. to remove water and obtain an ethylene glycol solution containing about 29 g/L aluminum lactate.

(Polycondensation of Polyester)

PET of Example 3 was obtained in the same manner as Example 1, except that the above-mentioned refined ethylene glycol solution of aluminum lactate was employed as the aluminum compound. The properties of the obtained PET are shown in Table 2.

TABLE 2

|  | Example 3/6 | Comparative Example 2/4 |
|---|---|---|
| Absorbance of aqueous aluminum compound solution | 0.0017 | 0.0177 |
| IV (dlg$^{-1}$) | 0.60 | 0.61 |
| color tone (L value) | 57.5 | 56.8 |
| color tone (b value) | 0.3 | 0.3 |
| aluminum containing insoluble particle in polyesters (ppm) | 450 | 7000 |
| haze value of monoaxially oriented film (%) | 0.5 | 3.6 |

Comparative Example 2

PET of Comparative Example 2s was obtained in the same manner as Example 3, except that an ethylene glycol solution of aluminum lactate acetate obtained in the same manner as Example 3 using an aqueous un-refined aluminum lactate solution before conduction of the ultra high speed centrifugation as used as the aluminum compound. The properties of the obtained PET are shown in Table 2.

Examples 4 to 6 and Comparative Examples 3 and 4

Monoaxially oriented films were produced using PET obtained in Examples 1 to 3 and Comparative Examples 1 and 2 by the method described in the above-mentioned evaluation method. Haze values of the monoaxially oriented films are shown in Table 1 and Table 2.

The production methods of PET of Examples 1 to 3 were carried out at high polycondensation catalyst activity, with little formation of insoluble particle derived from the polycondensation catalysts, and satisfied both of the economical and quality properties. PET of Comparative Examples 1 and 2 contained large quantity of insoluble particle derived from the polycondensation catalysts and were inferior in the quality. The monoaxially oriented films produced from these polyesters of Examples had low haze values and were excellent in transparency. On the other hand, the monoaxially oriented films produced from PET of Comparative Examples 1 and 2 had high haze values and were inferior in transparency. Accordingly, PET produced in Examples 1 to 3 gave molded articles with high transparency and high quality.

Example 7

(1) Preparation of Polycondensation Catalyst Solution (Preparation of Ethylene Glycol Solution of Phosphorus Compound)

The polycondensation catalyst solution was prepared in the same manner as Example 1.

(Preparation of Aqueous Solution of Aluminum Compound)

After 5.0 L of pure water was added to a flask equipped with a refluxing tube at room temperature and atmospheric pressure, 200 g of basic aluminum acetate (manufactured by Riedel de Haen) whose water insoluble substance evaluated by the above-mentioned evaluation method was 410 ppm was added in form of slurry with pure water while being stirred at 200 rpm. Further, pure water was added to adjust the total in 10.0 L and the solution was stirred at room temperature and atmospheric pressure for 12 hours. After that, setting of the jacket temperature was changed to be 100.5° C. for heating and after a moment the inner temperature reached 95° C. or higher, the solution was stirred under refluxing for 3 hours. After the stirring was stopped, the solution was cooled to room temperature to obtain aqueous solution.

(Preparation of Water/Ethylene Glycol Mixed Solution of Aluminum Compound)

Ethylene glycol was added in proper amount to adjust the aqueous solution/ethylene glycol to be ⅔ (by volume) to the above-mentioned aqueous solution of the aluminum compound and sufficiently mixed to obtain water/ethylene glycol mixed solution of the aluminum compound.

(Polycondensation of Polyester)

The water/ethylene glycol mixed solution of the basic aluminum acetate and the ethylene glycol solution of the phosphorus compound respectively produced in the above-mentioned method as a polycondensation catalyst, were respectively supplied via separate supply ports to the mixture of bis(2-hydroxyethyl)terephthalate and oligomer produced by a conventional method from the high purity terephtalate and ethylene glycol in 2 time as much by mole while the of aluminum atom and phosphorus atom ratios were adjusted to be 0.021% by mole and 0.028% by mole, respectively, to the acid component in the polyester and the mixture was stirred at 245° C. and atmospheric pressure for 15 minutes in nitrogen atmosphere. Next, while the mixture was gradually heated to 275° C. in 55 minutes, and the pressure of the reaction system was gradually decreased to 66.5 Pa (0.5 Torr) and further polycondensation reaction was carried out at 275° C. and 66.5 Pa for 130 minutes. The properties of the obtained PET are shown in Table 3.

TABLE 3

|  | Example 7/8 | Comparative Example 5/6 |
|---|---|---|
| Water-insoluble substance in aqueous aluminum compound solution (ppm) | 410 | 2600 |
| IV (dlg$^{-1}$) | 0.60 | 0.59 |
| color tone (L value) | 57.2 | 56.5 |
| color tone (b value) | 0.1 | 0.2 |

TABLE 3-continued

|  | Example 7/8 | Comparative Example 5/6 |
|---|---|---|
| aluminum containing insoluble particle in polyesters (ppm) | 720 | 6500 |
| haze value of monoaxially oriented film (%) | 0.9 | 3.4 |

Comparative Example 5

PET of Comparative Example 5 was obtained in the same manner as Example 7, except that a basic aluminum acetate (manufactured by Merc KGaA) containing 2600 ppm of insoluble particle in water evaluated by the above-mentioned evaluation method was employed as the basic aluminum acetate. The properties of the obtained PET are shown in Table 3.

Example 8 and Comparative Example 6

Monoaxially oriented films were produced using PET obtained in Example 7 and Comparative Example 5 by the method described in the above-mentioned evaluation method. Haze values of the monoaxially oriented films obtained are shown in Table 3.

The production methods of PET of Examples 7 and 8 were carried out at high polycondensation catalyst activity, with little formation of insoluble particle derived from the polycondensation catalysts, and satisfied both of the economical and quality properties. PET of Comparative Example 5 contained a large quantity of insoluble particle derived from the polycondensation catalysts and was inferior in the quality. The monoaxially oriented films produced from these polyesters of Examples had low haze values and were excellent in transparency. On the other hand, the monoaxially oriented film produced from PET of Comparative Example 5 had high haze value and was inferior in transparency. Accordingly, PET produced in Examples 7 and 8 gave molded articles with high transparency and high quality.

Example 9

(1) Preparation of Polycondensation Catalyst Solution (Preparation of Ethylene Glycol Solution of Phosphorus Compound)

The polycondensation catalyst solution was prepared in the same manner as Example 1.

(Preparation of Basic Aluminum Acetate)

Aqueous basic aluminum chloride solution of concentration of 5.0% by weight on the basis of $Al_2O_3$ was produced by diluting commercialized aqueous basic aluminum chloride solution (23.5% by weight on the basis of $Al_2O_3$, 8.15% by weight of chloride ion, 83.3% of basicity, and pH 4.0) with pure water. The aqueous solution was passed through an acetate-type anion exchange resin column at space velocity 5 to obtain an aqueous basic aluminum acetate solution. The obtained aqueous solution was dried at 140° C. and atmospheric pressure to adjust the water content to be 20% to obtain a basic aluminum acetate solid.

(Preparation of Aqueous Basic Aluminum Acetate Solution)

After 5.0 L of pure water was added to a flask equipped with a refluxing tube at room temperature and atmospheric pressure, 200 g of basic aluminum acetate obtained in the above-mentioned manner was added in form of slurry with pure water while being stirred at 200 rpm. Further, pure water was added to adjust the total in 10.0 L and the resulting solution was stirred at room temperature and atmospheric pressure for 12 hours. After that, setting of the jacket temperature was changed to be 100.5° C. for heating and after a moment the inner temperature reached 95° C. or higher, the solution was stirred under refluxing for 3 hours. After the stirring was stopped, the solution was cooled to room temperature to obtain an aqueous solution.

(Preparation of Water/Ethylene Glycol Mixed Solution of Aluminum Compound)

Ethylene glycol was added in a proper amount to adjust the aqueous solution/ethylene glycol to be ⅔ (by volume) to the above-mentioned aqueous solution of the aluminum compound and sufficiently mixed to obtain water/ethylene glycol mixed solution of the aluminum compound.

(Polycondensation of Polyester)

The water/ethylene glycol mixed solution of the basic aluminum acetate and the ethylene glycol solution of the phosphorus compound respectively produced in the above-mentioned method as a polycondensation catalyst, were respectively supplied via separate supply ports to the mixture of bis(2-hydroxyethyl)terephthalate and oligomer produced by conventional method from the high purity terephtalate and ethylene glycol in 2 time as much by mole while the of aluminum atom and phosphorus atom ratios were adjusted to be 0.021% by mole and 0.028% by mole, respectively, to the acid component in the polyester and the mixture was stirred at 245° C. and atmospheric pressure for 15 minutes in nitrogen atmosphere. Next, the mixture was gradually heated to 275° C. in 55 minutes and the pressure of the reaction system was gradually decreased to 66.5 Pa (0.5 Torr) and further polycondensation reaction was carried out at 275° C. and 66.5 Pa for 130 minutes. The properties of the obtained PET are shown in Table 4.

TABLE 4

|  | Example 9/11 | Example 9/12 | Comparative Example 7/8 |
|---|---|---|---|
| Water content of aqueous aluminum compound solution (% by weight) | 20 | Aqueous solution | 2 |
| IV (dlg$^{-1}$) | 0.61 | 0.60 | 0.60 |
| color tone (L value) | 57.0 | 56.8 | 57.0 |
| color tone (b value) | 0.0 | 0.3 | 0.2 |
| aluminum containing insoluble particle in polyesters (ppm) | 800 | 450 | 8500 |
| haze value of monoaxially oriented film (%) | 0.9 | 0.7 | 4.2 |

Comparative Example 7

PET of Comparative Example 7 was obtained in the same manner as Example 9, except that the water content of the basic aluminum acetate was changed to be 2% by weight. The properties of the obtained PET are shown in Table 4.

Example 10

Without separating the basic aluminum acetate solid product from the aqueous basic aluminum acetate solution, 1 part by weight of the aqueous basic aluminum acetate solution obtained in the method described in Example 9 was added to 15 parts by weight of ethylene glycol under stirring condition and stirred at 200 rpm for 30 minutes to obtain uniform water/ethylene glycol mixed solution. Next, setting of the jacket temperature was changed to be 110° C. for heating to remove water from the solution. On completion of the water removal, heating was stopped and the solution was cooled to room temperature to obtain an ethylene glycol solution of the aluminum compound. PET of Example 10 was obtained in the same manner as Example 9, except that the ethylene glycol solution prepared by the above-mentioned method was used as the aluminum compound solution. The properties of the obtained PET are shown in Table 4.

Examples 11 and 12 and Comparative Example 8

Monoaxially oriented films were produced using PET obtained in Examples 9 and 10 and Comparative Example 7 by the method described in the above-mentioned evaluation method. Haze values of the monoaxially oriented films are shown in Table 4.

The production methods of PET of Examples 9 and 10 were carried out at high polycondensation catalyst activity, with little formation of insoluble particle derived from the polycondensation catalysts, and satisfied both of the economical and quality properties. PET of Comparative Example 6 contained large quantity of insoluble particle derived from the polycondensation catalyst and was inferior in the quality. The monoaxially oriented films produced from these polyesters of Examples had low haze values and were excellent in transparency. On the other hand, the monoaxially oriented film produced from PET of Comparative Example 7 had a high haze value and was inferior in transparency. Accordingly, PET produced in Examples 9 and 10 gave molded articles with high transparency and high quality.

Example 13

(1) Preparation of Polycondensation Catalyst Solution (Preparation of Ethylene Glycol Solution of Phosphorus Compound)

The polycondensation catalyst solution was prepared in the same manner as Example 1.

(Preparation of Basic Aluminum Acetate)

Aqueous basic aluminum chloride solution of concentration of 5.0% by weight on the basis of $Al_2O_3$ was produced by diluting commercialized aqueous basic aluminum chloride solution (23.5% by weight on the basis of $Al_2O_3$, 8.15% by weight of chloride ion, 83.3% of basicity, and pH 4.0) with pure water. The aqueous solution was passed through an acetate-type anion exchange resin column at space velocity 5 to obtain an aqueous basic aluminum acetate solution. The obtained aqueous solution was dried at 90° C. and atmospheric pressure to adjust the water content to be 20% to obtain a basic aluminum acetate solid. The obtained solid had 0.79 in a full width at half maximum of the peak measured by the x-ray diffractiometry described in the above-mentioned evaluation method.

(Preparation of Aqueous Solution of Aluminum Compound)

After 5.0 L of pure water was added to a flask equipped with a refluxing tube at room temperature and atmospheric pressure, 200 g of basic aluminum acetate obtained in the above-mentioned manner was added in form of slurry with pure water while being stirred at 200 rpm. Further, after pure water was added to adjust the total in 10.0 L and the resulting solution was stirred at room temperature and atmospheric pressure for 12 hours. After that, setting of the jacket temperature was changed to be 100.5° C. for heating and after a moment the inner temperature reached 95° C. or higher, the solution was stirred under refluxing for 3 hours. After the stirring was stopped, the solution was cooled to room temperature to obtain an aqueous solution.

(Preparation of Water/Ethylene Glycol Mixed Solution of Aluminum Compound)

Ethylene glycol was added in a proper amount to adjust the aqueous solution/ethylene glycol to be ⅔ (by volume) to the above-mentioned aqueous solution of the aluminum compound and sufficiently mixed to obtain water/ethylene glycol mixed solution of the aluminum compound.

(Polycondensation of Polyester)

As a polycondensation catalyst, the water/ethylene glycol mixed solution of the basic aluminum acetate and the ethylene glycol solution of the phosphorus compound respectively produced in the above-mentioned method as a polycondensation catalyst, were respectively supplied via separate supply ports to the mixture of bis(2-hydroxyethyl)terephthalate and oligomer produced by a conventional method from the high purity terephtalate and ethylene glycol in 2 time as much by mole while the of aluminum atom and phosphorus atom ratios were adjusted to be 0.021% by mole and 0.028% by mole, respectively, to the acid component in the polyester and the resulting mixture was stirred at 245° C. and atmospheric pressure for 15 minutes in nitrogen atmosphere. Next, the mixture was gradually heated to 275° C. in 55 minutes and the pressure of the reaction system was gradually decreased to 66.5 Pa (0.5 Torr) and further polycondensation reaction was carried out at 275° C. and 66.5 Pa for 130 minutes. The properties of the obtained PET are shown in Table 5.

TABLE 5

| | Example 13/ 14 | Comparative Example 9/ 10 |
|---|---|---|
| Full width at half maximum of the peak of aluminum compound measured by x-ray diffractiometry | 0.79 | 0.46 |
| IV (dlg$^{-1}$) | 0.61 | 0.59 |
| color tone (L value) | 57.4 | 56.9 |
| color tone (b value) | 0.4 | 0.0 |
| aluminum containing insoluble particle in polyesters (ppm) | 1500 | 8000 |
| haze value of monoaxially oriented film (%) | 1.2 | 4.0 |

Comparative Example 9

PET of Comparative Example 9 was obtained in the same manner as Example 13, except that the basic aluminum acetate obtained by drying under conditions changed to atmospheric pressure and 150° C. and having 0.46 in a full width at half maximum of the x-ray diffractiometric peak was used. The properties of the obtained PET are shown in Table 5.

Example 14 and Comparative Example 10

Monoaxially oriented films were produced using PET obtained in Example 13 and Comparative Example 9 by the method described in the above-mentioned evaluation method. Haze values of the monoaxially oriented films are shown in Table 5.

The production method of PET of Example 13 was carried out at high polycondensation catalyst activity, with little formation of insoluble particle derived from the polycondensation catalysts, and satisfied both of the economical and quality properties. PET of Comparative Example 9 contained a large quantity of insoluble particle derived from the polycondensation catalyst and was inferior in the quality. The monoaxially oriented films produced from these polyesters of Examples had low haze values and were excellent in transparency. On the other hand, the monoaxially oriented film produced from PET of Comparative Example 9 had a high haze value and was inferior in transparency. Accordingly, PET produced in Example 13 gave molded articles with high transparency and high quality.

Example 15

(1) Preparation of Polycondensation Catalyst Solution (Preparation of Ethylene Glycol Solution of Phosphorus Compound)

The above-mentioned solution was prepared in the same manner as Example 1.

(Preparation of Basic Aluminum Acetate)

Aqueous basic aluminum chloride solution of concentration of 5.0% by weight on the basis of $Al_2O_3$ was produced by diluting commercialized aqueous basic aluminum chloride solution (23.5% by weight on the basis of $Al_2O_3$, 8.15% by weight of chloride ion, 83.3% of basicity, and pH 4.0) with pure water. The aqueous solution was passed through an acetate-type anion exchange resin column at a space velocity 5 to obtain an aqueous basic aluminum acetate solution. The obtained aqueous solution was dried at 140° C. and atmospheric pressure to adjust the water content to be 15% to obtain a basic aluminum acetate solid. An absorbance ratio T1 of the basic aluminum acetate, measured by the infrared absorptiometry the above-mentioned evaluation method, was 1.75.

(Preparation of Aqueous Solution of Basic Aluminum Acetate)

After 5.0 L of pure water was added to a flask equipped with a refluxing tube at room temperature and atmospheric pressure, 200 g of basic aluminum acetate obtained in the above-mentioned manner was added in form of slurry with pure water while being stirred at 200 rpm. Further, after pure water was added to adjust the total in 10.0 L and the resulting solution was stirred at room temperature and atmospheric pressure for 12 hours. After that, setting of the jacket temperature was changed to be 100.5° C. for heating and after a moment the inner temperature reached 95° C. or higher, the solution was stirred under refluxing for 3 hours. After the stirring was stopped, the solution was cooled to room temperature to obtain an aqueous solution.

(Preparation of Water/Ethylene Glycol Mixed Solution of Aluminum Compound)

Ethylene glycol was added in a proper amount to adjust the aqueous solution/ethylene glycol to be ⅔ (by volume) to the above-mentioned aqueous solution of the aluminum compound and sufficiently mixed to obtain water/ethylene glycol mixed solution of the aluminum compound.

(Polycondensation of Polyester)

As a polycondensation catalyst, the water/ethylene glycol mixed solution of the basic aluminum acetate and the ethylene glycol solution of the phosphorus compound respectively produced in the above-mentioned method as a polycondensation catalyst, were respectively supplied via separate supply ports to the mixture of bis(2-hydroxyethyl)terephthalate and oligomer produced by a conventional method from the high purity terephtalate and ethylene glycol in 2 time as much by mole while the of aluminum atom and phosphorus atom ratios were adjusted to be 0.021% by mole and 0.028% by mole, respectively, to the acid component in the polyester and the mixture was stirred at 245° C. and atmospheric pressure for 15 minutes in nitrogen atmosphere. Next, the mixture was gradually heated to 275° C. in 55 minutes and the pressure of the reaction system was gradually decreased to 66.5 Pa (0.5 Torr) and further polycondensation reaction was carried out at 275° C. and 66.5 Pa for 130 minutes. The properties of the obtained PET are shown in Table 6.

TABLE 6

| | Example 15/18 | Example 16/19 | Example 17/20 | Comparative Example 11/12 |
|---|---|---|---|---|
| absorbance ratio T1 of basic aluminum acetate | 1.75 | 1.48 | 1.22 | 1.94 |
| IV (dlg$^{-1}$) | 0.62 | 0.60 | 0.61 | 0.62 |
| color tone (L value) | 56.5 | 57.0 | 56.0 | 56.9 |
| color tone (b value) | 0.3 | 0.3 | 0.4 | 0.0 |
| aluminum containing insoluble particle in polyesters (ppm) | 1000 | 550 | 340 | 8000 |
| haze value of monoaxially oriented film (%) | 1.0 | 0.8 | 0.6 | 4.0 |

Comparative Example 11

PET of Comparative Example 11 was obtained in the same manner as Example 15, except that the basic aluminum acetate obtained by drying changed in a manner that the water content was lowered to 3% by weight and having absorbance ratio T1 of the infrared absorptiometry measured by the above-mentioned evaluation method of 1.94 was used. The properties of the obtained PET are shown in Table 6.

Example 16

PET of Example 16 was obtained in the same manner as Example 15, except that the drying in the preparation of the basic aluminum acetate was changed in condition at 95° C. under reduced pressure. The properties of the obtained PET are shown in Table 6. The absorbance ratio T1 of the infrared absorptiometry measured by the above-mentioned evaluation method was 1.48.

Example 17

PET of Example 17 was obtained in the same manner as Example 15, except that urea in an amount of 0.1 part by weight to 100 parts by weight of the basic aluminum acetate was added to the ion exchange finishing solution in the preparation of the basic aluminum acetate and stirred for dissolution and successively the resulting solution was concentrated and dried. The properties of the obtained PET are shown in Table 6. The absorbance ratio T1 of the infrared absorptiometry measured by the above-mentioned evaluation method was 1.22.

Examples 18 to 20 and Comparative Example 12

Monoaxially oriented films were produced using PET obtained in Examples 14 to 17 and Comparative Example 11 by the method described in the above-mentioned evaluation method. Haze values of the monoaxially oriented films are shown in Table 6.

The production method of PET of Examples 15 to 17 was carried out at high polycondensation catalyst activity, with little formation of insoluble particle derived from the polycondensation catalysts, and satisfied both of the economical and quality properties. PET of Comparative Example 11 contained a large quantity of insoluble particle derived from the polycondensation catalyst and was inferior in the quality. The monoaxially oriented films produced from these polyesters of Examples had low haze value and were excellent in transparency. On the other hand, the monoaxially oriented film produced from PET of Comparative Example 11 had high haze value and was inferior in transparency. Accordingly, PET produced in Examples 15 to 17 gave molded articles with high transparency and high quality.

Example 21

Preparation Example 1 of Ethylene Glycol Solution of Basic Aluminum Acetate

A flask was loaded with aqueous solution containing 20 g/L of basic aluminum acetate (hydroxyaluminum diacetate, manufactured by Fluka) and ethylene glycol in the same amount (by volume) and after stirred at room temperature for 6 hours, the mixture was stirred at 90 to 110° C. for several hours under reduced pressure (133 Pa) to remove water and prepare an ethylene glycol solution containing 20 g/L of aluminum compound.

(Preparation Example 1 of Phosphorus Compound)

After Irganox 1222 (manufactured by Ciba Specialty Chemicals K.K.) as a phosphorus compound defined by the formula (Formula 39) and ethylene glycol were simultaneously added to a flask and while being stirred in atmosphere replaced with nitrogen, the mixture was heated at liquid temperature of 160° C. for 2.5 hours to obtain ethylene glycol solution containing 50 g/L of phosphorus compound.

(Preparation Example 1 of Mixture of Ethylene Glycol Solution of Aluminum Compound/Ethylene Glycol Solution of Phosphorus Compound)

The above-mentioned ethylene glycol solutions of aluminum compound and phosphorus compound obtained in Preparation example 1 of aluminum compound and Preparation example 1 of phosphorus compound, respectively were loaded into a flask and mixed at room temperature while being adjusted to have 1:2.4 ratio of aluminum atom and phosphorus atom by mole and further stirred for 1 day to obtain a catalyst solution.

(Polycondensation of Polyester)

A 2 L stainless steel autoclave equipped with stirrer was loaded with high purity terephthalic acid and ethylene glycol 2 time as much by mole, triethyleneamine in amount of 0.3% by mole of the acid component was added, and successively esterification reaction was carried out at 250° C. in pressure of 0.25 MPa while water removed to obtain mixture of bis(2-hydroxyethyl) terephthalate and oligomer (hereinafter referred to as BHET mixture). As the polymerization catalyst, the mixed solution of the ethylene glycol solution of the aluminum compound and the ethylene glycol solution of the phosphorus compound respectively produced in the above-mentioned manner was added in proper amount to adjust the amount of aluminum atom and phosphorus atom to be 0.015% by mole and 0.036% by mole of the acid component in the polyester and the resulting mixture was stirred at 250° C. and atmospheric pressure for 10 minutes in nitrogen atmosphere. Next, the mixture was gradually heated to 280° C. in 60 minutes and the pressure of the reaction system was gradually decreased to 13.3 Pa (0.1 Torr) and further polycondensation reaction was carried out at 280° C. and 13.3 Pa. After the pressure was relieved, resin under slight pressure was discharged like strand, quenched, and kept in cold water for 20 seconds, and the cooled strand was cut into cylindrical pellets with about 3 mm length and 2 mm diameter. The solubility of the aluminum compound in water, absorbance ratio T2 of the infrared absorbance, the polymerization catalyst composition, the time taken for the polycondensation reaction (polymerization time), and the IV evaluation results of the obtained polyester are shown in Table 7.

After the pellets obtained by the melt polymerization were vacuum dried (13.3 Pa or lower, 80° C., 12 hours), crystallization treatment was carried out (13.3 Pa or lower, 130° C., 3 hours and 13.3 Pa or lower, 160° C., and 3 hours). After being cooled, the polyester pellets are subjected to solid-phase polymerization in solid-phase polymerization reactor by keeping the inside of the reactor at 13.3 Pa or lower and 215° C. to obtain polyester pellets with 0.78 dL/g of IV. The evaluation results of the transparency and insoluble particle of hollow molded articles obtained by molding after the solid-phase polymerization are shown in Table 7.

TABLE 7

|  | Example 21 | Example 22 | Example 23 | Example 24 | Comparative Example 13 | Comparative Example 14 |
| --- | --- | --- | --- | --- | --- | --- |
| catalyst addition amount (% by mole) | Al/P = 0.015/0.036 | Al/P = 0.015/0.036 | Al/P = 0.015/0.036 | Al/P = 0.015/0.036 | Al/P = 0.015/0.036 | Sb = 0.04 |
| Kind of phosphorus compound | (formula 39) | (formula 21) | (formula 24) | (formula 25) | (formula 39) | — |
| absorbance of aqueous solution of aluminum compound | 0.0022 | 0.0022 | 0.0022 | 0.0022 | 0.0165 | — |
| absorbance ratio of infrared absorptiometry C/A*[1)] | 0.78 | 0.78 | 0.78 | 0.78 | 1.07 | — |

TABLE 7-continued

|  | Example 21 | Example 22 | Example 23 | Example 24 | Comparative Example 13 | Comparative Example 14 |
|---|---|---|---|---|---|---|
| polymerization time (minute) | 77 | 76 | 77 | 79 | 73 | 70 |
| IV (dL/g) | 0.61 | 0.61 | 0.63 | 0.6 | 0.62 | 0.61 |
| transparency of hollow molded article | ○ | ○ | ○ | ○ | Δ | Δ |
| insoluble particle in polyesters (ppm) | 398 | 421 | 572 | 721 | 2190 | — |

*[1] apparent crystallinity

Examples 22 to 24

The same process as that of Example 21 was carried out, except that the phosphorus compounds defined by the formulas [Formula 21], [Formula 24], and [Formula 25] were used in place of the phosphorus compound [Formula 39]. Table 7 shows the evaluation results of solubility of the aluminum compound in water, absorbance ratio T2 of infrared absorptiometry, polymerization catalyst composition, time taken for polycondensation reaction (polymerization time), IV of the obtained polyesters, and transparency and insoluble particle of the hollow molded articles obtained by molding after the solid-phase polymerization.

Comparative Example 13

The same process as that of Example 21 was carried out, except that basic aluminum acetate of reagent grade manufactured by Nakarai was used in place of the basic aluminum acetate manufactured by Fluka. Table 7 shows the evaluation results of solubility of the aluminum compound in water, absorbance ratio T2 of infrared absorptiometry, polymerization catalyst composition, time taken for polycondensation reaction (polymerization time), IV of the obtained polyester, and transparency and insoluble particle of the hollow molded article obtained by molding after the solid-phase polymerization.

Comparative Example 14

The same process as that of Example 21 was carried out, except that ethylene glycol solution of antimony trioxide in proper amount for adjusting the antimony atom at 0.04% by mole of the acid component in the polyester was used as the polycondensation catalyst. Table 7 shows the evaluation results of polymerization time, IV of the obtained polyester, and transparency and insoluble particle of the hollow molded article obtained by molding after the solid-phase polymerization.

Example 25

(1) Preparation of Polycondensation Catalyst Solution

Preparation of Ethylene Glycol Solution of Phosphorus Compound

The above-mentioned solution was prepared in the same manner as Example 1.

(Preparation of Basic Aluminum Acetate)

Aqueous basic aluminum chloride solution of concentration of 5.0% by weight on the basis of $Al_2O_3$ was produced by diluting commercialized aqueous basic aluminum chloride solution (23.5% by weight on the basis of $Al_2O_3$, 8.15% by weight of chloride ion, 83.3% of basicity, and pH 4.0) with pure water. The aqueous solution was passed through an acetate-type anion exchange resin column at space velocity 5 to obtain an aqueous basic aluminum acetate solution. The obtained aqueous solution was mixed with aluminum sulfate in proper amount for adjusting the sulfur atom at 1000 ppm to aluminum atom in the aqueous solution and stirred at 50° C. for 30 minutes. The obtained solution was dried at 140° C. and atmospheric pressure to adjust the water content to be 3% to obtain a basic aluminum acetate solid. The sulfur atom concentration was 1000 ppm to aluminum atom in the obtained basic aluminum acetate.

(Preparation of Aqueous Solution of Basic Aluminum Acetate)

After 5.0 L of pure water was added to a flask equipped with a refluxing tube at room temperature and atmospheric pressure, 200 g of basic aluminum acetate obtained in the above-mentioned manner was added in form of slurry with pure water while being stirred at 200 rpm. Further, after pure water was added to adjust the total in 10.0 L and the resulting solution was stirred at room temperature and atmospheric pressure for 12 hours. After that, setting of the jacket temperature was changed to be 100.5° C. for heating and after a moment the inner temperature reached 95° C. or higher, the solution was stirred under refluxing for 3 hours. After the stirring was stopped, the solution was cooled to room temperature to obtain aqueous solution.

(Preparation of Water/Ethylene Glycol Mixed Solution of Aluminum Compound)

Ethylene glycol was added in a proper amount to adjust the aqueous solution/ethylene glycol to be ⅔ (by volume) to the above-mentioned aqueous solution of the aluminum compound and sufficiently mixed to obtain water/ethylene glycol mixed solution of the aluminum compound.

(Polycondensation of Polyester)

The water/ethylene glycol mixed solution of the basic aluminum acetate and the ethylene glycol solution of the phosphorus compound, produced in the above-mentioned method as a polycondensation catalyst, were respectively supplied via separate supply ports to the mixture of bis(2-hydroxyethyl) terephthalate and oligomer produced by a conventional method from the high purity terephtalate and ethylene glycol in 2 time as much by mole while the of aluminum atom and phosphorus atom ratios were adjusted to be 0.021% by mole and 0.028% by mole, respectively, to the acid component in the polyester and the mixture was stirred at 245° C. and atmospheric pressure for 15 minutes in nitrogen atmosphere. Next, the mixture was gradually heated to 275° C. in 55 minutes and the pressure of the reaction system was gradually decreased to 66.5 Pa (0.5 Torr) and further polycondensation reaction was carried out at 275° C. and 66.5 Pa for 130 minutes. The properties of the obtained PET are shown in Table 8.

TABLE 8

|  | Example 25/29 | Example 26/30 | Example 27/31 | Example 28/32 |
|---|---|---|---|---|
| sulfur atom content in the basic aluminum acetate (ppm, to aluminum atom) | 1000 | 150 | 200 | 1500 |
| IV (dlg$^{-1}$) | 0.62 | 0.60 | 0.61 | 0.61 |
| DEG (% by mole) | 1.9 | 2.0 | 1.9 | 2.1 |
| color tone (L value) | 56.5 | 56.0 | 57.0 | 56.5 |
| color tone (b value) | 0.3 | 0.4 | 0.3 | 0.2 |
| aluminum containing insoluble particle in polyesters (ppm) | 1000 | 450 | 700 | 500 |
| haze value of monoaxially oriented film (%) | 1.0 | 0.6 | 0.8 | 0.6 |

Comparative Example 15

PET of Comparative Example 15 was obtained in the same manner as Example 25, except that no aluminum sulfate was added in the preparation of the basic aluminum acetate. The properties of the obtained PET are shown in Table 9.

TABLE 9

|  | Comparative Example 15/19 | Comparative Example 16/20 | Comparative Example 17/21 | Comparative Example 18/22 |
|---|---|---|---|---|
| sulfur atom content in the basic aluminum acetate (ppm, to aluminum atom) | 0 | 19800 | 15000 | 20000 |
| IV (dlg$^{-1}$) | 0.62 | 0.61 | 0.62 | 0.60 |
| DEG (% by mole) | 2.0 | 2.9 | 3.2 | 3.5 |
| color tone (L value) | 56.9 | 57.5 | 57.8 | 58.0 |
| color tone (b value) | 0.0 | 0.4 | 0.4 | 0.4 |
| aluminum containing insoluble particle in polyesters (ppm) | 8000 | 400 | 450 | 420 |
| haze value of monoaxially oriented film (%) | 4.0 | 0.6 | 0.6 | 0.6 |

Comparative Example 16

PET of Comparative Example 16 was obtained in the same manner as Example 25, except that aluminum sulfate was added in proper amount for adjusting the amount of the sulfur atom to be 20000 ppm to the aluminum atom in the basic aluminum acetate in the preparation of the basic aluminum acetate. The properties of the obtained PET are shown in Table 9. The detected amount of the sulfur atom to the aluminum atom in the basic aluminum acetate was 19800 ppm.

Example 26

PET of Example 26 was obtained in the same manner as Example 25, except that sulfuric acid was used in place of aluminum sulfate and the addition amount was adjusted properly for adjusting the amount of the sulfur atom to be 150 ppm to the aluminum atom in the basic aluminum acetate in the preparation of the basic aluminum acetate. The properties of the obtained PET are shown in Table 8.

Comparative Example 17

PET of Comparative Example 17 was obtained in the same manner as Example 26, except that sulfuric acid was added in proper amount for adjusting the amount of the sulfur atom to be 15000 ppm to the aluminum atom in the basic aluminum acetate in the preparation of the basic aluminum acetate. The properties of the obtained PET are shown in Table 9.

Example 27

PET of Example 27 was obtained in the same manner as Example 25, except that sulfuric acid was used in place of aluminum sulfate and the addition amount was adjusted properly for adjusting the amount of the sulfur atom to be 200 ppm to the aluminum atom in the basic aluminum acetate in the preparation of the basic aluminum acetate. The properties of the obtained PET are shown in Table 7.

Comparative Example 18

PET of Comparative Example 18 was obtained in the same manner as Example 27, except that sulfuric acid was added in proper amount for adjusting the amount of the sulfur atom to be 20000 ppm to the aluminum atom in the basic aluminum acetate. The properties of the obtained PET are shown in Table 9.

Example 28

PET of Example 28 was obtained in the same manner as Example 27, except that p-toluenesulfonic acid was used in place of sulfuric acid and the addition amount was adjusted properly for adjusting the amount of the sulfur atom to be 1500 ppm to the aluminum atom. The properties of the obtained PET are shown in Table 7.

Examples 29 to 32 and Comparative Examples 19 to 22

Monoaxially oriented films were produced using PET obtained in Examples 25 to 28 and Comparative Examples 15 to 18 by the method described in the above-mentioned evaluation method. Haze value of the monoaxially oriented films are shown in Table 8 and Table 9.

The production method of PET of Examples 25 to 28 was carried out at high polycondensation catalyst activity, with low DEG production and little formation of insoluble particle derived from the polycondensation catalysts, and satisfied both of the economical and quality properties. PET of Comparative Examples 16 to 18 contained large quantity of DEG and were inferior in the quality. The monoaxially oriented films produced from these polyesters of Examples 25 to 28 had low haze values and were excellent in transparency. On the other hand, the monoaxially oriented film produced from PET of Comparative Example 15 had high haze value and was inferior in transparency. Accordingly, PET produced in Examples 15 to 17 gave molded articles with high transparency and high quality.

Example 33

(1) Preparation of Polycondensation Catalyst Solution (Preparation of Ethylene Glycol Solution of Phosphorus Compound)

The above-mentioned solution was prepared in the same manner as Example 1.

(Preparation of Basic Aluminum Acetate)

An aqueous basic aluminum chloride solution of concentration of 5.0% by weight on the basis of $Al_2O_3$ was produced by diluting commercialized aqueous basic aluminum chloride solution (23.5% by weight on the basis of $Al_2O_3$, 8.15% by weight of chloride ion, 83.3% of basicity, and pH 4.0) with pure water. The aqueous solution was passed through an acetate-type anion exchange resin column at space velocity 5 to obtain an aqueous basic aluminum acetate solution. The obtained aqueous solution was mixed with aluminum borate in proper amount for adjusting the boron atom at 1200 ppm to the aluminum atom in the aqueous solution. The obtained solution was dried at 140° C. and atmospheric pressure to adjust the water content to be 3% to obtain basic aluminum acetate solid. The boron atom concentration was 1200 ppm to the aluminum atom in the obtained basic aluminum acetate.

(Preparation of Aqueous Solution of Basic Aluminum Acetate)

After 5.0 L of pure water was added to a flask equipped with a refluxing tube at room temperature and atmospheric pressure, 200 g of basic aluminum acetate obtained in the above-mentioned manner was added in form of slurry with pure water while being stirred at 200 rpm. Further, after pure water was added to adjust the total in 10.0 L and the resulting solution was stirred at room temperature and atmospheric pressure for 12 hours. After that, setting of the jacket temperature was changed to be 100.5° C. for heating and after a moment the inner temperature reached 95° C. or higher, the solution was stirred under refluxing for 3 hours. After the stirring was stopped, the solution was cooled to room temperature to obtain aqueous solution.

(Preparation of Water/Ethylene Glycol Mixed Solution of Aluminum Compound)

Ethylene glycol was added in proper amount to adjust the aqueous solution/ethylene glycol ratio to be ⅔ (by volume) to the above-mentioned aqueous solution of the aluminum compound and sufficiently mixed to obtain water/ethylene glycol mixed solution of the aluminum compound.

(Polycondensation of Polyester)

The water/ethylene glycol mixed solution of the basic aluminum acetate and the ethylene glycol solution of the phosphorus compound respectively produced in the above-mentioned method as a polycondensation catalyst, were respectively supplied via separate supply ports to the mixture of bis(2-hydroxyethyl)terephthalate and oligomer produced by conventional method from the high purity terephtalate and ethylene glycol in 2 time as much by mole while the of aluminum atom and phosphorus atom ratios were adjusted to be 0.021% by mole and 0.028% by mole, respectively, to the acid component in the polyester and the mixture was stirred at 245° C. and atmospheric pressure for 15 minutes in nitrogen atmosphere. Next, the mixture was gradually heated to 275° C. in 55 minutes and the pressure of the reaction system was gradually decreased to 66.5 Pa (0.5 Torr) and further polycondensation reaction was carried out at 275° C. and 66.5 Pa for 130 minutes. The properties of the obtained PET are shown in Table 10.

TABLE 10

|  | Example 33/36 | Example 34/37 | Example 35/38 |
|---|---|---|---|
| boron atom content in the basic aluminum acetate (ppm, to aluminum atom) | 1200 | 200 | 300 |
| IV (dlg$^{-1}$) | 0.61 | 0.62 | 0.61 |
| DEG (% by mole) | 2.0 | 2.0 | 2.1 |
| color tone (L value) | 56.5 | 56.0 | 57.0 |
| color tone (b value) | 0.3 | 0.2 | 0.2 |
| aluminum containing insoluble particle in polyesters (ppm) | 1200 | 500 | 700 |
| haze value of monoaxially oriented film (%) | 1.1 | 0.6 | 0.8 |

Comparative Example 23

PET of Comparative Example 23 was obtained in the same manner as Example 33, except that no aluminum borate was added in the preparation of the basic aluminum acetate. The properties of the obtained PET are shown in Table 11.

TABLE 11

|  | Comparative Example 23/27 | Comparative Example 24/28 | Comparative Example 25/29 | Comparative Example 26/30 |
|---|---|---|---|---|
| boron atom content in the basic aluminum acetate (ppm, to aluminum atom) | 0 | 19000 | 15000 | 20000 |
| IV (dlg$^{-1}$) | 0.62 | 0.60 | 0.62 | 0.61 |
| DEG (% by mole) | 2.0 | 2.9 | 3.2 | 3.7 |
| color tone (L value) | 56.9 | 57.5 | 57.8 | 58.0 |
| color tone (b value) | 0.0 | 0.4 | 0.4 | 0.3 |
| aluminum containing insoluble particle in polyesters (ppm) | 8000 | 500 | 450 | 450 |
| haze value of monoaxially oriented film (%) | 4.0 | 0.6 | 0.6 | 0.6 |

Comparative Example 24

PET of Comparative Example 24 was obtained in the same manner as Example 33, except that aluminum borate was added in proper amount for adjusting the amount of the boron atom to be 20000 ppm to the aluminum atom in the basic aluminum acetate in the preparation of the basic aluminum acetate. The properties of the obtained PET are shown in Table 11. The detected amount of the boron atom to the aluminum atom in the basic aluminum acetate was 19000 ppm.

Example 34

PET of Example 34 was obtained in the same manner as Example 33, except that boric acid was used in place of aluminum borate and the addition amount was adjusted properly for adjusting the amount of the boron atom to be 200 ppm to the aluminum atom in the basic aluminum acetate in the preparation of the basic aluminum acetate. The properties of the obtained PET are shown in Table 10.

Comparative Example 25

PET of Comparative Example 25 was obtained in the same manner as Example 34, except that boric acid was added in proper amount for adjusting the amount of the boron atom to be 15000 ppm to the aluminum atom in the basic aluminum acetate in the preparation of the basic aluminum acetate. The properties of the obtained PET are shown in Table 11.

Example 35

PET of Example 35 was obtained in the same manner as Example 33, except that boric acid was used in place of aluminum borate and the addition amount was adjusted properly for adjusting the amount of the boron atom to be 250 ppm to the aluminum atom in the basic aluminum acetate in the preparation of the basic aluminum acetate. The properties of the obtained PET are shown in Table 10.

Comparative Example 26

PET of Comparative Example 26 was obtained in the same manner as Example 27, except that boric acid was added in proper amount for adjusting the amount of the boron atom to be 20000 ppm to the aluminum atom. The properties of the obtained PET are shown in Table 11.

Monoaxially oriented films were produced using PET obtained in Examples 32 to 34 and Comparative Examples 18 to 21 by the method described in the above-mentioned evaluation method. Haze values of the monoaxially oriented films are shown in Table 10 and Table 11.

Examples 36 to 38 and Comparative Examples 27 to 30

The production method of PET of Examples 33 to 35 was carried out at high polycondensation catalyst activity, with low DEG production and little formation of insoluble particle derived from the polycondensation catalysts, and satisfied both of the economical and quality properties. PET of Comparative Example 23 contained large quantity of insoluble particle derived from the polycondensation catalysts and was inferior in the quality. PET of Comparative Examples 24 to 26 contained large quantity of DEG was inferior in the quality. The monoaxially oriented films produced from these polyesters of Examples 33 to 35 had low haze values and were excellent in transparency. On the other hand, the monoaxially oriented film produced from PET of Comparative Example 23 had a high haze value and was inferior in transparency. Accordingly, PET produced in Examples 33 to 35 gave molded articles with high transparency and high quality.

Example 29

Preparation of Aqueous Solution of Aluminum Compound and Ethylene Glycol Solution of Aluminum Compound The preparation was carried out in the same manner as Example 1.

(Preparation of Solutions of Magnesium Compound and Sodium Compound)

Magnesium acetate tetrahydrate and sodium acetate in concentrations of 50 g/L and 10 g/L, respectively, were dissolved in ethylene glycol to obtain respective solutions.

(Polycondensation of Polyester)

As a polycondensation catalyst, the water/ethylene glycol mixed solution of the basic aluminum acetate, the solution of the magnesium compound, and the solution of sodium compound were added in respectively proper amount to adjust the amounts of the respective elements to be 0.035% by mole, 0.048% by mole, and 0.014% by mole of the acid component in the polyester to mixture of bis(2-hydroxyethyl) terephthalate and oligomer produced by a conventional method from high purity terephthalic acid and ethylene glycol 2 time as much by mole and the resulting mixture was stirred at 245° C. and atmospheric pressure for 15 minutes in nitrogen atmosphere. Next, the mixture was gradually heated to 275° C. in 55 minutes and the pressure of the reaction system was gradually decreased to 66.5 Pa (0.5 Torr) and further polycondensation reaction was carried out at 275° C. and 66.5 Pa for 60 minutes. The properties of the obtained PET are shown in Table 12.

Comparative Example 31

PET of Comparative Example 23 was obtained in the same manner as Example 39, except that mixed water/ethylene glycol solution of the aluminum compound used in Comparative Example 1 was used. The properties of the obtained PET are shown in Table 12.

Monoaxially oriented films were produced using PET obtained in Examples 39 and Comparative Example 31 by the method described in the above-mentioned evaluation method. Haze value of the monoaxially oriented films are shown in Table 12. The monoaxially oriented film produced from the polyester of Example 39 had low haze value and excellent in transparency. On the other hand, the monoaxially oriented film produced from PET of Comparative Example 31 had high haze value and was inferior in transparency. Accordingly, PET produced in Example 39 gave a molded article with high transparency and high quality.

TABLE 12

|  | Example 39 | Comparative Example 31 |
| --- | --- | --- |
| polycondensation time (minute) | 60 | 61 |
| IV (dlg$^{-1}$) | 0.61 | 0.61 |
| aluminum containing insoluble particle in polyesters (ppm) | 700 | 6500 |
| haze value of monoaxially oriented film (%) | 0.3 | 3.1 |

Examples 40 to 55

Preparation of Aqueous Solution of Aluminum Compound and Ethylene Glycol Solution of Aluminum Compound The solutions employed in the respective Examples were used.

(Preparation of Solutions of Magnesium Compound and Sodium Compound)

Potassium acetate and lithium acetate in concentrations of 10 g/L, respectively were dissolved in ethylene glycol to obtain solutions. The same solutions of the magnesium compound and sodium compound employed in Example 35 were used.

(Polycondensation of Polyester)

As a polycondensation catalyst, the respective metal solutions in respectively proper amounts to adjust the amounts as shown in Table 13 to the acid component in the polyester were added to mixture of bis(2-hydroxyethyl) terephthalate and oligomer produced by a conventional method from high purity terephthalic acid and ethylene glycol 2 time as much by mole and the resulting mixtures were stirred at 245° C. and atmospheric pressure for 15 minutes in nitrogen atmosphere. Next, while the obtained reaction systems were heated to 275° C. in 55 minutes, the pressure of the reaction systems was gradually decreased to 66.5 Pa (0.5 Torr) and further polycondensation reaction was carried out at 275° C. and 66.5 Pa for 60 minutes. The properties of the obtained PET are shown in Table 13.

TABLE 13

| | Example 36 | Example 37 | Example 38 | Example 39 | Example 40 | Example 41 | Example 42 | Example 43 |
|---|---|---|---|---|---|---|---|---|
| aqueous Al solution | aqueous solution used in Example 1 | aqueous solution used in Example 1 | aqueous solution used in Example 2 | aqueous solution used in Example 2 | aqueous solution used in Example 9 | aqueous solution used in Example 9 | aqueous solution used in Example 13 | aqueous solution used in Example 13 |
| Al amount | 0.035 | 0.035 | 0.035 | 0.035 | 0.035 | 0.035 | 0.35 | 0.035 |
| Mg amount | — | — | — | 0.06 | — | 0.048 | — | — |
| K amount | — | — | 0.06 | — | — | — | — | — |
| Na amount | — | 0.06 | — | — | — | 0.014 | — | 0.06 |
| Li amount | 0.06 | — | — | — | 0.06 | — | 0.06 | — |
| polycondensation time (minute) | 60 | 60 | 60 | 60 | 60 | 60 | 60 | 60 |
| IV (dlg$^{-1}$) | 0.62 | 0.6 | 0.61 | 0.58 | 0.62 | 0.62 | 0.61 | 0.61 |
| (ppm) | 700 | 750 | 350 | 350 | 750 | 750 | 1300 | 1300 |
| (%) | 0.8 | 0.9 | 0.4 | 0.4 | 0.9 | 0.9 | 1.2 | 1.2 |

| | Example 44 | Example 45 | Example 46 | Example 47 | Example 48 | Example 49 | Example 50 | Example 51 |
|---|---|---|---|---|---|---|---|---|
| aqueous Al solution | aqueous solution used in Example 15 | aqueous solution used in Example 15 | aqueous solution used in Example 21 | aqueous solution used in Example 21 | aqueous solution used in Example 25 | aqueous solution used in Example 25 | aqueous solution used in Example 33 | aqueous solution used in Example 33 |
| Al amount | 0.035 | 0.035 | 0.035 | 0.035 | 0.035 | 0.035 | 0.035 | 0.035 |
| Mg amount | 0.048 | — | — | — | — | 0.06 | — | 0.048 |
| K amount | — | 0.06 | — | — | — | — | — | — |
| Na amount | 0.014 | — | — | 0.06 | — | — | — | 0.014 |
| Li amount | — | — | 0.06 | — | 0.06 | — | 0.06 | — |
| polycondensation time (minute) | 60 | 60 | 60 | 60 | 60 | 60 | 60 | 60 |
| IV (dlg$^{-1}$) | 0.6 | 0.61 | 0.62 | 0.6 | 0.61 | 0.59 | 0.61 | 0.62 |
| aluminum containing insoluble particle in polyesters (ppm) | 900 | 900 | 1000 | 1000 | 1000 | 1000 | 1200 | 1200 |
| haze value of monoaxially oriented film (%) | 1 | 1 | 1.1 | 1 | 1 | 1.1 | 1.2 | 1.2 |

According to the invention, it is possible to provide a polyester and a polyester molded article which, while maintaining color tone, transparency, and thermal stability, can be produced at high polycondensation rate, cause little insoluble particle production derived from a polycondensation catalyst, can exhibit the characteristic features, for example, in the field of ultrafine fibers, high transparent films for optical use, or ultrahigh transparent molded products, and simultaneously meet both quality and cost effectiveness requirements in the presence of a polycondensation catalyst containing metal components other than antimony, germanium, and titanium as main metal components.

The invention claimed is:

1. A process for producing a polyester comprising:
   (a) selecting an aluminum carboxylate having an absorbance of 0.0132 or lower, as measured in an aqueous aluminum carboxylate solution, prepared by dissolving the aluminum carboxylate in pure water to give a concentration of 2.7 g/L in terms of the amount of aluminum element, under conditions of cell length 1 cm and wavelength 680 nm; and
   (b) preparing the polyester by polycondensation in the presence of a polyester polycondensation catalyst containing the aluminum carboxylate.

2. The process for producing a polyester as claimed in claim 1, wherein the aluminum compound is a basic aluminum acetate.

3. The process for producing a polyester as claimed in claim 1 or 2, wherein the polyester polycondensation catalyst further comprises at least one kind of phosphorus compound.

* * * * *